United States Patent
Rojas et al.

(10) Patent No.: US 12,435,611 B2
(45) Date of Patent: *Oct. 7, 2025

(54) SYSTEM AND METHOD FOR AUTOMATED DRILLING NETWORK

(71) Applicant: SCHLUMBERGER TECHNOLOGY CORPORATION, Sugar Land, TX (US)

(72) Inventors: Juan Jose Rojas, Sugar Land, TX (US); Shunfeng Zheng, Katy, TX (US); Zhijie Liu, Katy, TX (US); Eric Thiessen, Katy, TX (US); Marcos Suguru Kajita, Houston, TX (US); Guillaume Tamboise, Houston, TX (US); Wilson Silva dos Santos, Jr., Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 963 days.

This patent is subject to a terminal disclaimer.

(21) Appl. No.: 16/645,836

(22) PCT Filed: Sep. 11, 2018

(86) PCT No.: PCT/US2018/050322
§ 371 (c)(1),
(2) Date: Mar. 10, 2020

(87) PCT Pub. No.: WO2019/051439
PCT Pub. Date: Mar. 14, 2019

(65) Prior Publication Data
US 2020/0277847 A1    Sep. 3, 2020

Related U.S. Application Data

(60) Provisional application No. 62/556,815, filed on Sep. 11, 2017.

(51) Int. Cl.
*E21B 44/00*    (2006.01)
*G05B 19/05*    (2006.01)
(Continued)

(52) U.S. Cl.
CPC .............. *E21B 44/00* (2013.01); *G05B 19/05* (2013.01); *G06Q 10/20* (2013.01);
(Continued)

(58) Field of Classification Search
CPC .......... E21B 44/00; G05B 19/05; G06Q 10/20
(Continued)

(56) References Cited

U.S. PATENT DOCUMENTS 8,121,971 B2    2/2012    Edwards et al.
9,322,247 B2    4/2016    Rojas et al.
(Continued)

FOREIGN PATENT DOCUMENTS

RU    82759 U1    5/2009
WO    2014099545 A2    6/2014

*Primary Examiner* — Md Azad
(74) *Attorney, Agent, or Firm* — Jeffrey D. Frantz

(57) ABSTRACT

A system may include a control system coupled to various network elements that define a drilling management network. The control system may include a programmable logic controller (PLC) that performs a drilling operation. The system may further include a virtualization services manager coupled to the control system and the network elements. The virtualization services manager may implement a virtualization service on the drilling management network that controls the drilling operation. The system may further include a virtual connection controller coupled to the network elements. The virtual connection controller may establish a virtual connection between the control system and a user network.

23 Claims, 39 Drawing Sheets

(51) Int. Cl.
   *G06Q 10/20*    (2023.01)
   *H04L 9/40*     (2022.01)
(52) U.S. Cl.
   CPC ........ *H04L 63/0272* (2013.01); *H04L 63/029* (2013.01); *G05B 2219/13125* (2013.01)
(58) Field of Classification Search
   USPC .......................................................... 700/275
   See application file for complete search history.

(56) References Cited

U.S. PATENT DOCUMENTS

| | | | |
|---|---|---|---|
| 9,359,882 | B2* | 6/2016 | Snyder .................... E21B 7/04 |
| 9,933,919 | B2 | 4/2018 | Raja et al. |
| 9,934,338 | B2 | 4/2018 | Germain et al. |
| 9,970,266 | B2* | 5/2018 | Marx .................... E21B 12/02 |
| 10,049,474 | B2 | 8/2018 | Germain et al. |
| 10,161,226 | B2 | 12/2018 | Bagnaro |
| 10,209,400 | B2 | 2/2019 | Bermudez Martinez et al. |
| 10,260,332 | B2 | 4/2019 | Israel et al. |
| 10,273,752 | B2 | 4/2019 | Mebane, III |
| 10,294,770 | B2 | 5/2019 | Anghelescu et al. |
| 10,301,923 | B2 | 5/2019 | Andresen et al. |
| 10,353,358 | B2 | 7/2019 | Tunc et al. |
| 10,392,918 | B2 | 8/2019 | Harkless et al. |
| 10,400,586 | B2 | 9/2019 | Bittar et al. |
| 10,513,920 | B2 | 12/2019 | Salminen et al. |
| 10,539,001 | B2 | 1/2020 | Kpetehoto et al. |
| 10,550,642 | B2 | 2/2020 | Zheng et al. |
| 10,579,231 | B1 | 3/2020 | Valleru et al. |
| 10,705,499 | B2 | 7/2020 | Rojas et al. |
| 10,954,773 | B2* | 3/2021 | Benson .................... E21B 44/04 |
| 2009/0132458 | A1* | 5/2009 | Edwards ................ G06N 5/025 |
| | | | 702/9 |
| 2009/0225630 | A1 | 9/2009 | Zheng et al. |
| 2011/0155461 | A1* | 6/2011 | Hutniak .................. E21B 44/00 |
| | | | 175/24 |
| 2011/0220410 | A1 | 9/2011 | Aldred et al. |
| 2012/0173218 | A1 | 7/2012 | Shafer et al. |
| 2012/0204142 | A1* | 8/2012 | Rubenstein ............... G06F 8/61 |
| | | | 717/173 |
| 2016/0222775 | A1 | 8/2016 | Tunc et al. |
| 2016/0290119 | A1 | 10/2016 | Tunc et al. |
| 2016/0290120 | A1 | 10/2016 | Zheng et al. |
| 2017/0114618 | A1 | 4/2017 | Fladmark et al. |
| 2017/0159372 | A1 | 6/2017 | Zheng et al. |
| 2017/0167200 | A1 | 6/2017 | Zheng et al. |
| 2018/0149010 | A1 | 5/2018 | Zheng et al. |
| 2018/0152319 | A1 | 5/2018 | Rojas et al. |
| 2018/0171760 | A1 | 6/2018 | Zheng et al. |
| 2018/0316730 | A1* | 11/2018 | Schaefer ............. H04L 41/0803 |
| 2018/0328159 | A1 | 11/2018 | Mandava et al. |
| 2018/0351952 | A1 | 12/2018 | Rojas et al. |
| 2018/0355700 | A1 | 12/2018 | Zheng et al. |
| 2018/0359130 | A1 | 12/2018 | Zheng et al. |
| 2018/0359339 | A1 | 12/2018 | Zheng et al. |
| 2019/0033845 | A1 | 1/2019 | Cella et al. |
| 2019/0356696 | A1 | 11/2019 | Rojas et al. |
| 2020/0057569 | A1 | 2/2020 | Rojas et al. |
| 2020/0059474 | A1 | 2/2020 | Rojas et al. |

\* cited by examiner

FIG. 8.1

Drilling Rig Controller 810

801 Current Time Attribute: 11:30 AM, Tuesday, February 21, 2017

802 Pending Requests: 821 User Joe's Request to Access Fuel Control PLC; 822 User Bill's Request to Access Electric Power PLC; 823 User Kathy's Request to Access Mud Treatment PLC

---

User Joe's Account 824

803 Permission Attributes:
- 811 Mud Pump PLC
- 812 Drilling Control PLC
- 813 Mud Treatment PLC 804 Time Window Attributes:
- 831 (General) Tuesday 9:00 AM – 12:00 PM
- 832 (General) Thursday 2:00 PM – 5:00 PM PLC Authorization Function 841
For User Joe's Request
DENIED

---

User Bill's Account 825

803 Permission Attributes:
- 814 Electric Power PLC
- 815 Fuel Control PLC

804 Time Window Attributes:
- 833 (Special – Electric Power PLC Only) Tuesday 11:00 AM – 1:00 PM
- 834 (Special – Fuel Control PLC Only) Thursday 8:00 AM – 5:00 PM PLC Authorization Function 841
For User Bill's Request
GRANTED

---

User Kathy's Account 828

803 Permission Attributes:
- 811 Mud Pump PLC,
- 813 Mud Treatment PLC

804 Time Window Attributes:
- 835 (General) Monday 10:00 AM – 1:00 PM
- 836 (General) Wednesday 2:00 PM – 5:00 PM PLC Authorization Function 841
For User Kathy's Request
DENIED

User Bill's User Device
851

Graphical User Interface
860

PLC Clock Display 870

871 Current Date: Tuesday, February 21, 2017
872 Current Time: 11:30 AM
873 Remaining Time: 1 Hour and 30 Minutes

Electric Power PLC Status Display
880

881 Current Status: Good
882 Current Power Usage at Permian Rig : 150 Kilowatts
883 Power Usage Past Seven Days : 2.1 Megajoules
884 Power Usage Past Thirty Days : 33.47 Megajoules

Electric Power PLC Command Panel
890

891 Disconnect Power to Mud Pump
892 Disconnect Power to Horizontal Drill
893 Max Power Settings for Permian Rig Equipment

*FIG. 8.2*

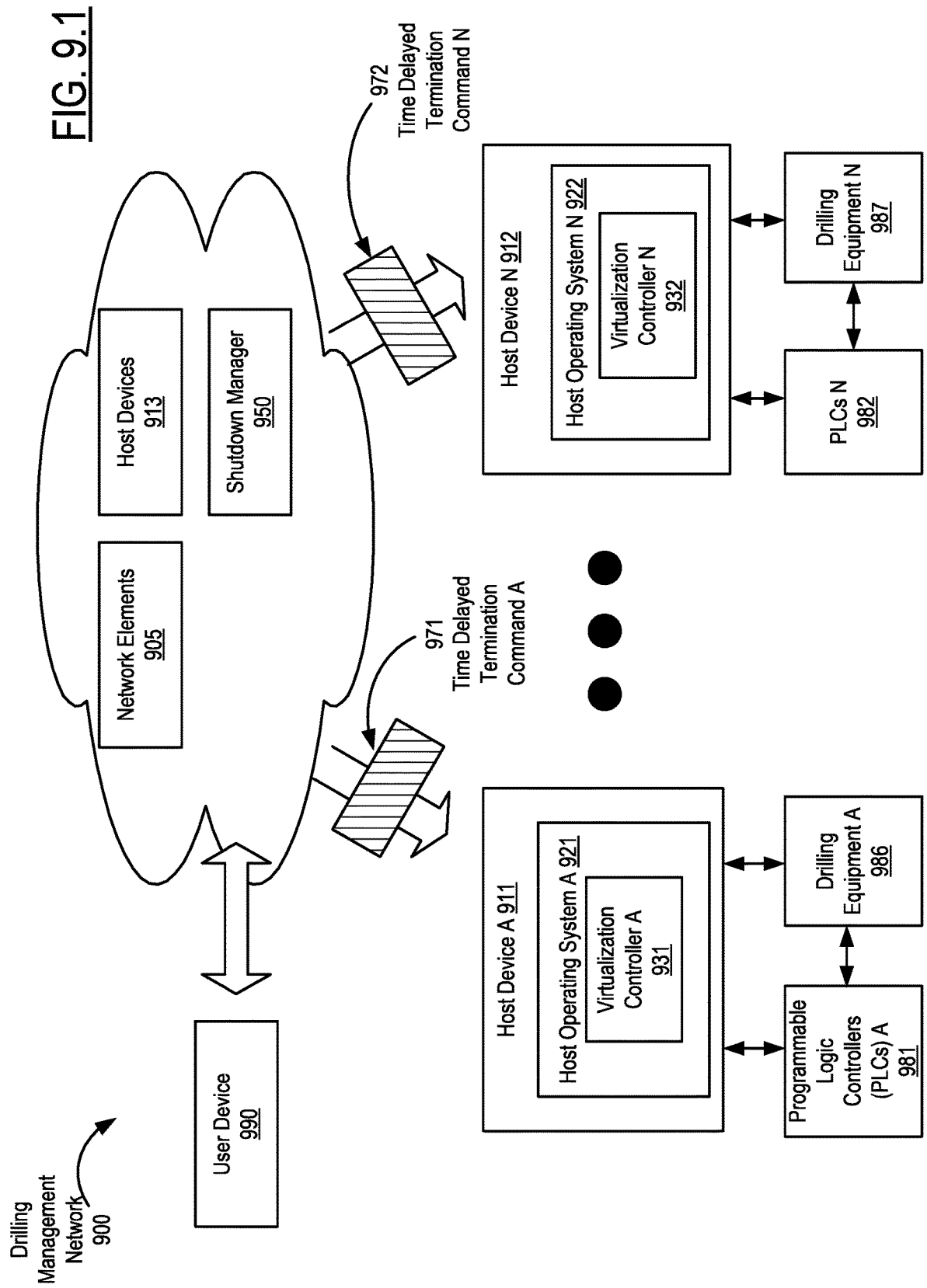

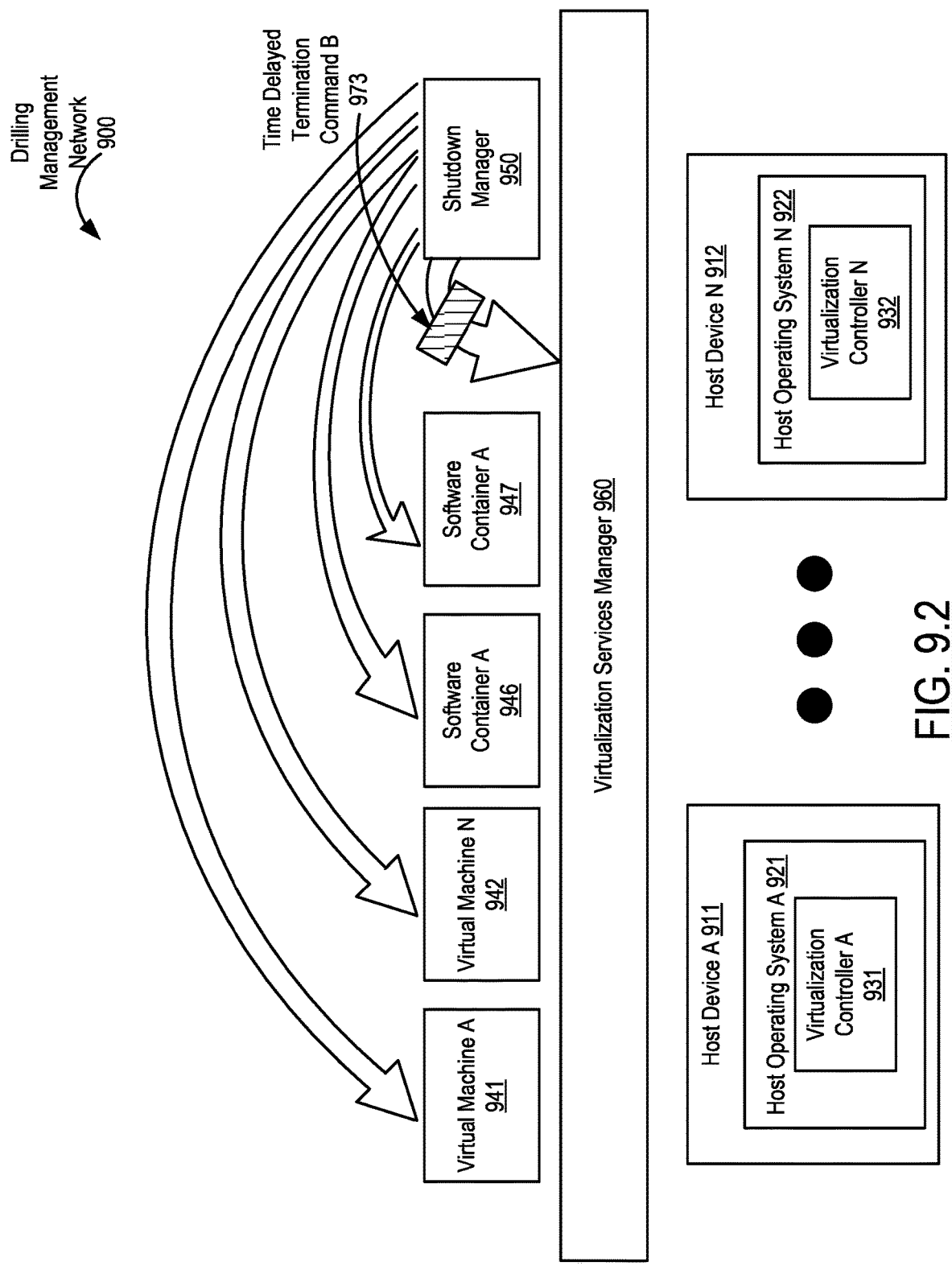
FIG. 9.2

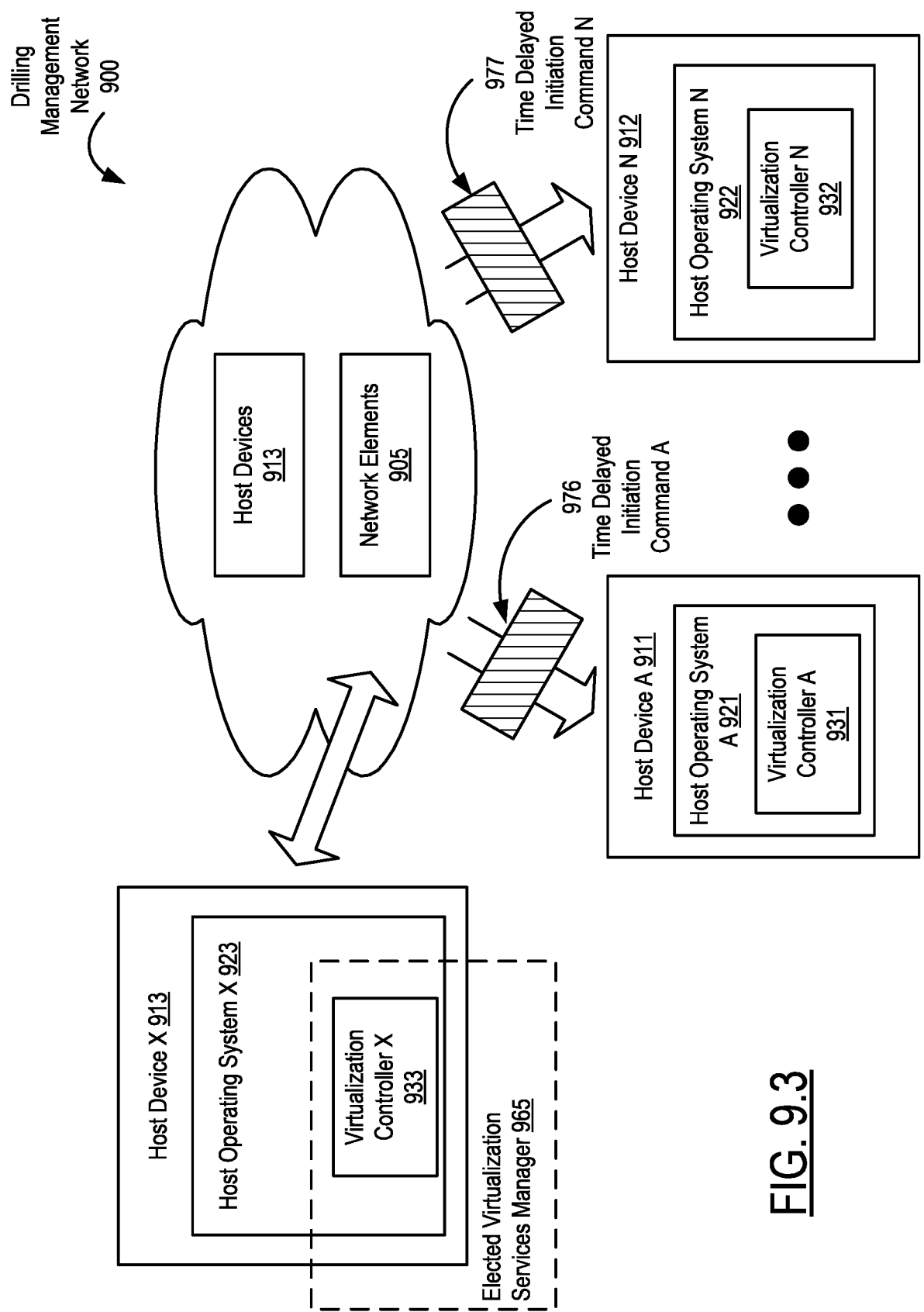
FIG. 9.3

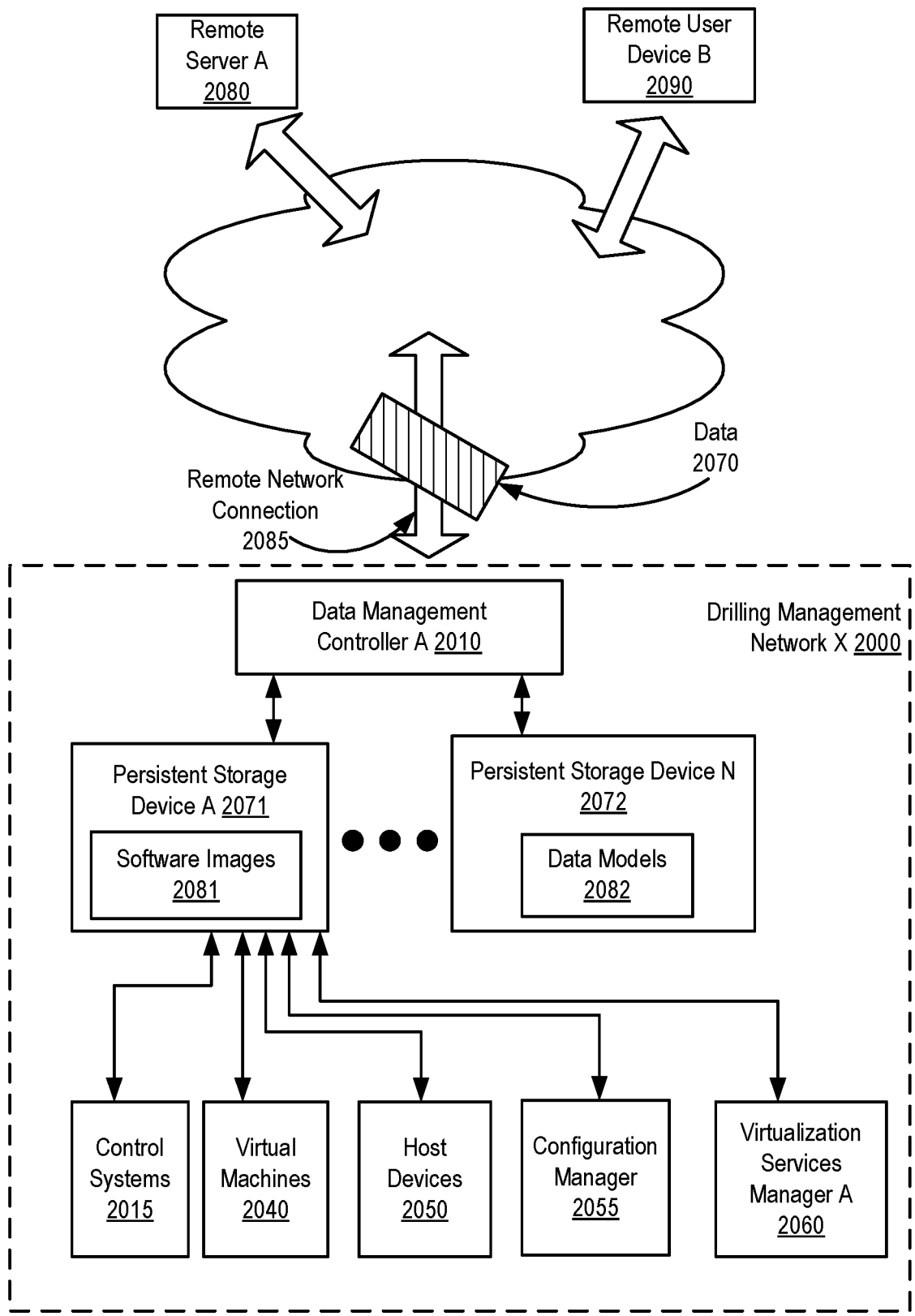
FIG. 20.1

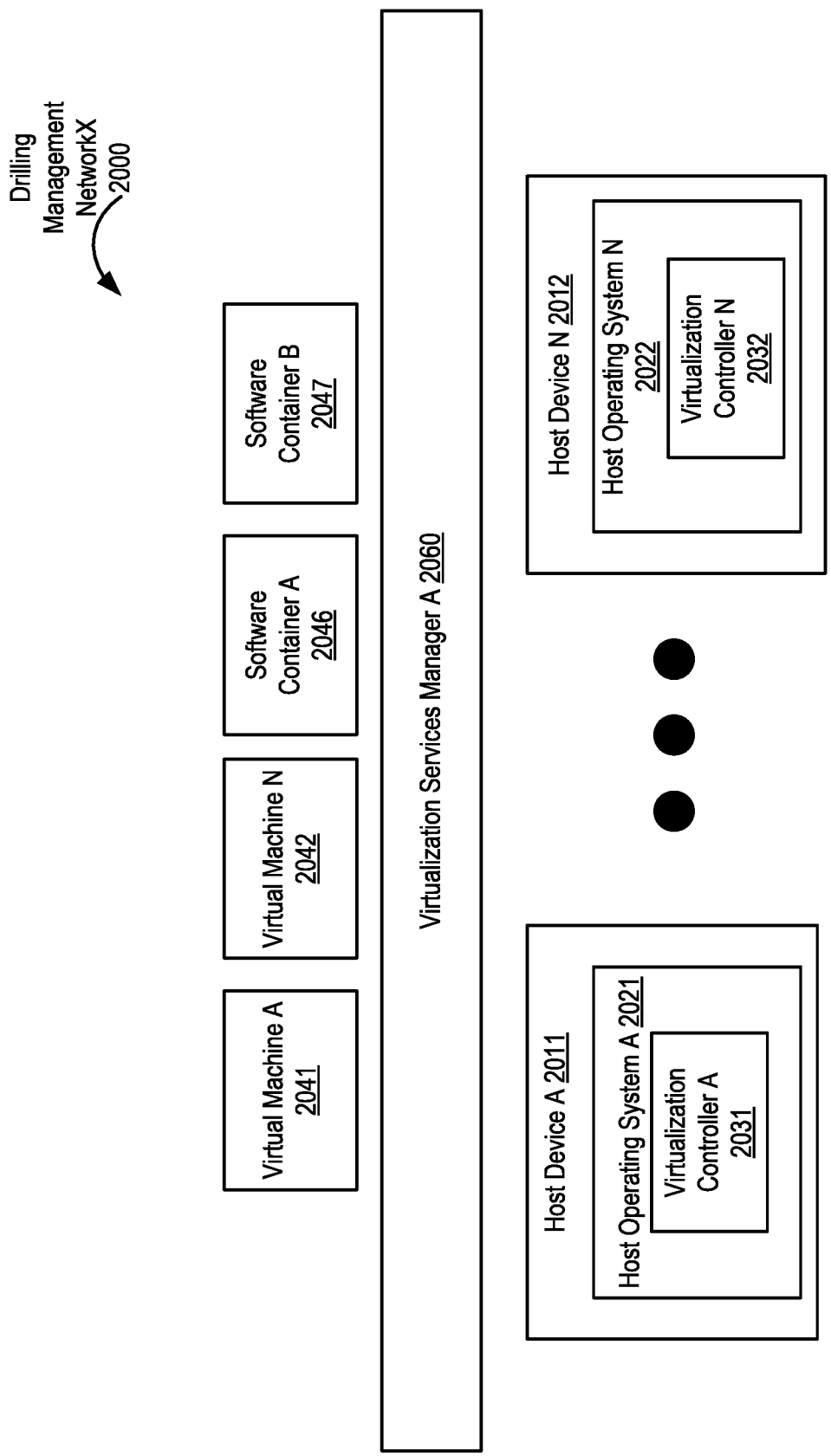
FIG. 20.2

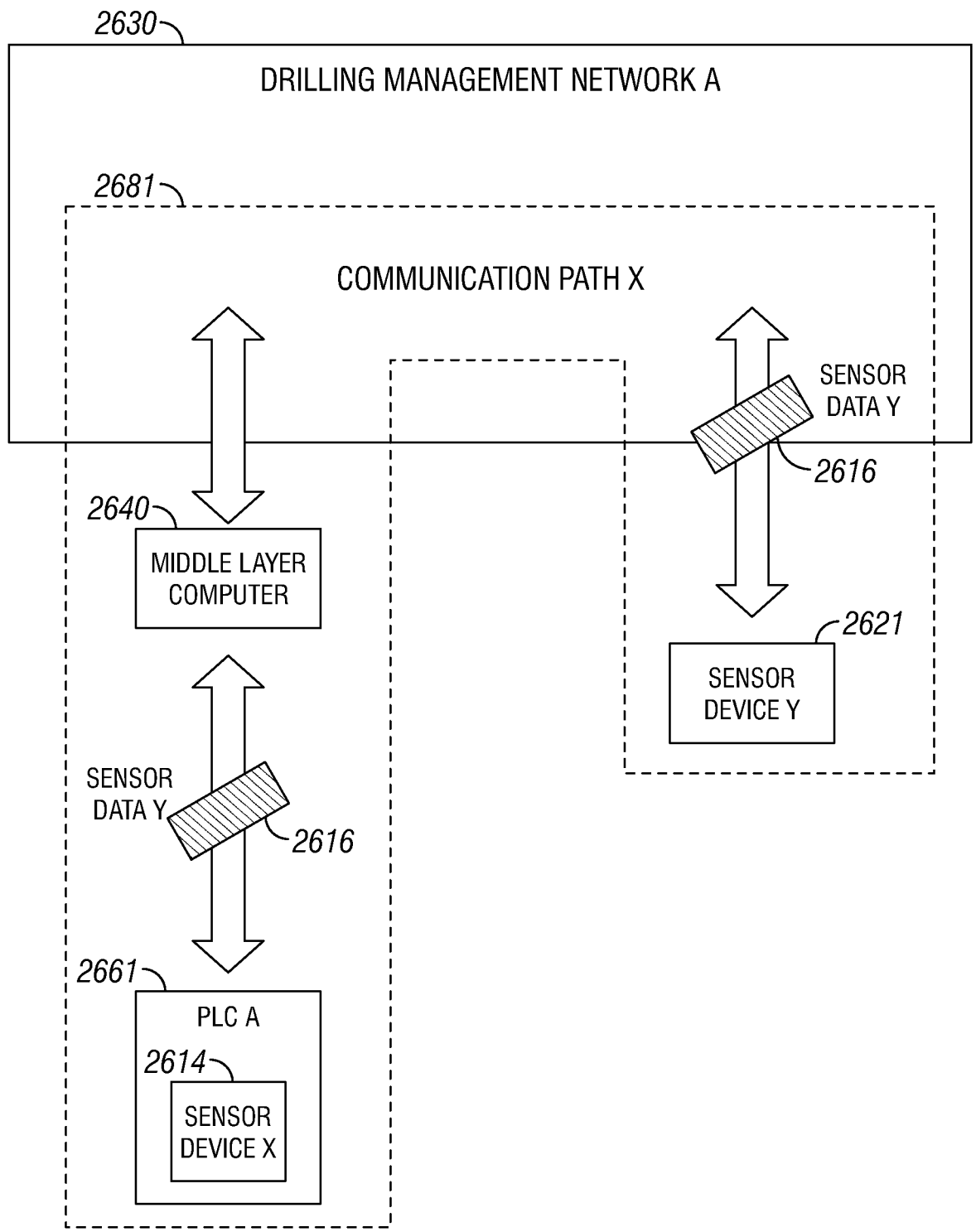
FIG. 26.1

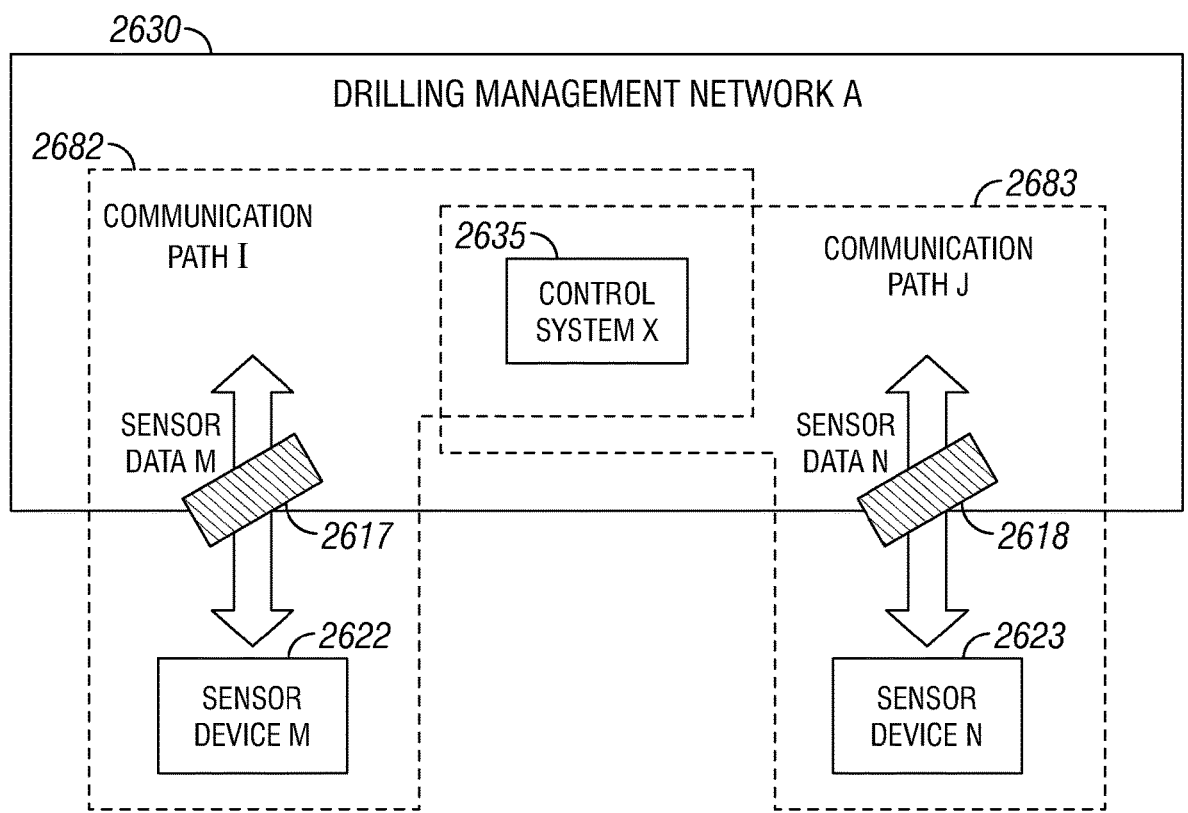
FIG. 26.2

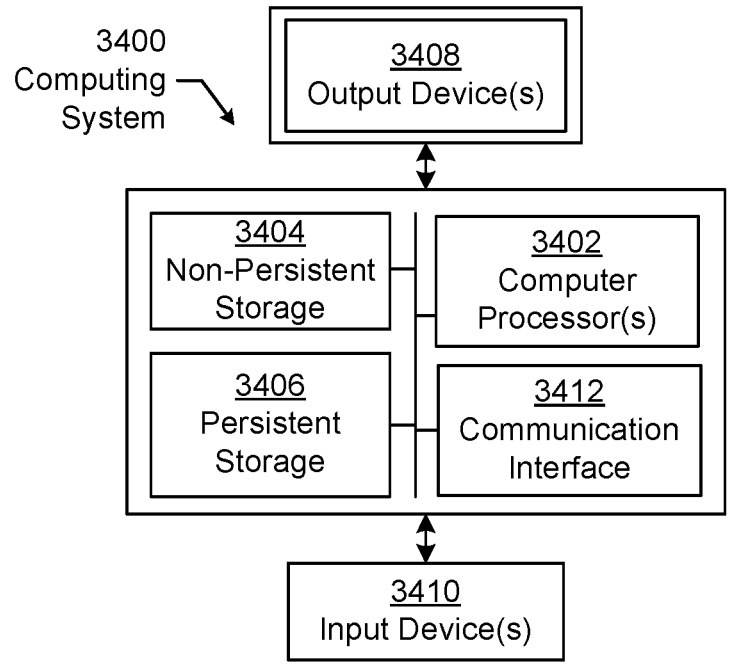
*FIG. 34.1*
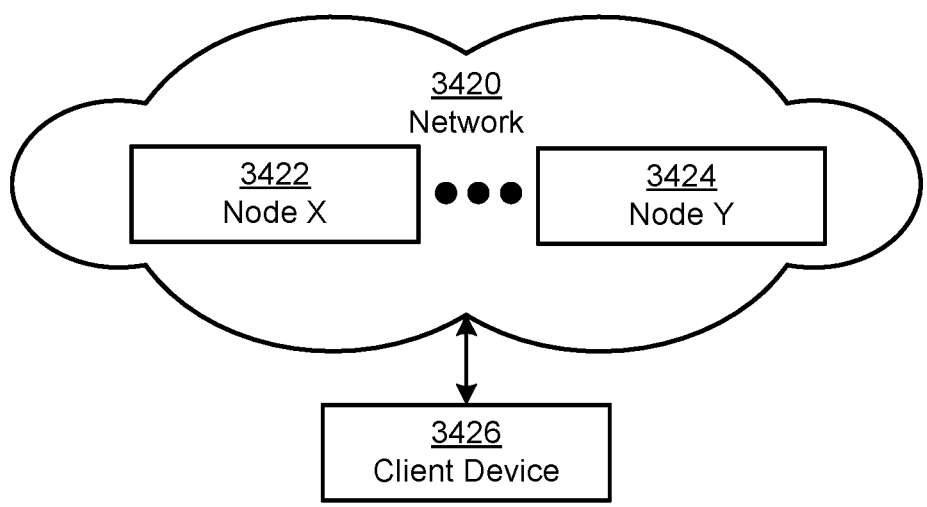
*FIG. 34.2*

SYSTEM AND METHOD FOR AUTOMATED DRILLING NETWORK

CROSS-REFERENCE TO RELATED APPLICATIONS

This application is a National Stage Entry of International Application No. PCT/US2018/050322, filed Sep. 11, 2018, which claims priority to United States Provisional Patent Application Ser. No. 62/556,815, titled "Rig Security", which was filed on Sep. 11, 2017, and is incorporated herein by reference in its entirety.

BACKGROUND

Various network devices may be disposed throughout a drilling rig in order to control various operations on the drilling rig. These network devices may control drilling equipment, monitor the performance of the drilling rig, and/or perform various maintenance operations with respect to the drilling rig. Accordingly, various problems exist in regard to effective enforcement of security protocols with respect to such network devices.

SUMMARY

In general, in one aspect, the disclosed technology relates to a system. The system includes a control system coupled to various network elements that define a drilling management network. The control system includes a programmable logic controller (PLC) that performs a drilling operation. The system further includes a virtualization services manager coupled to the control system and the network elements. The virtualization services manager implements a virtualization service on the drilling management network that controls the drilling operation. The system further includes a virtual connection controller coupled to the network elements. The virtual connection controller establishes a virtual connection between the control system and a user network.

In general, in one aspect, the disclosed technology relates to a system including a control system coupled to a first set of network elements that define a first security zone in a drilling management network. The control system includes a programmable logic controller (PLC) that performs a drilling operation. The system further includes a virtualization services manager coupled to the control system and the first set of network elements. The virtualization services manager implements a virtualization service on the drilling management network that controls the drilling operation. The system further includes a firewall device coupled to the first security zone and a second security zone including a second set of network elements. The drilling management network reconfigures, in response to validating a network device, the first security zone to enable the network device to communicate with a destination device in the second security zone.

In general, in one aspect, the disclosed technology relates to a system. The system includes a control system coupled to various network elements that define a drilling management network. The control system includes a programmable logic controller (PLC) that performs a drilling operation. The system further includes a virtualization services manager coupled to the control system and the network elements. The virtualization services manager implements a virtualization service on the drilling management network that controls the drilling operation. The system further includes a configuration manager coupled to the network elements and the control system. The configuration manager installs an update on the control system using a security agent on the control system.

Other aspects of the disclosure will be apparent from the following description and the appended claims.

BRIEF DESCRIPTION OF DRAWINGS

FIGS. 1, 2, 4, 9.1, 9.2, 9.3, 13, 16, 17, 20.1, 20.2, 24, and 28 show systems in accordance with one or more embodiments.

FIGS. 6, 8.1, 8.2, 12, 14, 23, 26.1, 26.2, 31, 32, and 33 show examples in accordance with one or more embodiments.

FIGS. 34.1 and 34.2 show a computing system in accordance with one or more embodiments.

DETAILED DESCRIPTION

Figure 1:
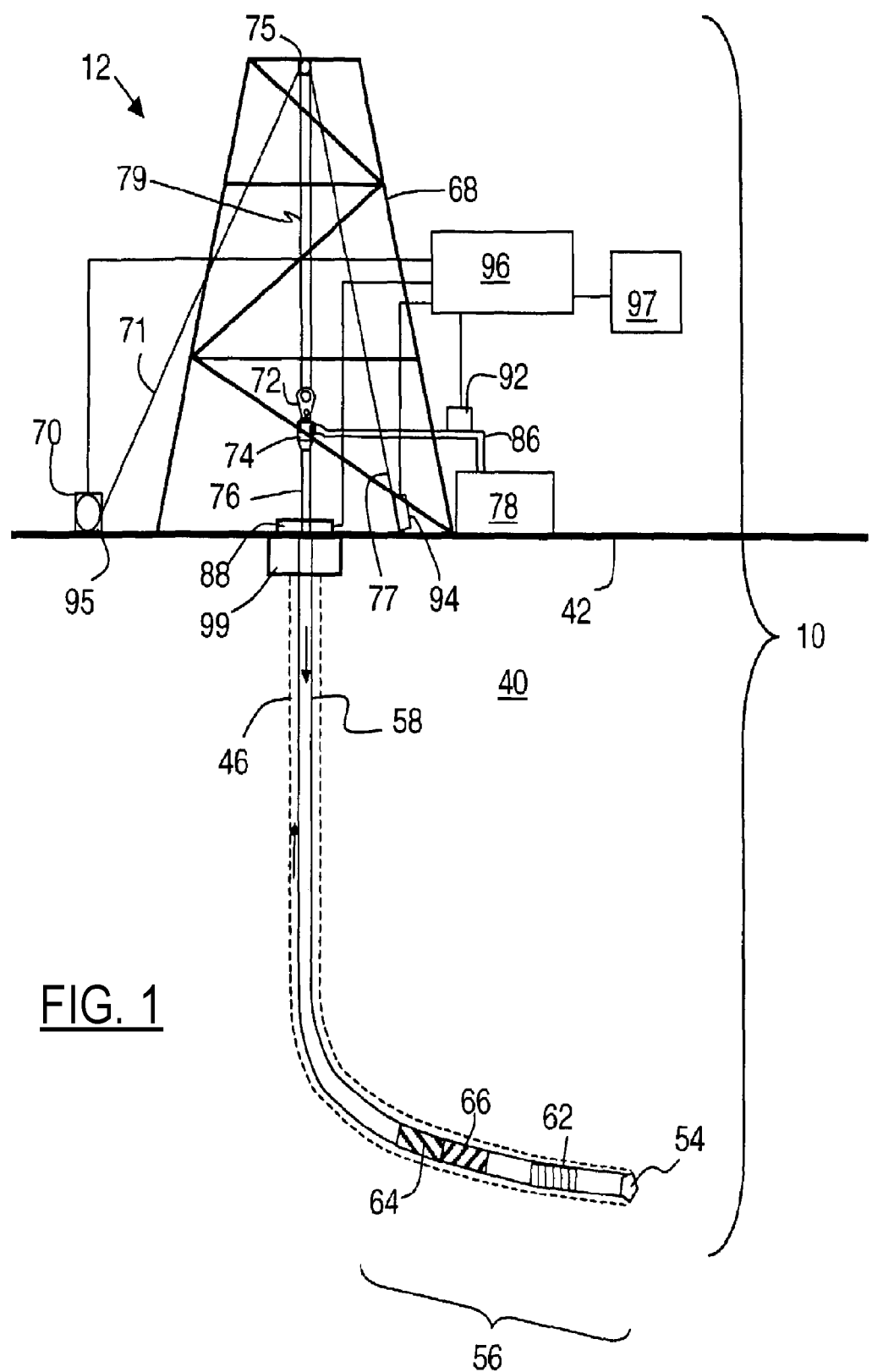

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include various systems and various methods for operating a drilling management network. In particular, one or more embodiments are directed to a drilling management network that includes various control systems with programmable logic controllers (PLCs). In particular, a virtualization services manager operating on the network may generate virtual machines and/or software containers in a virtualization services layer. These virtual machines and/or software containers may perform one or more drilling operations and/or maintenance operations.

Furthermore, the drilling management network may include a configuration manager, a coordinated controller, and/or other network devices for automating and/or prioritizing various processes being performed on the drilling management network. As such, the disclosed technology describes various implementations that may provide solutions to problems specific to operating conditions associated with a drilling management network. Accordingly, one or more methods of the disclosed technology may fill in the gaps between control process automation found in various industries and those situations particular to a drilling management network.

FIG. 1 shows a block diagram of a system in accordance with one or more embodiments. FIG. 1 shows a drilling system (10) according to one or more embodiments. Drill string (58) is shown within borehole (46). Borehole (46) may be located in the earth (40) having a surface (42). Borehole (46) is shown being cut by the action of drill bit (54). Drill bit (54) may be disposed at the far end of the bottom hole assembly (56) that is attached to and forms the lower portion of drill string (58). Bottom hole assembly (56) may include a number of devices including various subassemblies. Measurement-while-drilling (MWD) subassemblies may be included in subassemblies (62). Examples of MWD measurements may include direction, inclination, survey data, downhole pressure (inside the drill pipe, and/or outside and/or annular pressure), resistivity, density, and porosity. Subassemblies (62) may also include a subassembly for measuring torque and weight on the drill bit (54). The signals from the subassemblies (62) may be processed in a processor (66). After processing, the information from processor (66) may be communicated to pulser assembly (64). Pulser assembly (64) may convert the information from the processor (66) into pressure pulses in the drilling fluid. The pressure pulses may be generated in a particular pattern which represents the data from the subassemblies (62). The pressure pulses may travel upwards though the drilling fluid in the central opening in the drill string and towards the surface system. The subassemblies in the bottom hole assembly (56) may further include a turbine or motor for providing power for rotating and steering drill bit (54).

The drilling rig (12) may include a derrick (68) and hoisting system, a rotating system, and/or a mud circulation system, for example. The hoisting system may suspend the drill string (58) and may include draw works (70), fast line (71), crown block (75), drilling line (79), traveling block and hook (72), swivel (74), and/or deadline (77). The rotating system may include a kelly (76), a rotary table (88), and/or engines (not shown). The rotating system may impart a rotational force on the drill string (58). Likewise, the embodiments shown in FIG. 1 may be applicable to top drive drilling arrangements as well. Although the drilling system (10) is shown being on land, those of skill in the art will recognize that the described embodiments are equally applicable to marine environments as well.

The mud circulation system may pump drilling fluid down an opening in the drill string. The drilling fluid may be called mud, which may be a mixture of water and/or diesel fuel, special clays, and/or other chemicals. The mud may be stored in mud pit (78). The mud may be drawn into mud pumps (not shown), which may pump the mud though stand pipe (86) and into the kelly (76) through swivel (74), which may include a rotating seal. Likewise, the described technologies may also be applicable to underbalanced drilling. If underbalanced drilling is used, at some point prior to entering the drill string, gas may be introduced into the mud using an injection system (not shown).

The mud may pass through drill string (58) and through drill bit (54). As the teeth of the drill bit (54) grind and gouge the earth formation into cuttings, the mud may be ejected out of openings or nozzles in the drill bit (54). These jets of mud may lift the cuttings off the bottom of the hole and away from the drill bit (54), and up towards the surface in the annular space between drill string (58) and the wall of borehole (46).

At the surface, the mud and cuttings may leave the well through a side outlet in blowout preventer (99) and through mud return line (not shown). Blowout preventer (99) comprises a pressure control device and a rotary seal. The mud return line may feed the mud into one or more separator (not shown) which may separate the mud from the cuttings. From the separator, the mud may be returned to mud pit (78) for storage and re-use.

Various sensors may be placed on the drilling rig (12) to take measurements of the drilling equipment. In particular, a hookload may be measured by hookload sensor (94) mounted on deadline (77), block position and the related block velocity may be measured by a block sensor (95) which may be part of the draw works (70). Surface torque may be measured by a sensor on the rotary table (88). Standpipe pressure may be measured by pressure sensor (92), located on standpipe (86). Signals from these measurements may be communicated to a surface processor (96) or other network elements (not shown) disposed around the drilling rig (12). In addition, mud pulses traveling up the drillstring may be detected by pressure sensor (92). For example, pressure sensor (92) may include a transducer that converts the mud pressure into electronic signals. The pressure sensor (92) may be connected to surface processor (96) that converts the signal from the pressure signal into digital form, stores and demodulates the digital signal into useable MWD data. According to various embodiments described above, surface processor (96) may be programmed to automatically detect one or more rig states based on the various input channels described. Processor (96) may be programmed, for example, to carry out an automated event detection as described above. Processor (96) may transmit a particular rig state and/or event detection information to user interface system (97) which may be designed to warn various drilling personnel of events occurring on the rig and/or suggest activity to the drilling personnel to avoid specific events. As described below, one or more of these equipments may be operated by a drilling management network coupled to the drilling rig (12). For example, the drilling management network (210) described below in FIG. 2 may automate one or more drilling processes associated with these equipments without manual human intervention.

Figure 2:
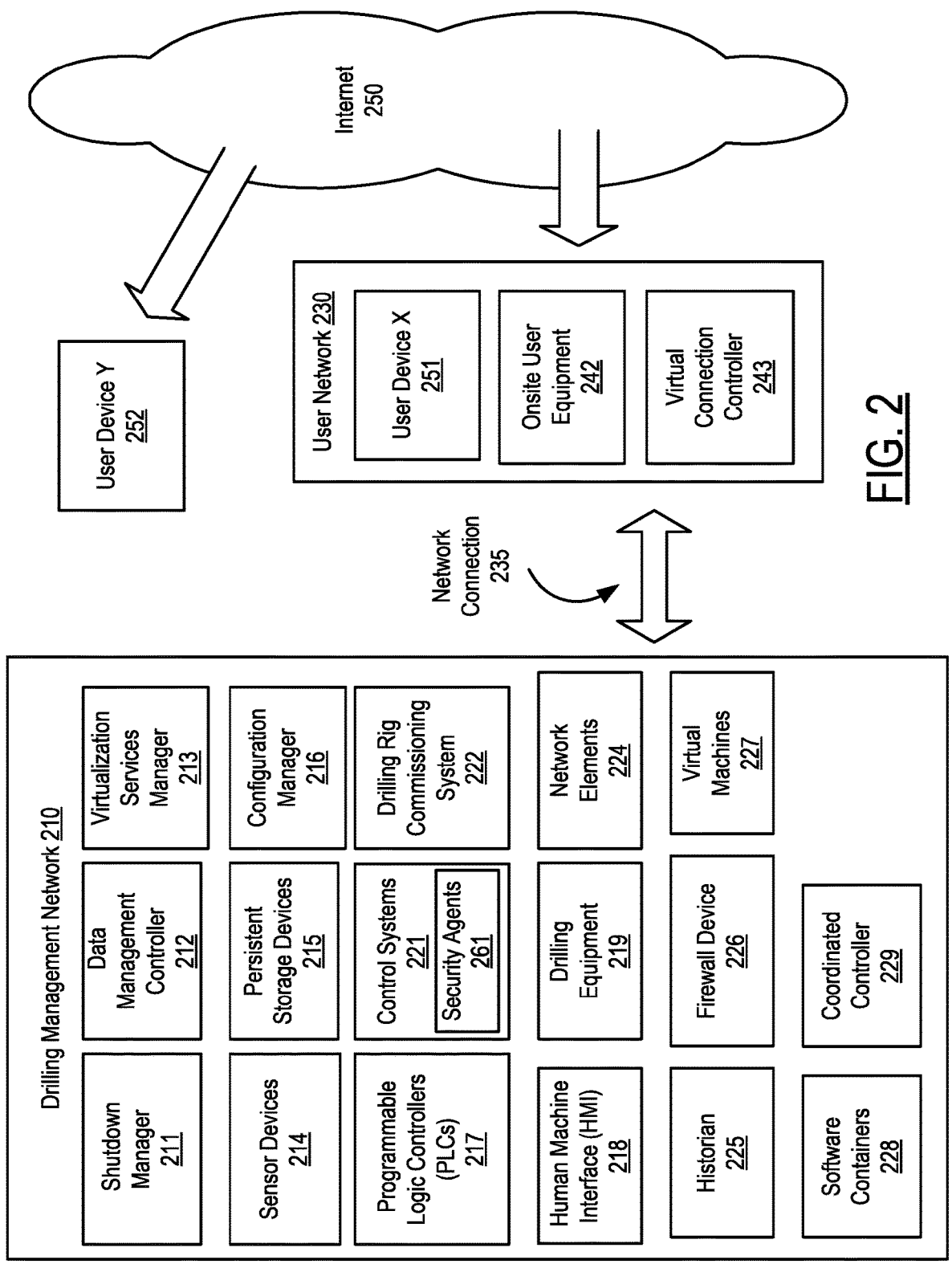

Turning to FIG. 2, FIG. 2 shows a block diagram of a system in accordance with one or more embodiments. As shown in FIG. 2, a drilling management network (210) may include a human machine interface (HMI) (e.g., HMI (218)), a historian (e.g., historian (225)), various network elements (e.g., network elements (224)). A human machine interface may be hardware and/or software coupled to the drilling management network (210), and which is configured for presenting data and/or receiving inputs from a user regarding various drilling operations and/or maintenance operations performed within the drilling management network (210). For example, a human machine interface may include software to provide a graphical user interface (GUI) for presenting data and/or receiving control commands for operating a drilling rig. A historian may be hardware and/or software that is configured for recording events occurring in the drilling management network. For example, a historian may store the time and description of events associated with equipment and/or control systems, sensor measurements, and/or operating parameters as historic records, such as for troubleshooting. A network element may refer to various hardware components within a network, such as switches, routers, hubs, user equipment, or any other logical entities for uniting one or more physical devices on the network.

In one or more embodiments, the drilling management network (210) includes drilling equipment (e.g., drilling equipment (219), the blowout preventer (99), the drilling rig (12), and other components described above in FIG. 1 and the accompanying description) and various physical components affiliated with the drilling equipment, e.g., for measuring and/or controlling the drilling equipment. The drilling management network (210) may further include control systems (e.g., control systems (221)) such as various drilling operation control systems and/or various maintenance control systems that are deterministic network portions. Drilling operation control systems and/or maintenance control systems may include, for example, programmable logic controllers (PLCs) (e.g., PLCs (217)) that include hardware and/or software configured to control one or more processes performed by a drilling rig, including, but not limited to the components described in FIG. 1. Specifically, a programmable logic controller may control valve states, fluid levels, pipe pressures, warning alarms, and/or pressure releases throughout a drilling rig. For more information on control systems in a drilling management network, see U.S. patent application Ser. No. 14/788,124, titled "Rig Control System", which was filed on Jun. 30, 2015, published as US 2016/0290119, and U.S. patent application Ser. No. 14/788, 038, titled "Unified Control System for Drilling Rigs", which was filed on Jun. 30, 2015, published as US 2016/0222775, and U.S. patent application Ser. No. 14/754,901, titled "Drilling Control System", which was filed on Jun. 30, 2015, published as US 2016/0290120. Each of the published patent applications is incorporated herein by reference in its entirety.

Moreover, a programmable logic controller may be a ruggedized computer system configured to withstand vibrations, extreme temperatures, wet conditions, and/or dusty conditions, for example, around a drilling rig. Drilling operation control systems and/or maintenance control systems may also refer to control systems that include multiple PLCs within the drilling management network. Furthermore a control system may be a closed loop portion of a drilling management network that is configured to control operations within a system, assembly, and/or subassembly described above in FIG. 1 and the accompanying description. A PLC may transmit PLC data to one or more devices coupled to the drilling management network and/or a user network. PLC data may include sensor measurements, status updates, and/or information relating to drilling operations and/or maintenance operations. Likewise, one or more of the control systems (e.g., control systems (221)) may be configured to monitor and/or perform various drilling processes with respect to the mud circulation system, the rotating system, a pipe handling system, and/or various other drilling activities described with respect to FIG. 1 and the accompanying description.

Furthermore, a drilling management network may be coupled to a user network (e.g., user network (230)). In particular, a user network may include various network elements, user devices (e.g., user device X (251)), and/or onsite user equipment (e.g., onsite user equipment (242)). For example, onsite user equipment may include phone systems, personal computers, printers, application servers, and/or file servers located around a drilling rig. User devices may also be coupled to a drilling management network, where user devices may include personal computers, smartphones, human machine interfaces, and any other devices coupled to a network that obtain inputs from one or more users. Network elements, HMIs, historians, onsite user equipment, user devices, and/or other network devices may include computing systems similar to the computing system (3400) described in FIGS. 34.1 and 34.2, and the accompanying description.

In some embodiments, a virtual connection controller (e.g., virtual connection controller (243)) controls access to a drilling management network. The virtual connection controller may be hardware and/or software that is configured to establish a virtual connection (e.g., network connection (235)) between a user network (e.g., user network (230)) and a drilling management network (e.g., drilling management network (210)). The virtual connection may be, for example, a data link layer connection between two adjacent network elements, such as two network switches. In other embodiments, the virtual connection may be a point-to-point connection over multiple network nodes. Likewise, a virtual connection controller may be a virtual machine (VM), a software container, or a physical network element located in a user network. For example, the virtual connection controller (243) may be a jump host or a network element that communicates with a jump host on the user network (230). In some embodiments, a drilling management network includes multiple jump hosts for different security zones, such as control zones, e.g., where a virtual connection controller communicates with each jump host based on where one or more virtual connections are established. In one or more embodiments, for example, the virtual connection controller is configured to power on and/or power off a jump host that provides communication with devices on a drilling management network.

In one or more embodiments, a virtual connection controller is located on a user network (e.g., user network (230)). Likewise, in some embodiments, the virtual connection controller includes hardware and/or software distributed over multiple network elements in the user network and the drilling management network. In one or more embodiments, for example, the virtual connection controller is a jump host that is configured for managing security within the drilling management network. In particular, the drilling management network may be a separate security zone from the user network. For more information on the virtual connection controller, see the section titled Virtual Connection Controller below and the accompanying description.

In some embodiments, a drilling management network includes a virtualization services manager (e.g., virtualization services manager (213)). A virtualization services manager may include hardware and/or software that is configured for generating, terminating, monitoring, and/or managing one or more virtual machines (e.g., virtual machines (227)) and/or software containers (e.g., software containers (228)) operating on a virtualization services layer of a drilling management network. In some embodiments, a virtualization services manager includes a hypervisor for managing one or more virtualized environments on a drilling management network. For example, virtualization services may include network processes that control drilling operations and/or maintenance operations implemented in one or more network layers on the drilling management network, e.g., where virtual machines and/or software containers operate on the network layers. Rather than implementing a virtual machine or software container on a single host device, for example, virtualization services may be implemented using a virtual machine or software container that operates on multiple host devices. For more information on the virtual services manager, see the sections titled "Shutdown and Startup Management" and "Secure Data Replication" below and the accompanying descriptions.

In some embodiments, a drilling management network includes a coordinated controller (e.g., coordinated controller (229)). For example, the coordinated controller may communicate with a virtualization services manager to prioritize various automated operations, such as drilling operations and/or maintenance operations, on the drilling management network. For more information on the coordinated controller, see the section titled "Configuration Manager and Coordinated Controller" below and the accompanying descriptions.

In some embodiments, a drilling management network includes a shutdown manager (e.g., shutdown manager (211)). A shutdown manager may be hardware and/or software that is configured for initiating terminating operations at one or more host devices, one or more virtual machines, one or more software containers, one or more virtualization controllers, and/or a virtualization services manager. In one or more embodiments, the virtualization services manager and the shutdown manager are the same software application or network device. For example, a shutdown manager may be configured for monitoring environmental variables and other network variables for different systems on a drilling management network. As such, in response to various triggers associated with the environmental variables and network variables, the shutdown manager may initiate a coordinated process based on established rules to perform a complete shutdown of the control system or subsystems in the drilling management network. For more information on the shutdown manager, see the section titled "Shutdown and Startup Management" below and the accompanying description.

In some embodiments, different components of a drilling management network are stratified into various security zones, e.g., a control zone and a management zone. Specifically, different security zones may be coupled using a firewall device (e.g., firewall device (226)). For example, a firewall device may include hardware and/or software configured to filter data packets transmitted between a control zone and a management zone. Specifically, a firewall device may perform a packet inspection at one or more network layers, such as the transport layer, and/or the application layer of a drilling management network. In particular, the firewall device may analyze a packet and/or an application sending a packet to determine whether communication is authorized between a source device and a destination device in different security zones. In some embodiments, packet authorization is determined using certificate-based authentication. For example, network devices in control zones and management zones may be assigned security certificates that may be stored in the network devices. A firewall device may be configured to act as an authentication server to determine whether a security certificate has expired and/or whether a source device (e.g., a configuration manager (216)) is authorized to communicate with a destination device, such as a historian, control system, user device, virtual machine, etc. For more information on managing network communication within a control zone, see the section titled "Control System Cybersecurity" below and the accompanying description. Likewise, for more information on firewall devices and drilling management network communication, see U.S. patent application Ser. No. 15/361,781, titled "Well Construction Site Communications Network", which was filed on Nov. 28, 2016, published as US 2018/0152319, which is incorporated herein by reference in its entirety.

In some embodiments, one or more network devices in a control zone include one or more security agents (e.g., security agents (261)). A security agent may include hardware and/or software configured to operate as a local entity on a host network device within a control zone. For example, a security agent may be located on a human machine interface, a historian, one or more control systems, etc. Accordingly, a security agent may be configured to enforce security rules and access control policies on a respective network device. Thus, a security agent may communicate with a configuration manager (e.g., configuration manager (216)) and/or an application manager across a firewall device in order to administer software installations and/or software processes on its host network device. Moreover, a configuration manager may be hardware and/or software that is configured for managing software installations for one or more devices in the drilling management network. For example, a configuration manager may detect a software update for a control system and coordinate the installation of the software update with a security agent in the control system. For more information on security agents and configuration managers, see the sections titled "Control System Cybersecurity" and "Configuration Manager and Coordinated Controller" below and the accompanying descriptions.

In some embodiments, a drilling management network includes a data management controller (e.g., data management controller (212)) coupled to various persistent storage devices (e.g., persistent storage devices (215)). A persistent storage device may include hardware and/or software that is configured to implement nonvolatile data storage. For example, a persistent storage device may include a persistent disk, such as a hard disc drive and/or a solid state drive in a central data repository. In one or more embodiments, a data management controller includes hardware and/or software that is configured for managing storage and/or retrieval of data with respect to various persistent storage devices. For example, the data management controller may be part of a central data repository that includes various persistent storage devices in a drilling management network. Likewise, the data management controller may establish one or more network connections to one or more remote devices (e.g., user device Y (252)). As such, the data management controller may administer the transfer of data between a remote device and the drilling management network over the Internet (e.g., Internet (250)). For more information on the data management controller and persistent storage devices, see the section titled "Secure Data Replication" below and the accompanying description.

In some embodiments, a drilling management network includes a drilling rig commissioning system (e.g., drilling rig commissioning system (222)). For example, a drilling rig commissioning system may generate a knowledge graph that describes a control system and sub-systems in the control system. Accordingly, using the knowledge graph, a drilling rig commissioning system may automatically commission a control system for drilling operations and/or maintenance operations within a drilling management network. For more information on knowledge graphs and the drilling rig commissioning system, see the section titled "Intelligent Drilling Control System Commissioning" below and the accompanying description.

While FIGS. 1 and 2 show various configurations of components, other configurations may be used without departing from the scope of the disclosure. For example, various components in FIGS. 1 and 2 may be combined to create a single component. In another example, components shown in the user network (230) may also be located in the drilling management network (210), and components shown in the drilling management network (210) may also be located in the user network (230). As another example, the functionality performed by a single component may be performed by two or more components.

Moreover, various components in FIGS. 1 and 2 are described as being "configured" with a particular type of functionality. As such, being "configured" herein may reference specific computer-readable instructions located in software, e.g., firmware within a physical device, that perform one or more methods as disclosed herein. Likewise, "configured" may also reference specific configurations, settings, parameters, and other stored variables that define a particular function performed by hardware and/or software. For example, hardware registers may be configured with specific values that determine a type and/or mode of operation by a hardware device. Thus, various network devices may be configured to implement a specific affirmative operation with a drilling management and/or a user network. Furthermore, "configured" may also reference hardware and/or software protocols that define physical interactions between components inside and/or outside a network.

Figure 3:
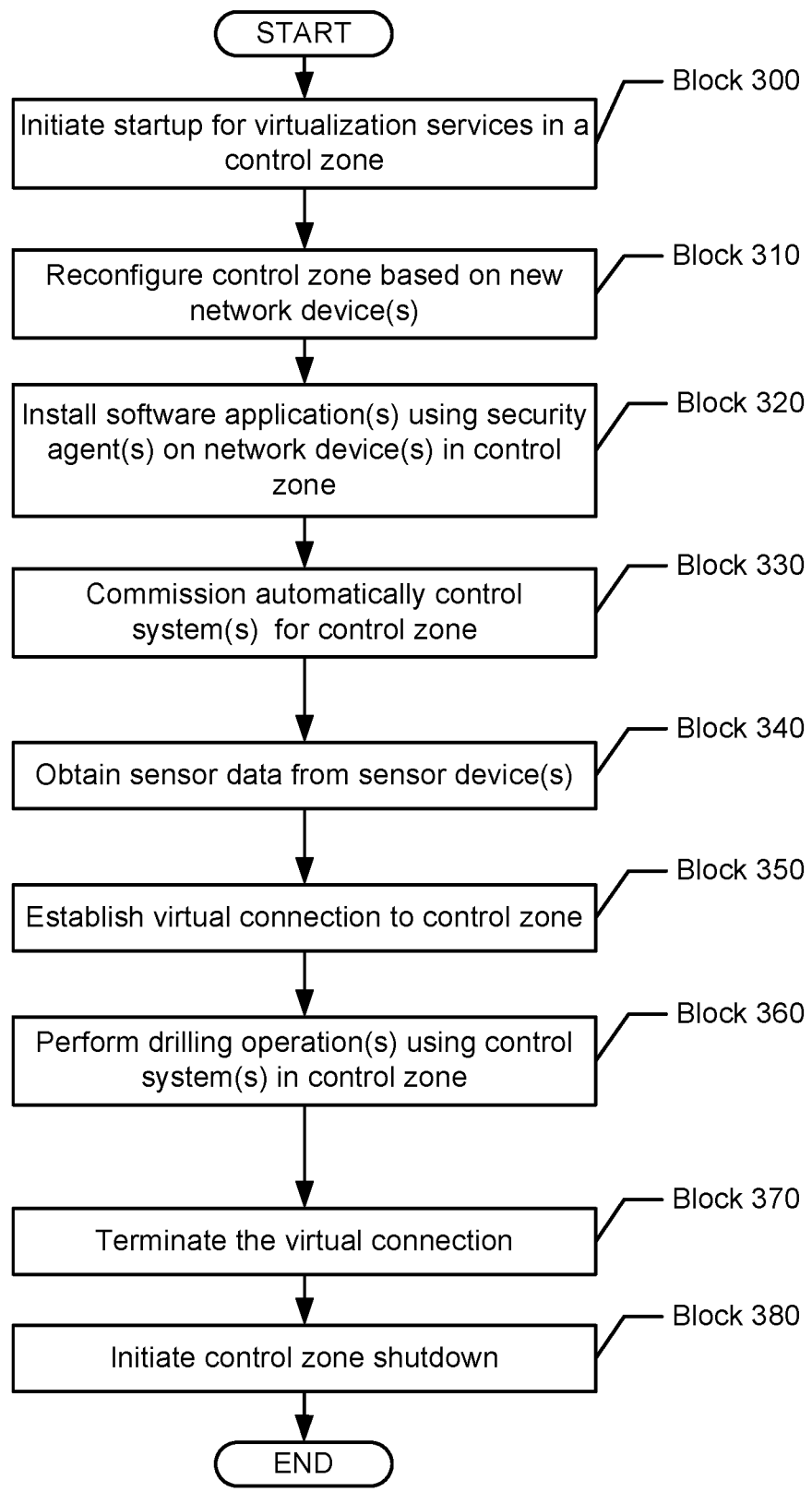
FIGS. 3, 5, 7, 10, 11, 15, 18, 19, 21, 22, 25, 27, 29, and 30 show flowcharts in accordance with one or more embodiments.

Turning to FIG. 3, FIG. 3 shows a flowchart in accordance with one or more embodiments. Specifically, FIG. 3 describes a method for operating a drilling management network. One or more blocks in FIG. 3 may be performed by one or more components (e.g., virtual connection controller (243)) as described in FIGS. 1 and/or 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, a startup is initiated for various virtualization services in a control zone in accordance with one or more embodiments. For example, components in a drilling management network may include functionality for performing various methods for initiating an automated startup process. In particular, various virtualization controllers operating in various host devices may elect a virtualization services manager from their group. Accordingly, the virtualization services manager may regulate the automated startup process of various virtualization services, virtual machines, and/or software containers through the drilling management network using time delayed initiation commands. For more information on the automated startup process, see FIG. 11 and the section titled "Shutdown and Startup Management" below and the accompanying description.

In Block 310, a control zone is reconfigured based on one or more new network devices in accordance with one or more embodiments. In some embodiments, network communication for various devices inside a control zone is limited to predetermined associations. In other words, a network device may be allowed in a control zone to communicate only with certain authorized devices. For example, when a new network device is added to a control zone, the new network device may be validated in order to determine which devices inside and/or outside the control zone are authorized to communicate with the new network device. Accordingly, the control zone may be reconfigured, e.g., using network elements and/or firewall devices, to implement the authorized communication. For more information on reconfiguring and controlling communication in a control zone, see FIG. 18 and the section titled "Control System Cybersecurity" below and the accompanying description.

In Block 320, one or more software applications are installed on one or more network devices in a control zone using one or more security agents in accordance with one or more embodiments. For example, a drilling management network may include a configuration manager that communicates with a security agent. The security agent may be located in a network device within a control zone, while the configuration manager may be located in a management zone outside a control zone. Thus, the configuration manager may detect software updates for software applications operating within the control zone, e.g., software applications for providing virtualization services through virtual machines, software containers, control systems, etc. Accordingly, the configuration manager may coordinate with security agents to install software installation files, e.g., what days and times a network device is not being used to perform drilling and/or maintenance operations. For more information on installing software on network devices in a control zone, see FIG. 19 and the section titled "Control System Cybersecurity" below and the accompanying description.

In Block 330, one or more control systems are automatically commissioned for a control zone in accordance with one or more embodiments. For example, a drilling rig commissioning system in the drilling management network may generate a knowledge graph. Using the knowledge graph, the drilling rig commissioning system may automatically commission a control system for drilling operations and/or maintenance operations within a control zone. For more information on automatically commissioning control systems, see the section titled "Intelligent Drilling Control System Commissioning" below and the accompanying description.

In Block 340, sensor data is obtained from one or more sensor devices in accordance with one or more embodiments. In some embodiments, for example, a drilling management network may include sensor devices (e.g., sensor devices (214)) that establish a network connection directly with a drilling management network. For example, the sensor devices may include a smart sensor device with a communication interface for receiving and transmitting data, such as sensor data, over the drilling management network. Thus, control systems on the drilling management network may subscribe to the smart sensor device in order to obtain the sensor data. Likewise, a control system may obtain the sensor data, analyze the sensor data for whether the type of sensor data is used by any application, and then either use or ignore the sensor data accordingly. As such, the sensor data may be transmitted over the drilling management network by implementing a communication protocol that directs sensor data from the smart sensor device to control systems. For more information on smart sensor devices and transmitting sensor data over a drilling management network, see the section titled "Smart Sensor Device Integration" below and the accompanying description.

In Block 350, a virtual connection is established to a control zone in accordance with one or more embodiments. In some embodiments, for example, after a network device is authenticated, a virtual connection is established by a virtual connection controller for a temporary period of time between a control zone and another security zone, such as one found in a user network. For example, a virtual connection controller may control a temporary conduit that establishes the virtual connection. While the virtual connection is online, network traffic may flow outside and into the control zone. Upon terminating the virtual connection, the control zone may return to being a closed network that is protected from various possible security breaches. Likewise, such temporary virtual connections may enforce security measures to both local users and/or remote users that log into the user network over the Internet. Moreover, the drilling management network may provide automated control over when and to which parts of the control zone are accessed by different users. For more information on virtual connections and virtual connection controllers, see the sections titled "Virtual Connection Controller" and "Cybersecurity Framework" below and the accompanying descriptions.

In Block 360, one or more drilling operations are performed using one or more control systems in a control zone in accordance with one or more embodiments. Moreover, a control zone in a drilling management network may include one or more components, such as a coordinated controller or virtual services manager, for administering drilling operations and/or maintenance operations. For example, the control zone may include control systems that automate the drilling and/or maintenance operations without human intervention. For more information on controlling drilling operations, for example, see U.S. patent application Ser. No. 14/982,917, titled "Well Construction Display", which was filed on Dec. 29, 2015, published as US 2017/0167200, which is incorporated herein by reference in its entirety.

In Block 370, a virtual connection is terminated in accordance with one or more embodiments. For example, the virtual connection may terminate when a virtual connection controller removes a data link layer connection between a control zone and a different security zone, such as in a user network. This termination may return the control zone into a closed state. Likewise, firewall settings may be set by a virtual connection controller to block network traffic from and to the control zone. In the case of a switched virtual connection, the virtual connection controller may set the switched virtual connection to be an open circuit. In one or more embodiments, for example, the virtual connection controller shuts down and disconnects after a determination is made to terminate the virtual connection.

In Block 380, a control zone shutdown is initiated in accordance with one or more embodiments. In some embodiments, for example, the drilling management network includes a shutdown manager that administers a shutdown sequence to terminate operations for devices in a control zone. In some embodiments, a shutdown is initiated for an entire drilling management network. The shutdown sequence may be performed with time delayed termination commands that enable devices in a control zone to cease operating in an orderly fashion. For more information on shutdown sequences and shutdown managers, see the section titled "Shutdown and Startup Management" below and the accompanying description.

Virtual Connection Controller

In general, embodiments of the disclosure include a system and various methods for accessing control systems on a drilling management network.

Figure 4:
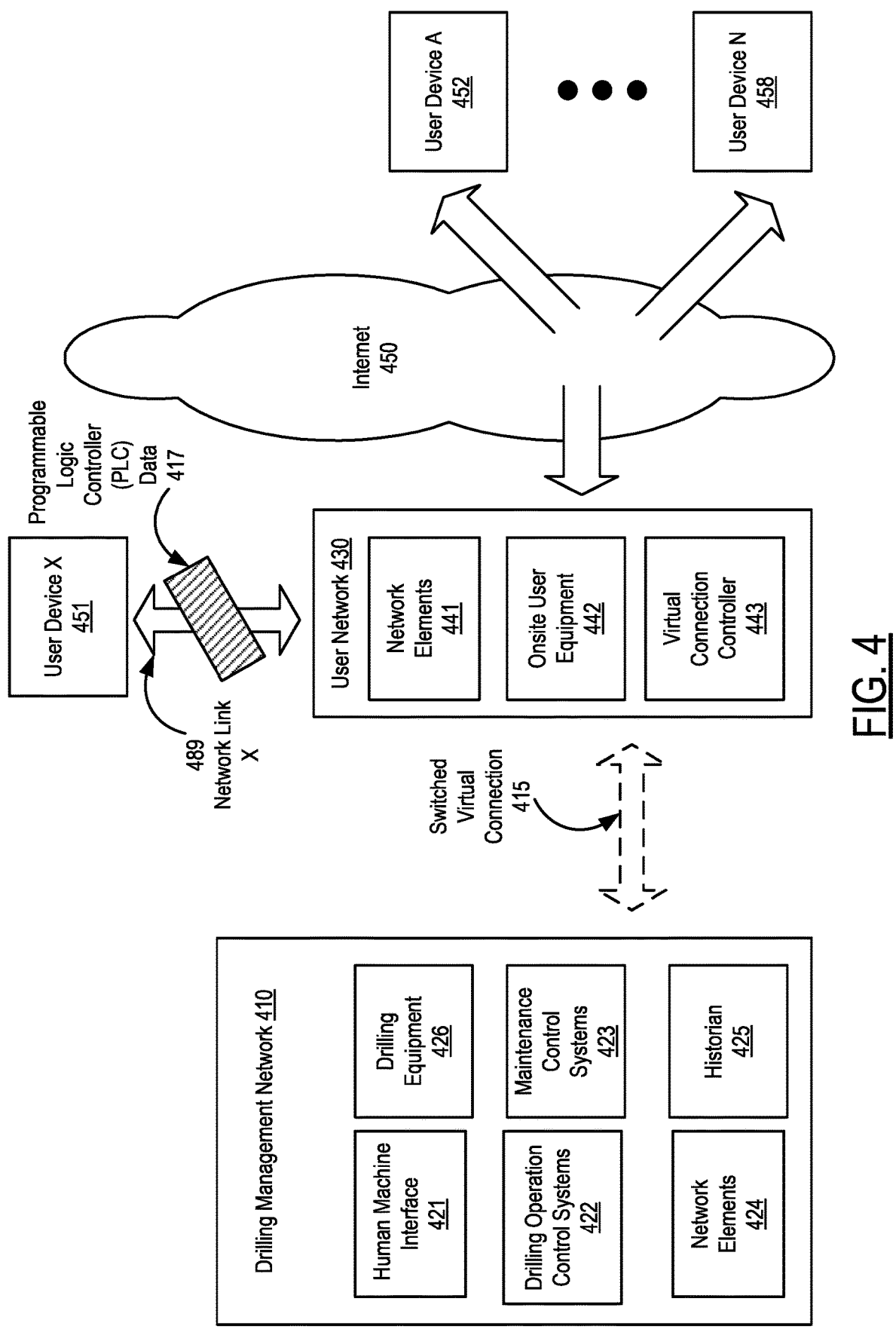

Turning to FIG. 4, FIG. 4 shows a block diagram of a system in accordance with one or more embodiments. As shown in FIG. 4, a drilling management network (410) may include a human machine interface (HMI) (e.g., HMI (421)), a historian (e.g., historian (425)), and various network elements (e.g., network elements (424)). A human machine interface may be hardware and/or software coupled to the drilling management network (410), and which includes functionality for presenting data and/or receiving inputs from a user regarding various drilling operations and/or maintenance operations performed within the drilling management network (410). For example, a human machine interface may include software to provide a graphical user interface (GUI) for presenting data and/or receiving control commands for operating a drilling rig. A network element may refer to various hardware components within a network, such as switches, routers, hubs or any other logical entities for uniting one or more physical devices on the network. In particular, a network element, the human machine interface, and/or the historian may be a computing system similar to the computing system (3400) described in FIGS. 34.1 and 34.2, and the accompanying description.

In one or more embodiments, the drilling management network (410) may include drilling equipment (e.g., drilling equipment (426)) such as the blowout preventer (99), the drilling rig (12), and other components described above in FIG. 1 and the accompanying description. The drilling management network (410) may further include various drilling operation control systems (e.g., drilling operation control systems (422)) and various maintenance control systems (e.g., maintenance control systems (423)). Drilling operation control systems and/or maintenance control systems may include, for example, programmable logic controllers (PLCs) that include hardware and/or software with functionality to control one or more processes performed by a drilling rig, including, but not limited to the components described in FIG. 1. Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig.

Moreover, drilling operation control systems and/or maintenance control systems may refer to control systems that include multiple PLCs within the drilling management network (410). For example, a control system may include functionality to control operations within a system, assembly, and/or subassembly described above in FIG. 1 and the accompanying description. As such, one or more of the drilling operation control systems (422) may include functionality to monitor and/or perform various drilling processes with respect to the mud circulation system, the rotating system, a pipe handling system, and/or various other drilling activities described with respect to FIG. 1 and the accompanying description. Likewise, one or more of the maintenance control systems (423) may include functionality to monitor and/or perform various maintenance activities regarding drilling equipment located around a drilling rig. While drilling operation control systems and maintenance control systems are shown as separate devices in FIG. 4, in one or more embodiments, a programmable logic controller and other drilling equipment (426) on a drilling rig may be used in a drilling operation control system and a maintenance control system at the same time.

In one or more embodiments, the drilling management network (410) is coupled to a user network (e.g., user network (430)). In particular, the user network (430) may include various network elements (e.g., network elements (441)) and/or onsite user equipment (e.g., onsite user equipment (442)). For example, onsite user equipment may include phone systems, personal computers for various users, printers, application servers, and/or file servers located around a drilling rig. Likewise, the drilling management network (410) and the user network (430) may be connected by one or more physical links. In one or more embodiments, for example, the user network (430) shares one or more network elements with the drilling management network (410).

In one or more embodiments, the drilling management network (410) transmits data over the virtual connection without a restriction on a data type and data source. As such, the virtual connection may control a data transmission between the drilling management network (410) and the user network (430).

In an idle state, the virtual connection controller (443) may be physically connected to the drilling management network (410) and isolated from any network communication with the network elements (424) in the drilling management network (410). In one or more embodiments, when the virtual connection controller (443) detects a request to access the drilling management network (410) from an authorized user or user device, the virtual connection controller (443) may implement various rules on a local firewall (not shown) to establish the virtual connection to the drilling management network (410). The implemented rules may allow user access to one or more approved software applications, specify which network ports may receive data over the virtual connection, and/or designate network protocols for using approved Internet Protocol (IP) Addresses across the virtual connection.

In one or more embodiments, the virtual connection controller (443) is disconnected from the drilling management network (410) while a drilling rig is performing drilling operations. Moreover, the virtual connection controller (443) may include functionality to power up a jump host and establish a virtual connection upon obtaining confirmation that the drilling rig is not performing drilling operations.

In one or more embodiments, for example, the virtual connection controller (443) includes functionality for operating a switched virtual connection (e.g., switched virtual connection (415)) disposed between the drilling management network (410) and the user network (430). For example, the switched virtual connection (415) may include hardware and/or software on the drilling management network (410) and the user network (430) for implementing a virtual connection. Thus, when the switched virtual connection (415) is "open", no virtual connection may exist between the user network (430) and the drilling management network (410). When the switched virtual connection (415) is "closed", the switched virtual connection (415) may form a temporary virtual circuit that provides transmission of network traffic, such as PLC data (e.g., PLC data (417), between the drilling management network (410) and the user network (430). PLC data may include sensor measurements, status updates, and/or information relating to drilling operations and/or maintenance operations performed on the drilling management network (410) that originates on the drilling management network (410). In particular, the default state of the switched virtual connection (415) may be where the drilling management network (410) is disconnected from the user network (430) until the virtual connection controller (443) detects an authorized user and/or user device requesting access.

Likewise, while a single switched virtual connection is shown in FIG. 4, multiple switched virtual connections may couple the drilling management network (410) and the user network (430). For example, multiple switched virtual connections may be implemented for redundancy purposes in case a fault occurs in a physical link within the switched virtual connection. Likewise, the drilling management network (410) may include two or more physically separate networks, and different virtual connections may be established in order to access different drilling operation control systems (422) and/or maintenance control systems (423). Moreover, other network links may exist between the drilling management network (410) and the user network (430) that are not shown in FIG. 4 and provide for transmission of PLC data outside the drilling management network (410).

In one or more embodiments, the drilling management network (410) is a closed network. For example, the drilling management network (410) may be a physical network or a virtual network where network communication is controlled between network nodes on the drilling management network (410) (e.g., network elements (424), drilling operation control systems (422), maintenance control systems (423)) and network nodes outside the drilling management network (410) (e.g., network nodes on the user network (430), such as network elements (441) and/or onsite user equipment (442)). In one or more embodiments, for example, while the drilling management network (410) and the user network (430) share one or more network elements, network nodes on the drilling management network (410) cannot communicate to various user devices (e.g., user device X (451)) until a virtual connection is established on the switched virtual connection (415).

Furthermore, the user network (430) may be an open network. In particular, network nodes on the user network (430) may obtain and/or transmit data outside the user network (430), for example, over the Internet (450). Where the drilling management network (410) may be limited to network communication between network nodes in the drilling management network (410), users on the user network (430) may establish a variety of different authorized network connections outside the user network (430), e.g., users may establish VoIP phone calls across the Internet (450), transmit email and/or access Internet from user devices on the user network (e.g., user device X (451)). Likewise, various user devices (e.g., user device A (452) and user device N (458)) may be coupled to the user network (430). User devices may include various computer systems that include functionality to connect to the user network (430), such as smartphones, laptops, personal computers, etc.

In one or more embodiments, the drilling management network (410) includes a distributed architecture. For example, the drilling management network (410) may include functionality to control drilling and/or maintenance operation around a drilling rig without a central controller. In another example, the drilling management network (410) may be a ring network where PLC data, control commands and other network traffic flows in a single direction or multiple directions around the ring network. In one or more embodiments, where a virtual connection is established to the user network (430), PLC data is transmitted in a single direction across the drilling management network (410) to the virtual connection controller (443) and/or one or more user devices.

While FIGS. 1 and 2 show various configurations of components, other configurations may be used without departing from the scope of the disclosure. For example, various components in FIGS. 1 and 2 may be combined to create a single component. As another example, the functionality performed by a single component may be performed by two or more components.

Figure 5:
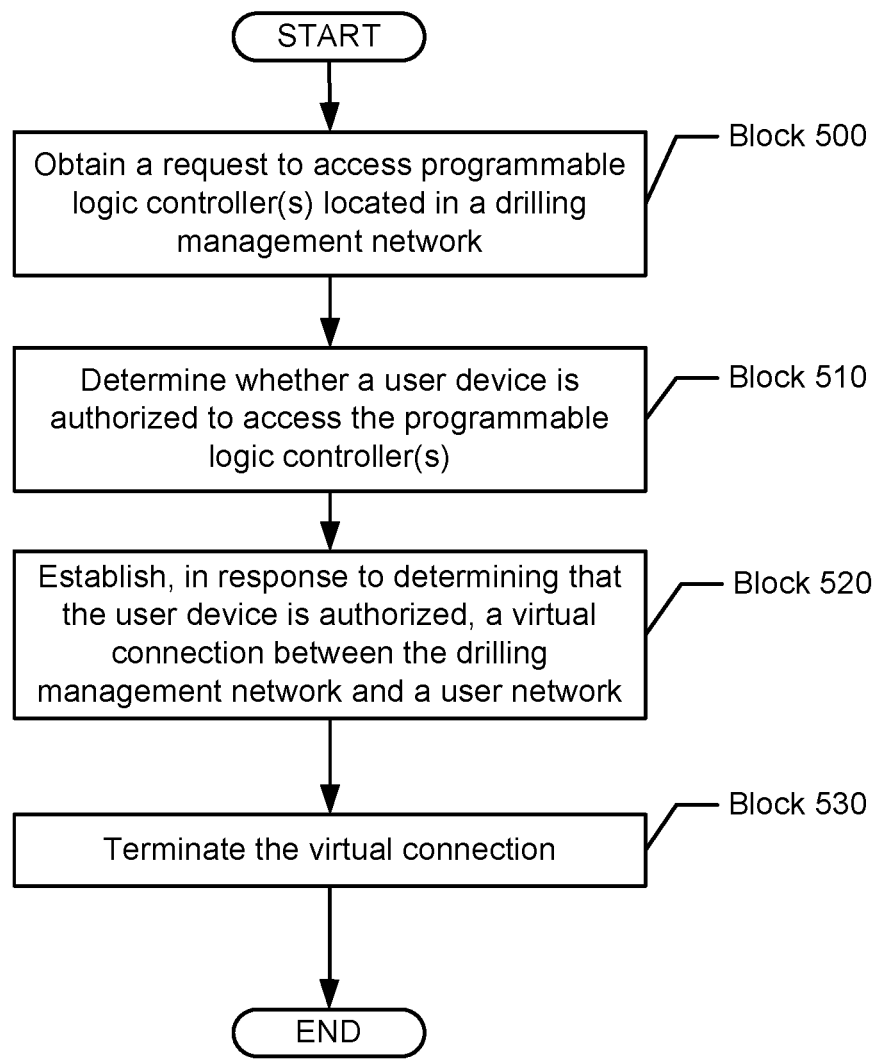

Turning to FIG. 5, FIG. 5 shows a flowchart in accordance with one or more embodiments. Specifically, FIG. 5 describes a method for accessing one or more control systems on a drilling management network. One or more blocks in FIG. 5 may be performed by one or more components (e.g., virtual connection controller (443)) as described in FIGS. 1, 2, and/or 4. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 500, a request is obtained to access one or more programmable logic controllers located in a drilling management network in accordance with one or more embodiments. For example, a user device may transmit a request to a virtual connection controller designated for controlling a switched virtual connection to the drilling management network. The user device may be connected locally on a user network coupled to the drilling management network or remotely connect to the virtual connection controller, e.g., over the Internet.

Moreover, the request may be a message that identifies the user device and/or the user attempting to access one or more of the PLCs in the drilling management network. For example, the request may include password information and/or other identification information that may be used by the virtual connection controller to determine if the user device is authorized. The request may also include information regarding which PLCs that the user device or user seeks to access. While Block 500 describes a request to access one or more PLCs, in one or more embodiments, the request is to access one or more drilling operation control systems and/or one or more maintenance control systems as described above in FIG. 4 and the accompanying description.

In one or more embodiments, a virtual connection controller implements a multi-factor authentication for accessing the drilling management network. For example, a user device may log into a user network with a username and password. Accordingly, after establishing a network connection to the user network, the virtual connection controller may request an additional password and/or identification to establish a virtual connection. For example, the additional password and/or identification information may be a personal identification number, a biometric identifier such as a fingerprint, personal information regarding the user requesting access, and/or a user device code transmitted independently to a user device. For more information on user device codes, see Block 740 in FIG. 7 and the accompanying description.

In Block 510, a determination is made whether a user device is authorized to access one or more programmable logic controllers in accordance with one or more embodiments. In response to obtaining the request in Block 500, for example, a network element and/or software application may determine whether the user device has permission to access a particular PLC. For example, a virtual connection controller may access a user account associated with a user device and/or a user operating the user device. The user account may include user credentials that designate which PLCs a user and/or user device may access. Furthermore, the user credentials may also specify one or more time windows when a user and/or user device may control a specific PLC and/or any PLCs. For more information on time windows, see Blocks 720, 725, and 730 below in FIG. 7 and the accompanying description. The user credentials may be manually entered into the user account by an administrator and/or automatically generated based on various information associated with a user and/or user device stored in the user account or elsewhere.

In Block 520, a virtual connection is established between a drilling management network and a user network in response to determining that a user device is authorized in accordance with one or more embodiments. If a determination is made that the user device is authorized to access a particular PLC, for example, a virtual connection controller may establish the virtual connection to the drilling management network. If a switched virtual connection exists between the drilling management network and the user network, the virtual connection controller may enable network communication across the switched virtual connection to establish the virtual connection. The switched virtual connection may be similar to switched virtual connection (415) described above in FIG. 4 and the accompanying description. On the other hand, if the determination is made that the user device is not authorized to access one or more of the PLCs and/or the user device is not authorized at the current time, the virtual connection may not be established in Block 520.

In one or more embodiments, a virtual connection controller is shut down and/or disconnected from a drilling management network. After a user is determined to be authorized to access the drilling management network in Block 510, the virtual connection controller may power up and establish the virtual connection to the drilling management network.

In Block 530, a virtual connection is terminated in accordance with one or more embodiments. In particular, a virtual connection controller or other software application may terminate the virtual connection established in Block 520. For example, a virtual connection controller may remove a data link layer connection between a drilling management network and a user network that returns the drilling management network into a closed state. Likewise, firewall settings may be set by a virtual connection controller to block network traffic from and to the drilling management network. In the case of a switched virtual connection, the virtual connection controller may set the switched virtual connection to be an open circuit. In one or more embodiments, for example, the virtual connection controller shuts down and disconnects after a determination is made to terminate the virtual connection.

In one or more embodiments, for example, a user and/or user device is designated a specific period of time when the virtual connection in Block 520 remains active. Once the virtual connection is established in Block 520, the virtual connection may automatically terminate after an hour or other specified period of time. In one or more embodiments, for example, the virtual connection is automatically terminated after an approved maintenance time period unless an extension is approved through one or more proper channels. Likewise, in another embodiment, a software application operating on a user network and/or the user device monitors whether a specific amount of time has elapsed since any user activity has been performed with respect to the virtual connection. For example, if the user device has not transmitted a control command and/or obtained any PLC data for a particular amount of time across the virtual connection from Block 520, a virtual connection controller may determine that a time-out of the user device has occurred and terminate the virtual connection accordingly.

In another embodiment, the user device may transmit a request to terminate the virtual connection, e.g., to a virtual connection controller. A user may decide that he or she is finished accessing one or more PLCs or control systems and send a command to the virtual connection controller to terminate the virtual connection. Accordingly, the user device may automatically transmit a request to terminate the virtual connection in response to the user logging out of a graphical user interface provided for accessing the one or more PLCs.

Furthermore, as described in FIG. 5 above and in FIG. 7 below, access may describe read and/or control access with respect to one or more network devices, such as PLCs, located on the drilling management network. However, in one or more embodiments, access is directed towards control commands being sent into a drilling management network. For example, one or more network links may exist between a drilling management network and a user network that provide for transmission of PLC data. In this case, the established virtual connection may be limited to transmission of control commands and/or other control data that is sent to change settings, parameters, and processes performed on the drilling management network. In some embodiments, for example, a user device may be able to monitor the drilling management network without establishing a virtual connection in Block 520. Here, the virtual connection may be established only when the user device seeks to adjust various settings on one or more PLCs and/or other network devices in the drilling management network.

Figure 6:
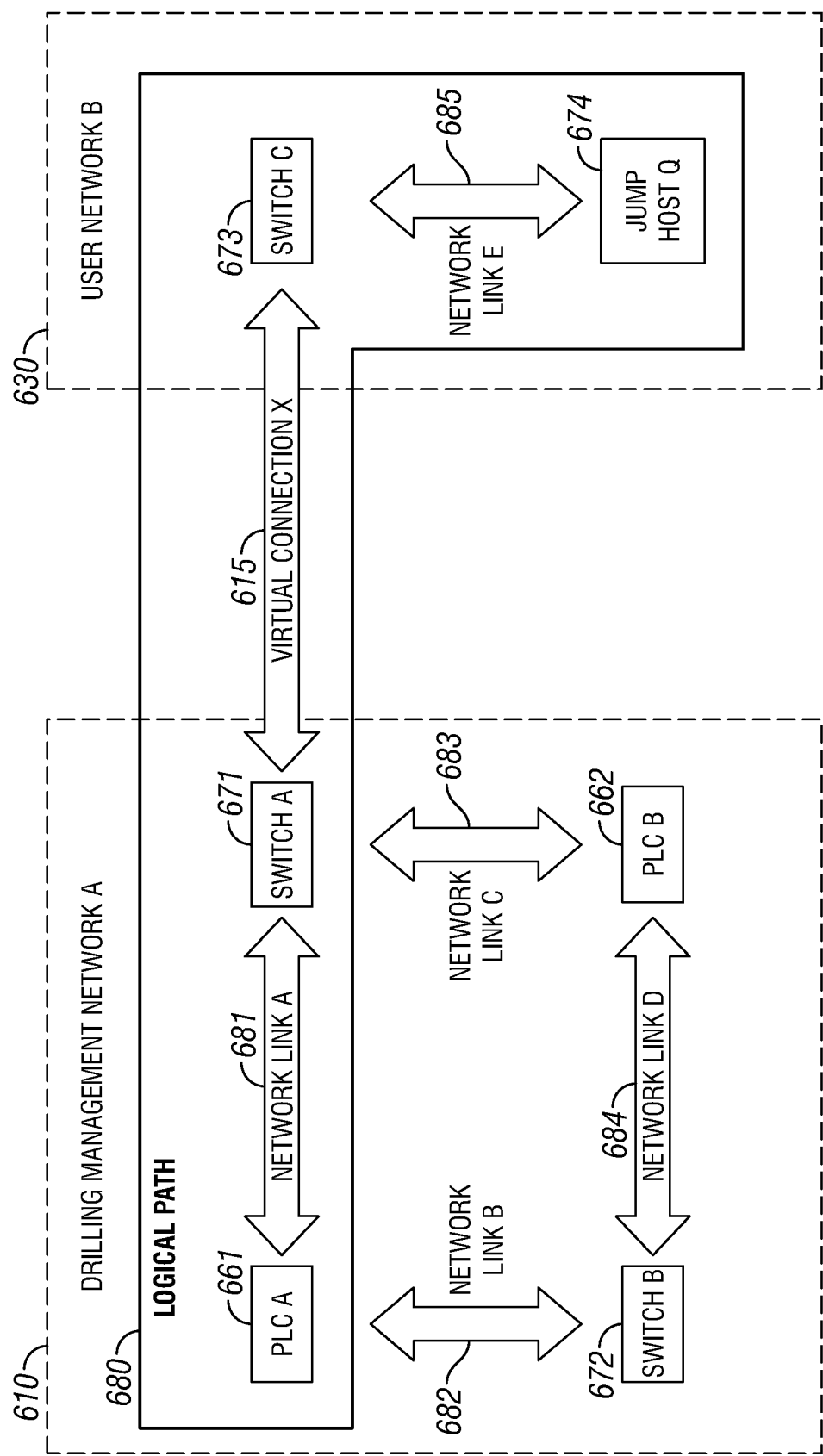

Turning to FIG. 6, FIG. 6 provides an example of an end-to-end connection from a network node on a drilling management network to a jump host. The following example is for explanatory purposes only and not intended to limit the scope of the disclosure. Turning to FIG. 6, FIG. 6 shows a logical path (680) that is established from a programmable logic controller (i.e., PLC A (661)) to jump host Q (674). As shown in FIG. 6, various network links (i.e., network link A (681), network link B (682), network link C (683), network link D (684), and network link E (685)) are formed between various network nodes in the drilling management network X (610) (e.g., PLC A (661), PLC B (662), switch A (671), switch B (672)) and user network B (630) (e.g., switch C (673), jump host Q (674)). Moreover, a virtual connection X (615) is established between switch A (671) on the drilling management network A (610) and switch C (673) on a user network B (630). Using the virtual connection X (615), a logical path (680) is formed between PLC A (661) and jump host Q (674) that enables the jump host Q (674) to obtain data from the PLC A (661) and/or transmitting data to PLC A (661). The logical path (680) may enable the jump host Q (674) to communicate with the PLC A (661), for example, by adjusting settings on the PLC A (661) using control commands. Likewise, the jump host Q (674) may obtain PLC data from the PLC A (661) that provides information on various drilling operations and/or maintenance tasks being performed on the drilling management network A (610). When the virtual connection X (615) terminates, the logical path (680) also terminates between PLC A (661) and the jump host Q (674).

In one or more embodiments, for example, a virtual connection between a drilling management network and a user network does not provide direct access to the drilling operation control systems and/or maintenance control systems to a user device (e.g., user device X (451)). In contrast to FIG. 6, in some embodiments, for example, the user device Z (651) may not communicate directly with PLC A (661) but via a virtual connection controller and/or other network intermediary. A logical path may exist over the virtual connection X (615) to the virtual connection controller. Based on control commands received at the virtual connection controller from the user device, the virtual connection controller may retransmit new control commands directly to a programmable logic controller or control system on the drilling management network. Likewise, the virtual connection controller may receive PLC data from a programmable logic controller or control system before retransmitting the PLC data to a user device.

Figure 7:
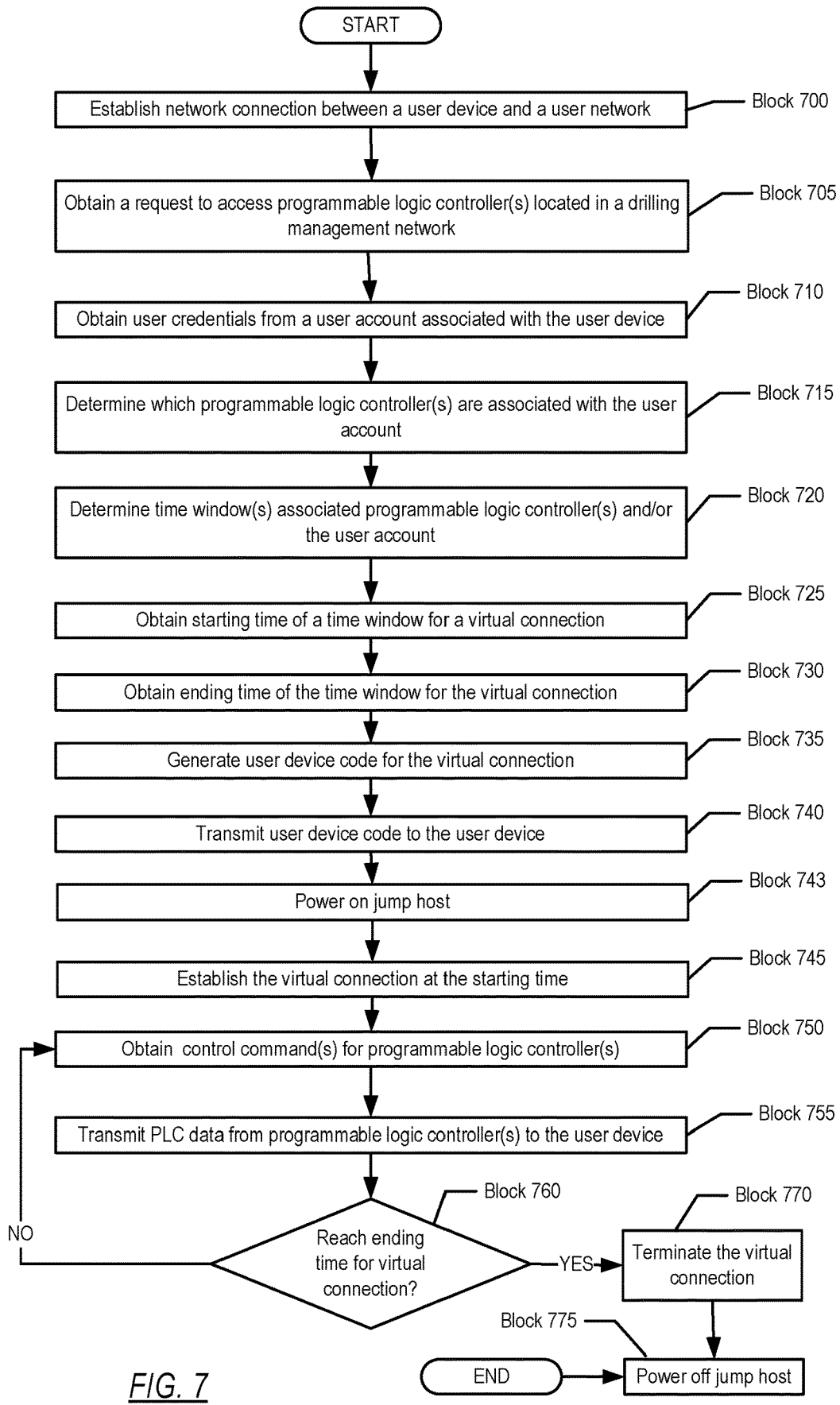

Turning to FIG. 7, FIG. 7 shows a flowchart for generating a vulnerability map in accordance with one or more embodiments. Specifically, FIG. 7 describes a method for accessing one or more control systems on a drilling management network. One or more blocks in FIG. 7 may be performed by one or more components (e.g., virtual connection controller (443)) as described in FIGS. 1, 2, and/or 4. While the various blocks in FIG. 7 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 700, a network connection is established between a user device and a user network in accordance with one or more embodiments. In particular, a user device may remotely connect over the Internet to the user network. Likewise, the network connection may be established locally on the user network, e.g., connecting the user device to a switch located on a drilling rig. In regards to a remote network connection, the network connection may be established using a remote display protocol, such as a remote desktop protocol, to access a virtual connection controller on the user network. In one or more embodiments, the user device connects to a network element on a user network that can communication to a virtual connection controller and/or a jump host. For example, the user device may provide login information such as identification and/or password information to log into the user network. In one or more embodiments, the user network may be similar to the user network (430) described in FIG. 4 and the accompanying description.

In Block 705, a request is obtained to access one or more programmable logic controllers located in a drilling management network in accordance with one or more embodiments. Block 705 may be similar to Block 500 described in FIG. 5 and the accompanying description.

In Block 710, user credentials are obtained from a user account associated with a user device in accordance with one or more embodiments. For example, various user accounts may be stored on a user network in a data storage device or in a remote storage location that is accessible by one or more software applications operating on the user network. In one or more embodiments, a virtual connection controller identifies the user device from Block 700 and matches the user device to a particular user account. For example, identification and/or password information from Block 700 may also be associated with a particular user account. On the other hand, user devices may be designated an additional unique identification that matches the user device to a particular user account.

In one or more embodiments, the user credentials include permission attributes. For example, permission attributes may designate one or more control systems and/or one or more programmable logic controllers on a drilling management network that a user and/or user device may access. In particular, different employees at the drilling management network may be assigned access based on their jobs and responsibilities. For example, a user whose job is to operate and maintain a mud pump may have permission attributes that designate access to a mud pump PLC and a mud treatment PLC. However, the user may not have permission attributes that provide access to a top drive PLC that controls drill string rotation. Accordingly, the permission attributes for the user may be described in the respective user account for the user.

In Block 715, a determination is made regarding which programmable logic controllers are associated with a user account in accordance with one or more embodiments. For example, the request from Block 705 may be a request to access to a specific PLC or control system in a drilling management network. A virtual connection controller may analyze the user credentials from Block 710 determine if any permission attributes match the specified PLC. On the other hand, if the request is a general request to access the drilling management network, a virtual controller may examine the permission attributes for any PLCs and/or control systems associated with a user and/or user device. If a user device is not authorized to access any programmable logic controllers at the current time on the drilling management network, the request from Block 705 may be ignored. Likewise, Block 715 may be similar to Block 510 described in FIG. 5 and the accompanying description.

In Block 720, a determination is made whether one or more time windows are associated with one or more programmable logic controllers and/or a user account in accordance with one or more embodiments. In one or more embodiments, for example, access to the drilling management network is time bounded. In particular, PLC and/or control system access may be granted to user devices at approved times. As such, in one or more embodiments, access to one or more PLCs and/or control systems is associated with one or more time windows. For example, a time window may specify a starting time and an ending time when a user device may access a specific PLC. Between the starting time and the ending time, a user device may obtain PLC data from the specific PLC and/or transmit one or more control commands to the specific PLC. Likewise, a time window may be designated for specific user and/or user device, e.g., to prevent access to a control system during a regularly scheduled maintenance operation.

In another embodiment, a time window may refer to a particular amount of time that a user device is allowed for accessing a specific PLC. For example, a virtual connection controller may record the amount of time that the user device accesses the specific PLC before the virtual connection be terminated. Accordingly, when a user device exceeds the amount of time designated for a time window, the virtual connection may be terminated. Thus, after expiration of a particular time window, a virtual connection controller may prevent a future virtual connection from being established until the time window is reset. For example, time windows may be reset weekly, monthly, or at other periodic time intervals for a user and/or user device.

In a further embodiment, for example, a user may be designated one or more general time windows for accessing a PLC or control system on the drilling management network. In a general time window, a virtual connection may be established where the user device can access any PLC or control system that the user device is otherwise authorized to access. On the other hand, in one or more embodiments, a user is designated a specific time window for a particular PLC or control system. In a specific time window, a virtual connection is established where the user device may access a specific PLC or control system associated with the specific time window. Moreover, a specific time window for a user device may overlap for a portion of time with another specific time window or without any overlap in time.

In one or more embodiments, the user credentials from Block 710 include time window attributes. Specifically, time window attributes may be data fields that provide information regarding starting times, ending times, particular days of the week, month, or year, and allotted amounts of time for various time windows assigned to a user and/or user device. Moreover, time window attributes may describe general time windows and specific time windows.

In Block 725, a starting time of a time window is obtained for a virtual connection in accordance with one or more embodiments. A virtual connection controller may extract various time window attributes from a user account to determine, for example, a starting time of a time window for a virtual connection to a drilling management. In particular, the starting time of the time window may be before or after the time that a request is received in Block 705. If the starting time of the time window is after the request, the virtual connection controller may notify a user device that the virtual connection may not be established until the starting time. If the starting time is before the request, a virtual connection controller may establish a virtual connection immediately.

In Block 730, an ending time of a time window is obtained for a virtual connection in accordance with one or more embodiments. Similar to Block 725, various time window attributes may be examined to determine the ending time of a time window. In one or more embodiments, a virtual connection controller notifies a user device regarding the amount of time that the virtual connection will be established, e.g., until the ending time of the current time window.

In Block 735, a user device code is generated for a virtual connection in accordance with one or more embodiments. In one or more embodiments, for example, upon determining that a user device is authorized to access the drilling management network, a virtual connection controller triggers a process to generate a time bounded set of virtual connection credentials. For example, the virtual connection credentials may include network and/or firewall configurations for communicating across a virtual connection. Moreover, in response to a virtual connection controller determining that a user device is authorized, the virtual connection credentials may include a user device code specifically generated for the user device. A user device code may be a pseudorandom or otherwise predetermined alphanumeric sequence that enables a user device to communicate with a PLC and/or control system on the drilling management network.

In one or more embodiments, for example, a user device code is configured to enable a user device to log into a control system application provided by a virtual connection controller. In particular, as the user device code may be different from the identification and/or password information used to establish the network connection in Block 700, the user device code may produce a multi-factor authentication for security purposes. For example, the user device code may be a temporary software token where the user device code is stored on the user network or user device. Once the virtual connection is terminated, such as when a time window expires, the user device code may no longer allow communication across any current or future virtual connections to the drilling management network. Thus, user device codes may be generated per authorized request and limited to one or more virtual connections.

In Block 740, a user device code is transmitted to a user device in accordance with one or more embodiments. In response to generating a user device code in Block 735, a virtual connection controller may transmit the user device code to the user device from Block 700. However, in one or more embodiments, the virtual connection controller acts as a network intermediary between the user device and control systems on the drilling management network. Thus, the virtual connection controller may store the user device code locally on a user network without transmitting the user device code to the user device.

In Block 743, a jump host is powered on in accordance with one or more embodiments. For example, the jump host may be the virtual connection controller or a separate device from the virtual connection controller. When the jump host is powered off, network communication may be prevented between a drilling management network and a user network that includes the jump host. The jump host may be powered off by a software application operating on the user network, for example.

In Block 745, a virtual connection is established at a starting time in accordance with one or more embodiments. In one or more embodiments, for example, the virtual connection is established in a similar manner as discussed in Block 520 in FIG. 5 and the accompanying description. The starting time may be the same starting time as discussed in Block 725 and the accompanying description. Likewise, the virtual connection may be established by a virtual connection controller. Moreover, in one or more embodiments, the virtual connection controller or other network application monitors network traffic across the virtual connection. For example, a virtual connection controller may record requests for particular types of PLC data from the drilling management network as well as any control commands transmitted to any PLCs or control systems on the drilling management network.

In one or more embodiments, for example, the virtual connection controller determines one or more access rights for the user device with respect to the virtual connection. For example, a user device may be granted read access and/or control access to one or more settings on a PLC or control system in the drilling management network. For example, access rights for a user device may be stored in the user account described in Block 710 along with time window attributes and permission attributes.

In Block 750, one or more control commands are obtained for one or more programmable logic controllers in accordance with one or more embodiments. A control command may be a message or instruction that causes a PLC or control system to perform a predetermined type of operation. For example, control commands may change one or more processes to be performed by a drilling operation control system and/or a maintenance control system. Moreover, control commands may adjust equipment settings and parameters with respect to the one or more processes. In one or more embodiments, for example, a drilling management network only obtains control commands from a user network and/or user device through the virtual connection established in Block 745. When the virtual connection is terminated, the user network and/or the user device may still obtain PLC data from the drilling management network but may be unable to modify settings and/or processes performed on the drilling management network.

In some embodiments, for example, a user device may transmit a control command to a virtual connection controller. Accordingly, the virtual connection controller may translate the control command on the respective PLC or control system into specific software and/or hardware instructions. In another embodiment, the user device communicates the control command directly to the respective PLC or control system without going through an intermediary application. For example, an end-to-end connection may be established between a user device and a PLC or control system on the drilling management network.

In Block 755, programmable logic controller data regarding one or more programmable logic controllers are transmitted to a user device in accordance with one or more embodiments. In one or more embodiments, for example, a graphical user interface is provided on a user device that presents PLC data regarding a programmable logic controller or control system. In particular, a historian may be located on a drilling management network that stores past drilling management data, e.g., sensor measurements, quality control data, system failures, etc., collected about various PLCs and control systems on the drilling management network. On the graphical user interface, the PLC data may be presented as raw data and/or transformed data using various historical analyses of the raw data. For example, if a user requests access to the progress of a drilling operation with a particular drill bit over the past week, corresponding PLC data for the drill bit may be shown in the graphical user interface.

In one or more embodiments, a virtual connection controller on a user networks obtains the PLC data directly from PLCs and control systems on the drilling management network. Accordingly, the virtual connection controller may relay a portion of the PLC data to the user device. Likewise, the virtual connection controller may transform the PLC data into a different format before relaying the PLC data to the user device.

While Block 755 is shown occurring while the virtual connection is established in Block 745 and before the virtual connection is terminated in Block 770, in one or more embodiments, PLC data is transmitted without using a virtual connection. For example, one or more network links may exist between a drilling management network and a user network that provide for transmission of PLC data from PLCs on the drilling management network to the user network. However, these network links may include functionality that prevents control commands from being sent across the network links.

In Block 760, a determination is made whether an ending time is reached for a virtual connection in accordance with one or more embodiments. In one or more embodiments, for example, a virtual connection controller monitors a clock for whether the virtual connection established in Block 745 is outside a particular time window. Once the time window has expired, the virtual connection controller may terminate the virtual connection in a similar manner as discussed above with respect to Block 530 in FIG. 5 and the accompanying description. Likewise, if a user device transmits a request to terminate the virtual connection, the ending time may be determined to be reached. When a determination is made that the ending time is reached, the process may proceed to Block 770. When a determination is made that the ending time is not reached, the process may return to Block 750.

In Block 770, a virtual connection is terminated in accordance with one or more embodiments. In one or more embodiments, upon detecting the ending time of the virtual connection, the user device code from Block 735 is disabled. Accordingly, a virtual connection controller may terminate the virtual connection is a similar manner as described in Block 530 of FIG. 5 and the accompanying description.

In Block 775, a jump host is powered off in accordance with one or more embodiment. For example, a jump host or a virtual connection controller on a user network may detect that no remaining virtual connections exist to the drilling management network, and the jump host may automatically shut down accordingly. While shutdown, the jump host may not be compromised by security breaches on the user network.

Accordingly, as shown in the processes described in FIGS. 5 and 7 above, automation of establishing and terminating virtual connections may be transparent and with minimal human intervention. In particular, ad-hoc maintenance may be performed with minimal rig personnel involvement (e.g. to approve various time windows in various user accounts). Moreover, drilling operation and maintenance workflow may be consistent without respect to whether a user device is connected onsite or in a remote location. Likewise, the techniques discussed in FIGS. 5 and 7 may remove various manual connections to the drilling management network that depend on rig operations and human personnel availability. Likewise, manual connections may be forgotten and mismanaged, resulting in various security risks to the drilling management network.

In one or more embodiments, the techniques described in FIGS. 5 and 6 and the accompanying description remove manual intervention by users for connecting user devices to PLCs on a drilling management network. In a well construction system, for example, various control systems may be locally managed. Because a security breach to the control system may carry various risks to operation safety, equipment, personnel safety, and/or environmental safety, securing drilling operation control systems and/or maintenance control systems may present a challenge. Accordingly, additional tasks like inspecting network traffic to a drilling management network may not be an option. Moreover, various security measures may rely on passive monitoring. Thus, maintenance work is often performed locally due to the risks involved with providing remote access. Therefore, the above discussed techniques may automate local and remote connections of user devices with physically connecting and disconnecting connections between a drilling management network and a different network.

Turning to FIGS. 8.1 and 8.2, FIGS. 8.1 and 8.2 provide an example of establishing a virtual connection for accessing a control system on a drilling management network. The following example is for explanatory purposes only and not intended to limit the scope of the disclosure.

Turning to FIG. 8.1, a Drilling Rig controller (810) is shown acting as a virtual connection controller in this example. In particular, the Drilling Rig controller (810) identifies the current date and time based on data stored in a current time attribute (801). Moreover, the Drilling Rig controller (810) receives various pending requests (e.g., User Joe's Request to Access Fuel Control PLC (821), User Bill's Request to Access Electric Power PLC (822), and User Kathy's Request to Access Mud Treatment PLC (823)) to access various programmable logic controllers located on a network around the Drilling Rig.

Keeping with FIG. 8.1, the Drilling Rig controller (810) analyzes User Joe's Request (821) using a PLC authorization function (841) to determine whether to deny or grant User Joe's Request (821) for accessing a fuel control PLC (815). The PLC authorization function (841) may correspond to one or more blocks described in FIGS. 3 and 5 and the accompanying description. First, the Drilling Rig controller (810) obtains information from User Joe's Account (824) located on a user network (not shown) around the Drilling Rig. In particular, based on data stored in User Joe's Account (824), User Joe has permission attributes (803) designated him authorization for accessing a Mud Pump PLC (811), a drilling control PLC (812), and a mud treatment PLC (813). Likewise, based on data stored in User Joe's Account (824), User Joe has time window attributes (804) that specify a general time window (831) for accessing PLCs on each Tuesday from 9:00 AM to 12:00 PM and another general time window (832) for accessing PLCs on each Thursday from 2:00 PM to 5:00 PM. After analyzing information from User Joe's Account (824), the Drilling Rig controller (810) determines that User Joe lacks authorization for accessing the fuel control PLC (815) on the Drilling Rig. Accordingly, User Joe's Request (821) is denied and no virtual connection is established.

Furthermore, as shown in FIG. 8.1, the Drilling Rig controller (810) analyzes User Bill's Request (822) using a PLC authorization function (841) to determine whether to deny or grant User Bill's Request (822) for accessing an electric power PLC (814). First, the Drilling Rig controller (810) obtains information from User Bill's Account (825) located on the user network around the Drilling Rig. In particular, based on data stored in User Bill's Account (825), User Bill has permission attributes (803) designated him authorization for accessing the electric power PLC (814) and the fuel control PLC (815). Likewise, based on User Bill's Account (825), User Bill has time window attributes (804) that specify a special time window (833) for accessing the electric power PLC (814) on each Tuesday from 11:00 AM to 1:00 PM and another special time window (834) for accessing the fuel control PLC (815) on each Thursday from 8:00 AM to 5:00 PM. After analyzing information from User Bill's Account (825), the Drilling Rig controller (810) determines that User Bill is authorized to access the electric power PLC (814) on the current date and time on the Drilling Rig. Accordingly, User Bill's Request (822) is granted and a virtual connection is established by the Drilling Rig controller (810) that allows User Bill's user device (851) to access the electric power PLC (815).

Keeping with FIG. 8.1, the Drilling Rig controller (810) analyzes User Kathy's Request (823) using a PLC authorization function (841) to determine whether to deny or grant User Kathy's Request (823) for accessing a mud treatment PLC (813). First, the Drilling Rig controller (810) obtains information from User Kathy's Account (826) located on the user network. In particular, based on data stored in User Kathy's Account (826), User Kathy has permission attributes (803) designated her authorization for accessing a Mud Pump PLC (811) and a mud treatment PLC (813). Likewise, based on data stored in User Kathy's Account (826), User Kathy has time window attributes (804) that specify a general time window (835) for accessing PLCs on each Monday from 10:00 AM to 1:00 PM and another general time window (836) for accessing PLCs on each Wednesday from 2:00 PM to 5:00 PM. After analyzing information from User Kathy's Account (826), the Drilling Rig controller (810) determines that User Kathy is authorized for accessing the mud treatment PLC (813) on the Drilling Rig, but User Kathy's Request (823) is outside both general time windows (835, 636) for her user account (826). Accordingly, User Kathy's Request (823) is denied and no virtual connection is established.

Turning to FIG. 8.2, FIG. 8.2 shows a graphical user interface (860) operating on User Bill's user device (851). While a virtual connection is established to a drilling management network on the Drilling Rig, a jump host on the user network may forward PLC data from electric power PLC (814) to User Bill's user device (851), which is presented in the electric power PLC status display (880). In particular, various status attributes are shown, such as the current status (881) of the electric power PLC (814), the current power usage (882) at the Drilling Rig, power usage for the past seven days (883), and power usage for the past thirty days (884). Moreover, the graphical user interface (860) provides an electric power PLC command panel (890). Using the electric power PLC command panel (890), User Bill may transmit one or more control commands to the jump host for controlling the electric power PLC (814). For example, control commands may include disconnecting power to a mud pump (891), disconnecting power to a drill (892), and adjusting maximum power settings for various Drilling Rig equipment (893). Furthermore, the graphical user interface (860) also includes a PLC clock display (870) that shows the current date (871) and current time (872) to User Bill. Likewise, Drilling Rig controller (810) has computed the remaining time (873) within User Bill's general time window (831) and presented the remaining time (873) within the PLC clock display (870).

Shutdown and Startup Management

In general, embodiments of the disclosure include a system and various methods for initiating shutdowns and startup operations on a drilling management network. In particular, one or more embodiments are directed to a system that includes a shutdown manager that orchestrates a shutdown sequence of the drilling management network. In some embodiments, for example, virtual machines and software container are terminated before a virtualization services manager's operations terminate. The virtualization services manager may manage and provide virtualization services through the drilling management network, such as the generation and/or termination of various virtual machines and software containers operating on a virtualization services layer. Once the virtualization services manager is terminated, various virtualization controllers may be subsequently terminated on host devices operating throughout the drilling management network. Finally, the host devices may be shutdown.

Accordingly, in some embodiments, the shutdown sequence is an automated process orchestrated by a shutdown manager. In particular, the shutdown manager may coordinate the shutdown sequence using various time delayed termination commands that communicate the time when network devices terminate operations. Thus, by using the time delayed termination commands, the shutdown manager may regulate a graceful shutdown of the network while the shutdown manager is both online on the network as well while the shutdown manager is offline, i.e., after the shutdown manager has already terminated its own operations.

Turning to FIG. 9.1, FIG. 9.1 shows a block diagram of a system in accordance with one or more embodiments. As shown in FIG. 9.1, a drilling management network (900) may include various user devices (e.g., user device (990)), various network elements (e.g., network elements (905)), and various host devices (e.g., host device A (911), host device N (912), host devices (913)). The user devices may include hardware and/or software coupled to the drilling management network (900), and which includes functionality for presenting data and/or receiving inputs from a user regarding various drilling operations and/or maintenance operations performed within the drilling management network (900). For example, a user device may include personal computers, smartphones, human machine interfaces, and any other devices coupled to a network that obtain inputs from one or more users, e.g., by providing a graphical user interface (GUI). Likewise, a user device may present data and/or receive control commands from a user for operating a drilling rig. A network element may refer to various software and/or hardware components within a network, such as switches, routers, hubs, user equipment, or any other logical entities for uniting one or more physical devices on the network.

In one or more embodiments, the drilling management network (900) may further include various host devices. In particular, a host device may include hardware and/or software that is coupled to drilling equipment (e.g., drilling equipment A (986), drilling equipment N (987)) and one or more programmable logic controllers (PLCs) (e.g., PLCs A (981), PLCs N (982)). The drilling equipment may include the blowout preventer (99), the drilling rig (12), and other components described above in FIG. 1 and the accompanying description. PLCs coupled to host devices may form various control systems, such as various drilling operation control systems and various maintenance control systems. In particular, PLCs may include hardware and/or software with functionality to control one or more processes performed by a drilling rig, including, but not limited to the components described in FIG. 1. Specifically, a PLC may control valve states, fluid levels, pipe pressures, warning alarms, and/or pressure releases throughout a drilling rig. Moreover, a programmable logic controller may be a ruggedized computer system with functionality to withstand vibrations, extreme temperatures, wet conditions, and/or dusty conditions, for example, around a drilling rig.

In one or more embodiments, a host device includes a virtualization controller (e.g., virtualization controller A (931), virtualization controller N (932)) operating on a host operating system (e.g., host operation system A (921), host operating system N (922)). A virtualization controller may include hardware and/or software that includes functionality for communicating with other virtualization controllers on a drilling management network and/or implementing various virtualization services on the drilling management network. For example, virtualization controllers may be virtual machines or software containers operating on the host devices (911, 912). Virtualization services may include network processes that are operated on multiple network devices (e.g., host devices (911, 912), network elements (905), host devices (913)). Examples of virtualization services may include oilfield data management among PLCs and/or drilling equipment, virtual machine management, software container management, memory resource allocation among host devices on a drilling management network, various network processes for administering the drilling management network, etc.

A software container may be a user-space instance implemented by a single kernel of a host operating system (e.g., host operating system A (921), host operating system N (922)). In particular, a software container may be an abstraction at an application layer that allows isolated processes to operate inside the software container. Likewise, multiples software containers may operate on a single kernel of an operating system. Software containers may include docker containers, Java™ containers, Windows Server containers, etc. In contrast, a virtual machine may include hardware and/or software that may provide an abstraction of physical hardware. For example, a virtual machine may have an independent operating system that is separate from a host operating system where a virtual machine may operate on one or more host devices with dedicated memory and other computer resources.

Turning to FIG. 9.2, in one or more embodiments, a virtualization services manager (960) is an elected virtualization controller that is designated by the other virtualization controllers to initiate virtualization services, virtual machines and/or software containers operating on a virtualization services layer. For more information on an elected virtualization services manager, see FIG. 9.3 below and the accompanying description.

Moreover, a virtualization services manager (e.g., virtualization services manager (960)) may administer and/or monitor various host device resources for virtual machines and/or software containers operating on a virtualization services layer. Likewise, the virtualization general architecture of the drilling management network (900) may be the same where a host operating system is running on bare metal (e.g., a hardware computing system), or as a virtual machine. For example, virtual machines and software containers may communicate with each other in the virtualization services layer and run virtualization services in an orchestrated manner.

Keeping with FIG. 9.2, in some embodiments, a shutdown manager may receive a request from a user device (e.g., user device (990)) to terminate operations of all or a portion of a drilling management network. Accordingly, the shutdown manager may initiate the termination of operations for host devices, virtual machines, software containers, virtualization services managers, and/or virtualization controllers. In some embodiments, the shutdown manager initiates termination operations automatically in response to detecting one or more shutdown conditions corresponding to predetermined states in a drilling management network, e.g., drilling rig equipment malfunctions causing a cease of operations on a drilling management network. Likewise, a shutdown manager may automatically initiate termination operations at a predetermined time, e.g., a user may designate a predetermined day and/or time for shutting down a drilling management network.

In some embodiments, for example, a shutdown manager includes functionality for transmitting a time delayed termination command (e.g., time delayed termination command A (971), time delayed termination command N (972), time delayed termination command B (973)) to one or more host devices, one or more virtualization controllers, etc. A time delayed termination command may include instructions designating a predetermined termination time when respective hardware and/or software (e.g., host device A (911), virtual machine A (941), software container A (946), virtualization controller A (931), virtualization services manager (960), etc.) terminates operations. The termination time may be a specific time of day, e.g., at 8:00 PM Central Standard Time, or at a relative time, e.g., 10 minutes after receiving a respective time delayed termination command from a shutdown manager.

At the predetermined termination time, for example, a software application or network device may terminate various software and/or hardware processes operating within a network device. Likewise, the termination time may correspond to various processes associated with terminating operations, such as deallocation of computer resources e.g., system memory and processing power, and/or storing data from the software processes and/or hardware processes into a data storage unit for later retrieval. Terminating operations may further correspond to ending a supply of electrical power to a respective network device, such as a virtual machine, software container, and/or host device.

Turning to FIG. 9.3, FIG. 9.3 shows a block diagram of a system in accordance with one or more embodiments. As shown in FIG. 9.3, the drilling management network (900) may include functionality for initiating one or more processes for restarting services in the drilling management network (900). In one or more embodiments, for example, various virtualization controllers (e.g., virtualization controller A (931), virtualization controller N (932), virtualization controller X (933)) include functionality for determining which virtualization controller may act as an elected virtualization services manager for the drilling management network (900). In particular, an elected virtualization services manager may be a temporary virtualization services manager until a virtualization services layer is established throughout a drilling management network. As shown in FIG. 9.3, for example, the virtualization controllers (931, 932, 933) elect virtualization controller X (933) as the elected virtualization services manager (965). Similar to the other virtualization controllers, virtualization controller X (933) operates as a virtualized environment on a host operating system X (923) located in the host device X (913). As the elected virtualization services manager (965), virtualization controller X (933) may act as a leader in coordinating various processes among the other virtualization controllers (931, 932) on the drilling management network (900). In particular, the elected virtualization services manager (965) may include functionality similar to the virtualization services manager (960) in FIG. 9.1.

In some embodiments, an elected virtualization services manager includes functionality to transmit one or more time delayed initiation commands (e.g., time delayed initiation command A (976), time delayed initiation command N (977)). For example, the elected virtualization services manager (965) may include functionality for determining one or more predetermines times in a startup sequence for virtual machines, software containers, and/or other virtualization services operating in the drilling management network (900). As such, the time delayed initiation commands may enable various virtualization services provided by a virtualization services manager to be implemented before various virtual machines and/or software containers are implemented on the drilling management network (900).

While FIGS. 9.1, 9.2, and 9.3 show various configurations of components, other configurations may be used without departing from the scope of the disclosure. For example, various components in FIGS. 9.1, 9.2, and 9.3 may be combined to create a single component. As another example, the functionality performed by a single component may be performed by two or more components.

Figure 10:
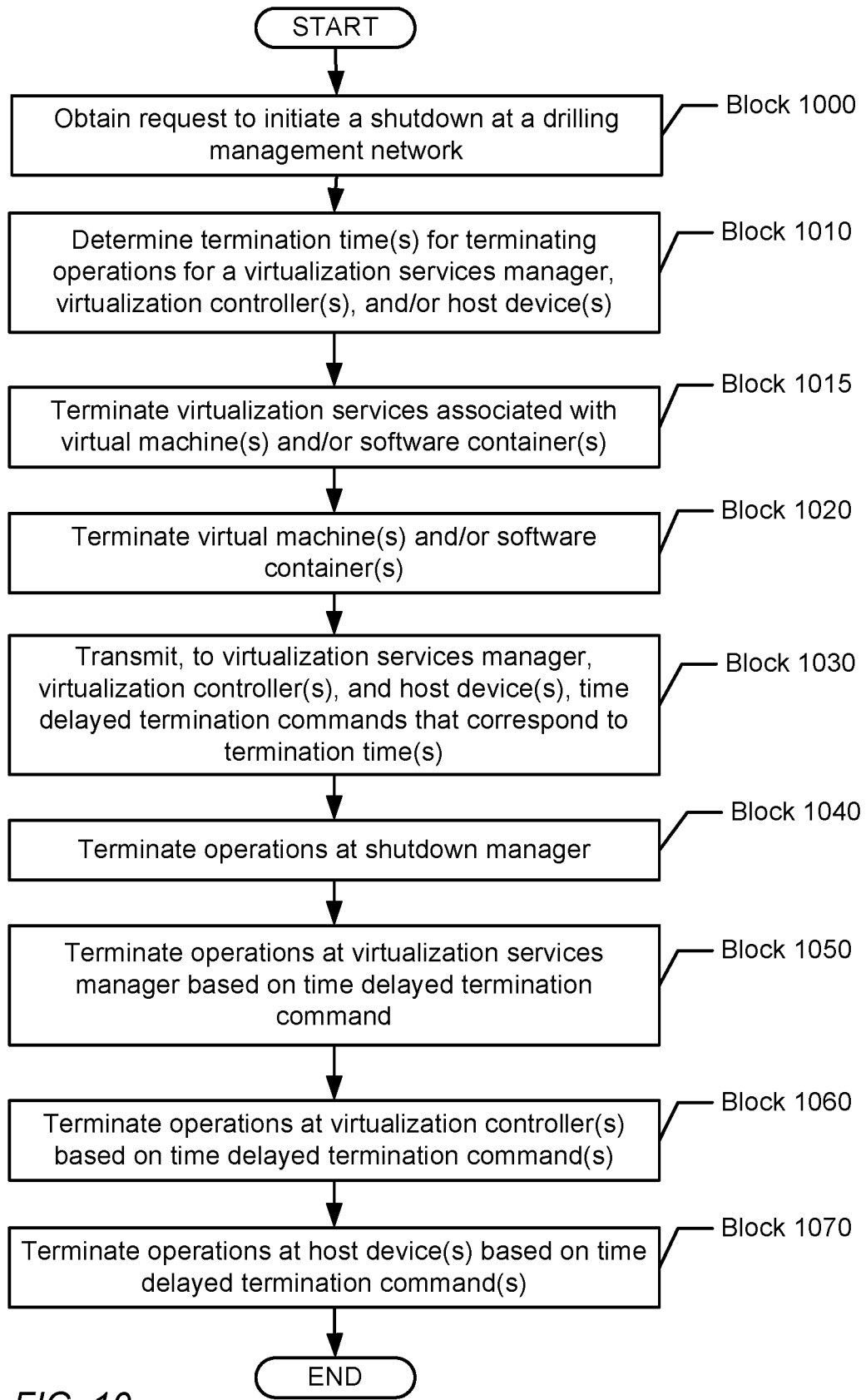

Turning to FIG. 10, FIG. 10 shows a flowchart in accordance with one or more embodiments. Specifically, FIG. 10 describes a method for shutting down a network. One or more blocks in FIG. 10 may be performed by one or more components (e.g., shutdown manager (950)) as described in FIGS. 1, 2, 9.1, 9.2, and/or 9.3. While the various blocks in FIG. 10 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1000, a request to initiate a shutdown at a drilling management network is obtained in accordance with one or more embodiments. For example, a user may provide a user input at a user device on a drilling management network to perform a graceful shutdown. In response to the user input, the user device may transmit a request to a shutdown manager to initiate a process to terminate operations throughout the drilling management network. The request may be a message that identifies a date and/or time as well as which control systems and other network devices are designated for ending operations. In some embodiments, the shutdown manager is similar to shutdown manager (950) described above in FIG. 9.1 and the accompanying description.

In some embodiments, a shutdown manager automatically initiates a shutdown if various shutdown conditions, such as environmental conditions (e.g., temperature, humidity, condensation, etc.), network conditions, and/or drilling operation conditions exceed predetermined operational limits of one or more virtualized systems (e.g., a virtualization services manager, various virtualization controllers, etc.). For example, a shutdown manager and/or a virtualization services manager may monitor a drilling management network for the shutdown conditions. If a particular shutdown condition is detected, the shutdown manager may automatically initiate a shutdown sequence of the drilling management network Thus, the shutdown manager may trigger a graceful shutdown of a network without human intervention. In some embodiments, a shutdown manager may trigger a shutdown in case of a power outage. Thus, the shutdown manager may perform a shutdown of the network before any systems run out of backup power. In some embodiments, for example, once the shutdown manager detects that drilling operations are completed, the shutdown manager initiates a shutdown.

In Block 1010, one or more termination times are determined for a virtualization services manager, one or more virtualization controllers, and/or one or more host devices in accordance with one or more embodiments. A shutdown manager may determine when different software programs and network devices within a drilling management network terminate operations. Moreover, the termination times may correspond to a shutdown sequence describing an order that a shutdown manager, a virtualization services manager, the one or more virtualization controllers, and the one or more host devices terminate operations within the drilling management network. In some embodiments, for example, the shutdown sequence designates the shutdown manager as the first software program or network device to terminate operations. After the shutdown manager ends, the shutdown sequence may designate the virtualization services manager next. After the virtualization services manager ends, the shutdown sequence may designate individual virtualization controllers to terminate operations next. After the virtualization controllers end, the host device may be scheduled to terminate operations. In other embodiments, other shutdown sequences may be used, e.g., where one host device terminates operations before the virtualization services manager or shutdown manager in the shutdown sequence.

In some embodiments, the termination times are based on how much power remains to various hardware devices in a network. For example, in response to a power outage at a network, one or more host device power supplies may communicate to a shutdown manager how many minutes of operation time remaining for the host devices. The shutdown manager may then calculate an allotted amount of time for performing a shutdown process for each virtual machine, software container, virtualization services manager, virtualization controllers, etc. before any device loses power.

In Block 1015, various virtualization services associated with one or more virtual machines and/or one or more software containers are terminated in accordance with one or more embodiments. For example, a virtualization services manager and/or a shutdown manager may communicate with the virtual machines and software containers to stop virtualization services that are being performed by the virtual machines and software containers. The virtualization services may include critical processes where data loss may result from a hard or forceful shutdown of the critical processes.

In Block 1020, one or more virtual machines and/or one or more software containers are terminated in accordance with one or more embodiments. After terminating the virtualization services at the virtual machines and/or software containers, for example, the virtualization services manager and/or the shutdown manager may start a communication with the virtual machines and/or software containers to have the virtual machines and/or software containers terminate as part of a shutdown sequence.

If a virtual machine and/or a software container cannot terminate operations gracefully, e.g., an underlying process for performing a graceful shutdown crashes, the shutdown manager or the virtualization services manager may apply a forceful shutdown to the virtual machine or software container. In particular, the difference between a forceful shutdown and a graceful shutdown may include whether data is successfully saved or lost/corrupted during the termination process.

In Block 1030, various time delayed termination commands corresponding to one or more termination times are transmitted to a virtualization services manager, one or more virtualization controllers, and one or more host devices in accordance with one or more embodiments. In some embodiments, for example, a time delayed termination command for a host device has a delay time of T+X+Y, where T is when the shutdown manager terminates operations, X is where the virtualization services manager terminates operations, and Y is the designated time when the virtualization controllers have terminated operations. The time delayed termination command of a virtualization controller may have a delay time of T+X. Likewise, a time delayed termination command of a virtualization services manager may be T. Thus, the time delayed termination commands may be similar to the time delayed termination commands described in FIG. 9.1 and the accompanying description.

In particular, a shutdown manager may administer a shutdown sequence using the time delayed termination commands, as shown in the example in FIG. 12 below. By administering the shutdown process, the drilling management network may complete a graceful shutdown, which may allow the network to resume operations later with minimum risk of data and system corruption.

Figure 12:
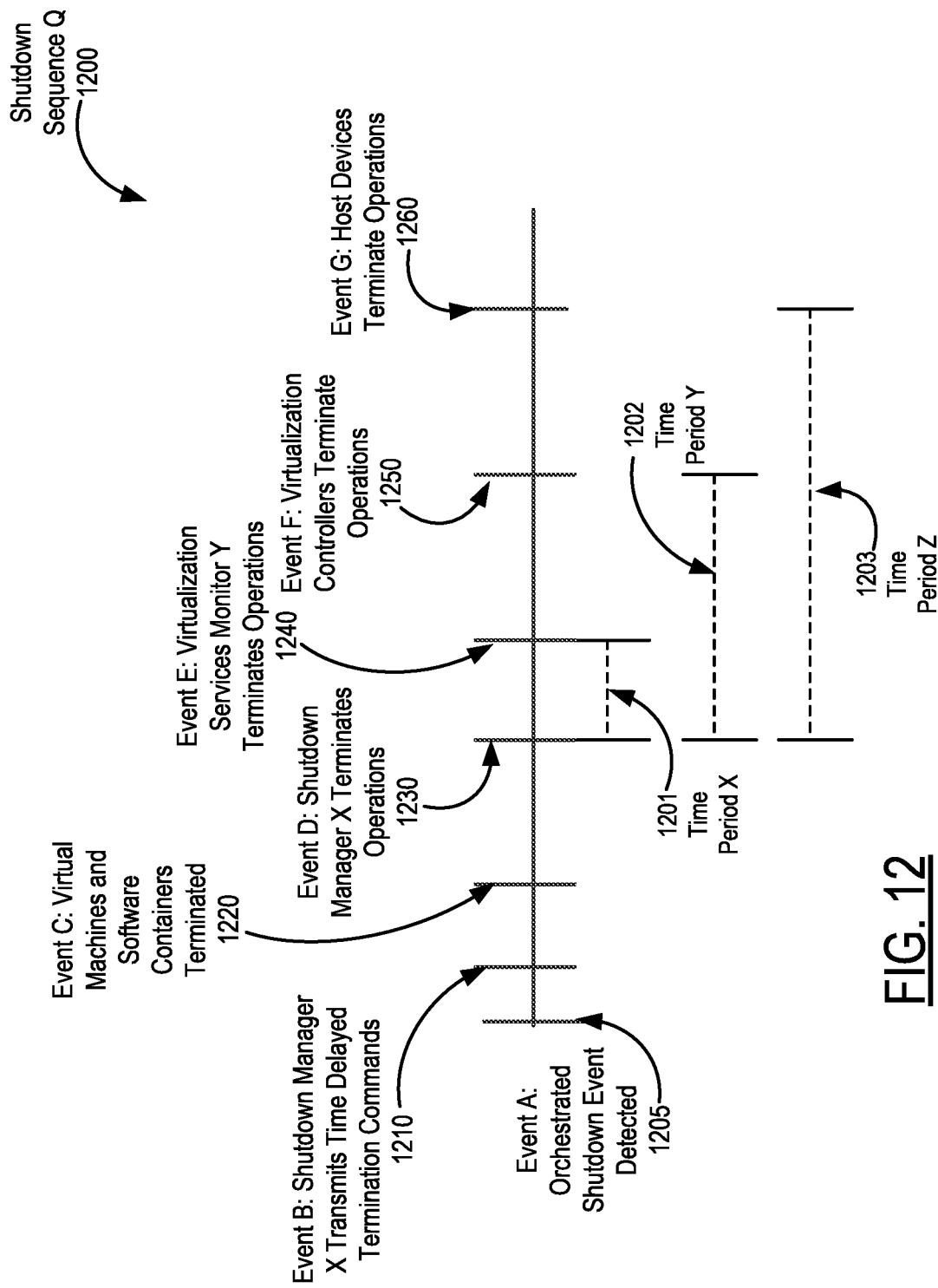

Turning to FIG. 12, FIG. 12 provides an example of a shutdown sequence Q (1200). The following example is for explanatory purposes only and not intended to limit the scope of the disclosure. Turning to FIG. 12, the shutdown sequence Q (1200) includes a sequential series of time events (e.g., event A (1205), event B (1210), event C (1220), event D (1230), event E (1240), event F (1250), and event G (1260). At event A (1205), a shutdown manager X detects an orchestrated shutdown event, e.g., a power outage at a drilling rig, a predetermined environmental condition with respect to a location or device at the drilling rig, etc. At event B (1210), shutdown manager X transmits time delayed termination commands to a virtualization services manager Y, various virtualization controllers, and host devices. At event C (1220), various virtual machines and software containers operating on a drilling rig network are terminated. At event D (1230), the shutdown manager X terminates operations. At event E (1240), a virtualization services manager Y terminates operations based on the time in a respective time delayed termination command. As shown in FIG. 12, the virtualization services manager Y was designated by the shutdown manager to stop operating at time period X (1201). At event F (1250), the virtualization controllers stop operating according to the time in their respective time delayed termination commands, i.e., at time period Y (1202). At event G (1260), the host devices stop operating according to the time in their respective time delayed termination commands, i.e., at time period Z (1203). With respect to event E (1240), event F (1250), and event G (1260), these may be well-timed events where the time periods (1201, 1202, 1203) allow some time for these components to shutdown gracefully. However, where the components become irresponsive such that a service cannot be terminated, the shutdown sequence Q (1200) may proceed to the next event and kill the irresponsive service accordingly. Thus, the time delayed commands provided for a staggered orchestrated shutdown process after the shutdown manager has already ended operations. As such, the termination of operations in event C (1220), event D (1230), event E (1240), event F (1250), and event G (1260) may include graceful shutdowns and/or forceful shutdowns.

While the shutdown sequence Q (1200) in FIG. 12 illustrates one sequence of events for an orchestrated shutdown, other sequence of events are contemplated that include adding and/or removing events from a shutdown sequence. Likewise, operations of various components may be terminated in a different order from the shutdown sequence Q (1200).

Returning to FIG. 10, in Block 1040, operations are terminated at a shutdown manager in accordance with one or more embodiments. Once the time delayed termination commands are transmitted to various network devices, the shutdown manager may ends any processes associated with it. For example, the shutdown manager may be a virtual machine or software container which can be terminated by a virtualization services manager. If the shutdown manager is a hardware device, the shutdown manager may experience a hard shutdown that eliminates power to the shutdown manager. The shutdown manager may be similar to the shutdown manager described above in FIG. 9.1 and the accompanying description.

In Block 1050, operations are terminated at a virtualization services manager based on a time delayed termination command in accordance with one or more embodiments. At a termination time associated with a time delayed termination command, the virtualization services manager may terminate any virtualization services operating over a drilling management network and itself. The virtualization services manager may be similar to the virtualization services manager described above in FIGS. 2A, 2B, and/or 2C and the accompanying description.

In Block 1060, operations are terminated at one or more virtualization controllers based on one or more time delayed termination commands in accordance with one or more embodiments. The virtualization controllers may be similar to the virtualization controllers described above in FIGS. 9.1, 9.2, and/or 9.3 and the accompanying description.

In Block 1070, operations are terminated at one or more host devices based on one or more time delayed termination commands in accordance with one or more embodiments. The host devices may be similar to the host devices described above in FIGS. 9.1, 9.2, and/or 9.3 and the accompanying description.

While terminating operations in blocks 1020, 1040, 1050, 1060, and 1070 may correspond to graceful shutdowns, one or more forceful shutdowns may be employed to terminate operations. For example, a time delayed termination command may trigger a forceful shutdown of a virtualization controller by a host operating system terminating resources associated with the virtualization controller. Likewise, a time delayed termination command may also produce instructions for an electric power supply that ends electric power any hardware associated with a host device, virtual machine and/or software container.

Figure 11:
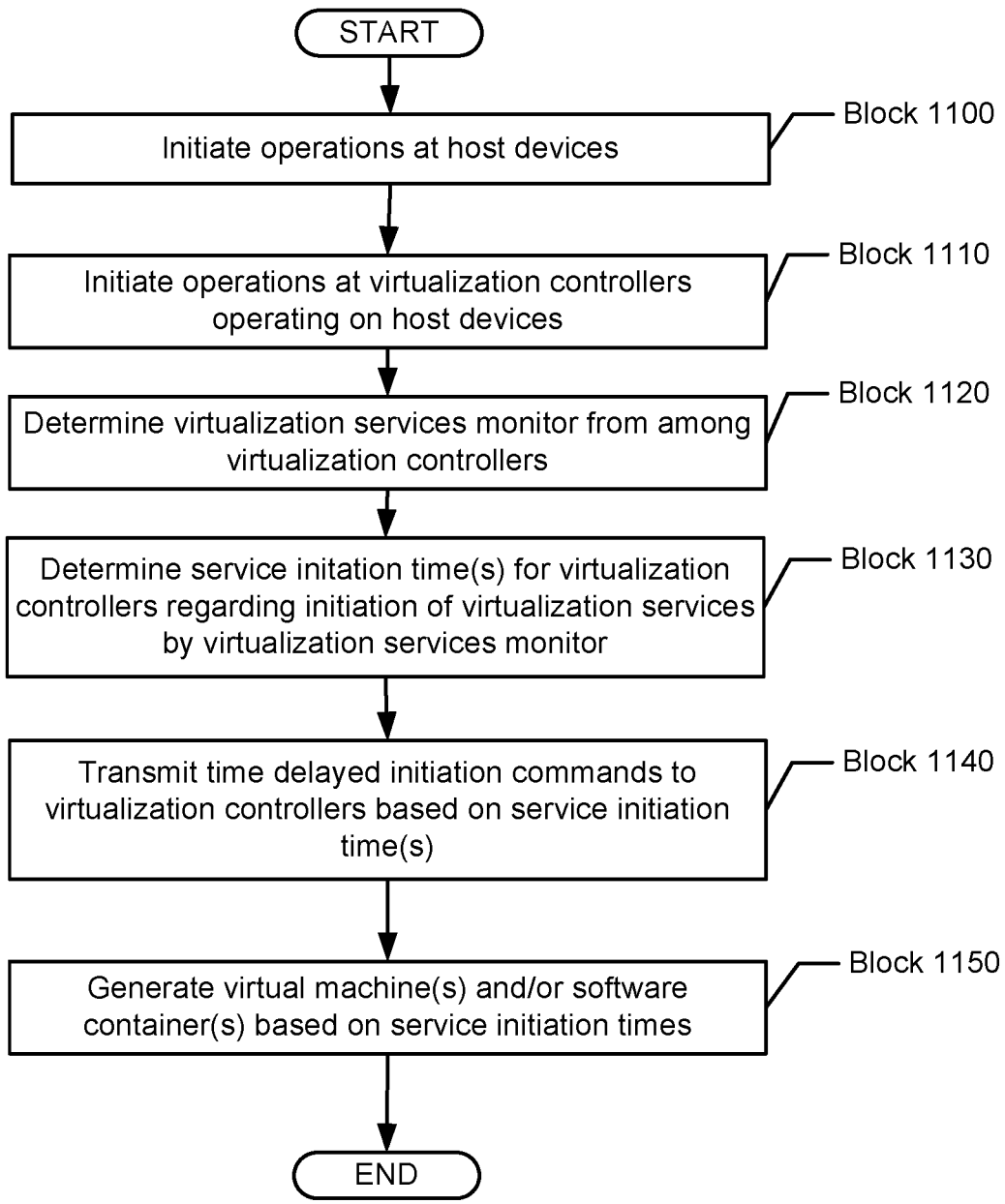

Turning to FIG. 11, FIG. 11 shows a flowchart in accordance with one or more embodiments. Specifically, FIG. 11 describes a method for starting up a network. One or more blocks in FIG. 11 may be performed by one or more components (e.g., virtualization controller X (933)) as described in FIGS. 1, 2, 9.1, 9.2, and/or 9.3. While the various blocks in FIG. 11 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1100, operations are initiated at various host devices in accordance with one or more embodiments. For example, host devices may receive electric power and host operating systems on the host devices may startup.

In Block 1110, operations are initiated at various virtualization controllers operating on various host devices in accordance with one or more embodiments. For example, as part of the host operating system or as a separate software script, the virtualization controllers may begin operating on the host devices. Accordingly, a virtualization controller may transmit and receive information over a drilling management network with other virtualization controllers.

In Block 1120, a virtualization services manager is determined from among various virtualization controllers in accordance with one or more embodiments. Based on communication among the virtualization controllers, one virtualization controller may be selected to be a virtualization services manager. The selection process may be based on the types of control systems being operated on host devices through a drilling management network. For example, a virtualization controller on a host device with the lowest amount of overhead may be elected as the virtualization services manager. The elected virtualization services manager may be similar to the elected virtualization services manager described above in FIG. 9.3 and the accompanying description.

In Block 1130, one or more service initiation times are determined for various virtualization controllers in accordance with one or more embodiments. For example, a virtualization services manager may determine a startup sequence for various virtualization services operating on a drilling management network, such as the order to generate virtual machines and/or software containers for operating various control systems. Accordingly, the initiation times may be similar to the termination times described in FIG. 10, such that various startup operations are staggered. Accordingly, the service initiation times may provide the virtualization services manager to verify that specific virtual machines and/or software containers are operating satisfactorily before the next batch of virtual machines and/or software containers are generated.

In Block 1140, various time delayed initiation commands are transmitted to various virtualization controllers based on various service initiation times in accordance with one or more embodiments. The time delayed initiation commands may be similar to the time delayed initiation commands described above in FIG. 9.3 and the accompanying description.

In Block 1150, various virtual machines and/or software containers are generated based on various service initiation times in accordance with one or more embodiments.

Cybersecurity Framework

In general, embodiments of the disclosure include a system and various methods for accessing assets in one or more security zones. In particular, one or more embodiments are directed to a system that includes one or more conduits coupling two or more security zones. For example, a conduit may provide a communication path between network devices located in different security zones. In some embodiments, a conduit is a temporary conduit that is controlled by a jump host or a virtual connection controller. With a temporary conduit, temporary virtual connections may be established and terminated in order to regulate authorized access to various control systems in a security zone. For example, a temporary conduit may limit network device access to specific times and/or to specifically authorized network devices.

Likewise, control systems in a drilling management network may publish data over one or more unidirectional conduits. For example, a network device may subscribe to data from a respective control system that is provided by a particular unidirectional conduit. When the respective control system broadcasts the data, any subscribers to the data may receive the data over the unidirectional conduit accordingly. However, the unidirectional conduit may prevent subscribers from transmitting commands back across the communication path. Thus, subscribers are limited to a passive role with respect to obtaining data from the unidirectional conduit.

Figure 13:
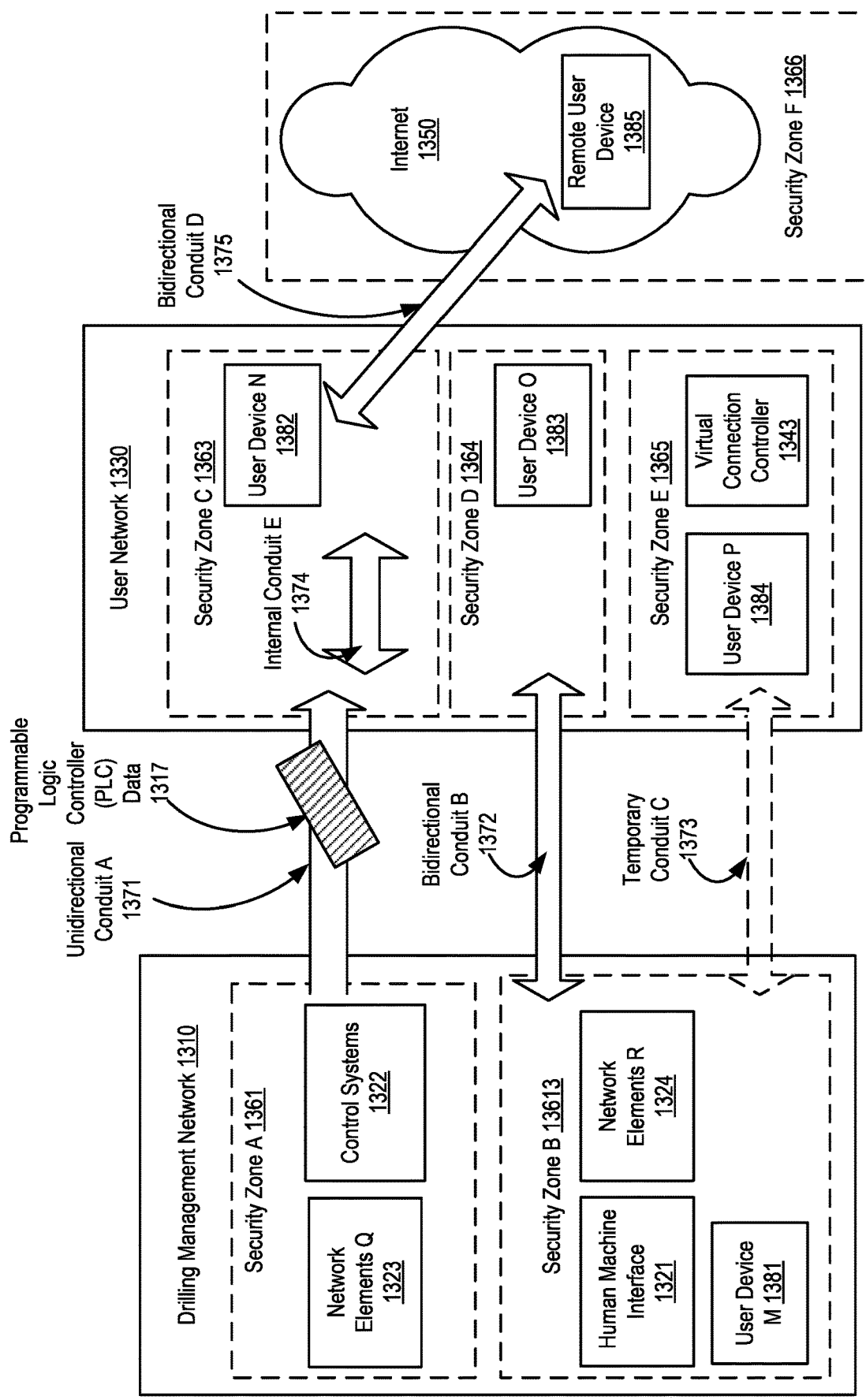

FIG. 13 shows a block diagram of a system in accordance with one or more embodiments. As shown in FIG. 13, a drilling management network (1310) may include a human machine interface (HMI) (e.g., HMI (1321)), a historian, various network elements (e.g., network elements Q (1323), network elements R (1324)) and/or various user devices (e.g., user device M (1381)). A human machine interface may be hardware and/or software coupled to the drilling management network (1310), and which includes functionality for presenting data and/or receiving inputs from a user regarding various drilling operations and/or maintenance operations performed within the drilling management network (1310). For example, a human machine interface may include software to provide a graphical user interface (GUI) for presenting data and/or receiving control commands for operating a drilling rig. A network element may refer to various hardware components within a network, such as switches, routers, hubs, user equipment, or any other logical entities for uniting one or more physical devices on the network. User devices may include personal computers, smartphones, human machine interfaces, and any other devices coupled to a network that obtain inputs from one or more users. In some embodiments, the drilling management network (1310) is coupled to a user network (e.g., user network (1330)). In particular, the user network (1330) may include various network elements (not shown), user devices (e.g., user device N (1382), user device O (1383), user device P (1384)), and/or onsite user equipment. For example, onsite user equipment may include phone systems, personal computers, printers, application servers, and/or file servers located around a drilling rig. Network elements, the human machine interface (1321), onsite user equipment, user devices, and/or the historian may be computing systems similar to the computing system (3400) described in FIGS. 34.1 and 34.2, and the accompanying description.

In one or more embodiments, the drilling management network (1310) includes drilling equipment (e.g., the blowout preventer (99), the drilling rig (12), and other components described above in FIG. 1 and the accompanying description). The drilling management network (1310) may further include control systems (e.g., control systems (1322)) such as various drilling operation control systems and various maintenance control systems that are deterministic network portions. Drilling operation control systems and/or maintenance control systems may include, for example, programmable logic controllers (PLCs) that include hardware and/or software with functionality to control one or more processes performed by a drilling rig, including, but not limited to the components described in FIG. 1. Specifically, a programmable logic controller may control valve states, fluid levels, pipe pressures, warning alarms, and/or pressure releases throughout a drilling rig.

Moreover, a programmable logic controller may be a ruggedized computer system with functionality to withstand vibrations, extreme temperatures, wet conditions, and/or dusty conditions, for example, around a drilling rig. Drilling operation control systems and/or maintenance control systems may also refer to control systems that include multiple PLCs within the drilling management network (1310). Furthermore a control system may be a closed loop portion of a drilling management network that includes functionality to control operations within a system, assembly, and/or subassembly described above in FIG. 1 and the accompanying description. A PLC may transmit PLC data (e.g., PLC data (1317)) to one or more devices coupled to the drilling management network (1310) and/or the user network (1330). PLC data may include sensor measurements, status updates, and/or information relating to drilling operations and/or maintenance operations performed on the drilling management network (1310) that originates on the drilling management network (1310). Likewise, one or more of the control systems (1322) may include functionality to monitor and/or perform various drilling processes with respect to the mud circulation system, the rotating system, a pipe handling system, and/or various other drilling activities described with respect to FIG. 1 and the accompanying description In one or more embodiments, the drilling management network (1310) and/or the user network (1330) are divided into various security zones (e.g., security zone A (1361), security zone B (1362), security zone C (1363), security zone D (1364), and security zone E (1365)). In particular, a security zone may include hardware and/or software that includes functionality to enforce one or more access control policies for noncommunication assets within a portion of a network. For example, an access control policy may designate which users and/or types of users may have access to a noncommunication asset, and/or the ability to perform one or more functions associated with the noncommunication asset. In some embodiments, an access control policy is directed to one or more time windows when predetermined users have access to a respective noncommunication asset. In some embodiments, an access control policy includes various rules allowing network device access to one or more approved software applications, specify which network ports may receive data over a conduit, and/or designate network protocols for using approved Internet Protocol (IP) Addresses across the conduit.

Noncommunication assets may correspond to human machine interfaces, drilling equipment, user equipment, servers, personal computers, various network elements, and/or various network devices. Likewise, a security zone may implement an access control policy using various communication assets. For example, communication assets may include hardware and/or software that includes functionality for transmitting data over a communication path, such as routers, switches, personal computers, and/or other network elements. Enforcement of various access control policies may include network enforcement using various network communication protocols and nonnetwork enforcement, such as physically locking cabinets that host PLCs, servers, switches, firewalls and other equipment.

In some embodiments, security zones are further defined into subzones. For example, each subzone in a security zone may have respective access control policies specific to the subzone and general access control policies that apply to each subzone within the security zone. Subzones may be on separate broadcast domains within a particular security zone.

In one or more embodiments, one or more conduits (e.g., unidirectional conduit A (1371), bidirectional conduit B (1372), temporary conduit (1373), bidirectional conduit D (1375)) couple various security zones. Specifically, a conduit may include communication assets that implement one or more network communication protocols operating between different security zones. For example, a bidirectional conduit (e.g., bidirectional conduit B (1372)) may implement an access control policy that provides similar rules for transmitting and receiving data by network devices located on either security zone coupled by the bidirectional conduit. For example, user device M (1381) may transmit and request the same data over the bidirectional conduit B (1372) as user device O (1383) that is disposed in a different security zone.

In some embodiments, a drilling management network (1310) and/or a user network (1330) includes a unidirectional conduit (e.g., unidirectional conduit A (1371)). A unidirectional conduit may implement an access control protocol that limits certain types of data transfers to a single direction within a network. For example, a unidirectional conduit may provide for transmission of specific types of sensor data to a predetermined security zone, while preventing certain types of data, e.g., setting adjustments, control commands, etc. from being received from the same security zone. As shown in FIG. 13, user device N (1382) may read PLC data (1317) from the control systems (1322), but may not transmit control commands affecting the type of PLC data sent by the control systems (1322).

In some embodiments, a drilling management network (1310) and/or a user network (1330) includes one or more temporary conduits (e.g., temporary conduit C (1375)) coupling two or more security zones. In one or more embodiments, a temporary conduit is a switched virtual connection. For example, a switched virtual connection may include hardware and/or software on a security zone in the drilling management network (1310) and another security zone in the user network (1330) for implementing a virtual connection. Thus, when the switched virtual connection is "open", no virtual connection may exist across the temporary conduit. When the switched virtual connection is "closed", a virtual connection is formed that corresponds to a temporary virtual circuit. The temporary virtual circuit may then provide transmission of network traffic, such as PLC data, between two security zones. In particular, the default state of the switched virtual connection may be where two security zones are disconnected until an authorized user and/or user device requests access. In some embodiments, a virtual connection across a temporary conduit is terminated during drilling operations performed by one or more control systems, while a virtual connection may be established when no drilling operations are present in the drilling management network.

In some embodiments, for example, a temporary conduit is operated by a virtual connection controller (e.g., virtual connection controller (1343)). A virtual connection controller may include hardware and/or software that includes functionality to establish a virtual connection across a temporary conduit. The virtual connection may be, for example, a data link layer connection between two adjacent communication assets, e.g., such as a physical link that includes switches located in different security zones. In other embodiments, the virtual connection may be a point-to-point connection over multiple network nodes. Moreover, the virtual connection controller (1343) may be a virtual machine (VM) or a physical network element located in the drilling management network (1310) and/or the user network (1330). For example, a virtual connection controller (1343) may be a jump host or a network element that communicates with a jump host. In one or more embodiments, for example, the virtual connection controller (1343) includes functionality to power on and/or power off a jump host that provides communication with network devices in a particular security zone.

In some embodiments, a security zone includes one or more internal conduits (e.g., internal conduit E (1374)). For example, an internal conduit may enforce one or more access control policies between two or more noncommunication assets within a single security zone, e.g., communication governed by a specific access control policy between two software applications operating within the single security zone or a single subzone. For example, an internal conduit may enforce an access control policy between a control system operated by a drilling management network and a network device provided by a third party vendor that is outside the control of the drilling management network.

In another embodiment, two control systems located in the same security zone or subzone communicate over an internal conduit. For example, control systems within a security zone may be located on the same broadcast domain. Thus, it may not be feasible to implement a firewall or other communication infrastructure that enforces an access control policy between the two control systems. As such, the internal conduit may implement IP address filtering, port filtering, and/or another type of network filtering for enforcing secure communication between the two control systems. Likewise, when functional network limitations prevent the separation of network devices onto different zones or subzones, such as when network devices are managed by different groups or third parties, communication may still be secured.

In some embodiments, a conduit couples a security zone to a different security zone that is located outside the drilling management network (1310) and the user network (1330). For example, as shown in FIG. 13, a security zone F (1366) corresponds to the Internet (1350). In particular, a remote user device (1385) may communicate over bidirectional conduit D (1375) with user device N (1382) that is disposed in security zone C (1363) located in the user network (1330).

While FIG. 13 shows various configurations of components, other configurations may be used without departing from the scope of the disclosure. For example, various components in FIG. 13 may be combined to create a single component. As another example, the functionality performed by a single component may be performed by two or more components.

Figure 14:
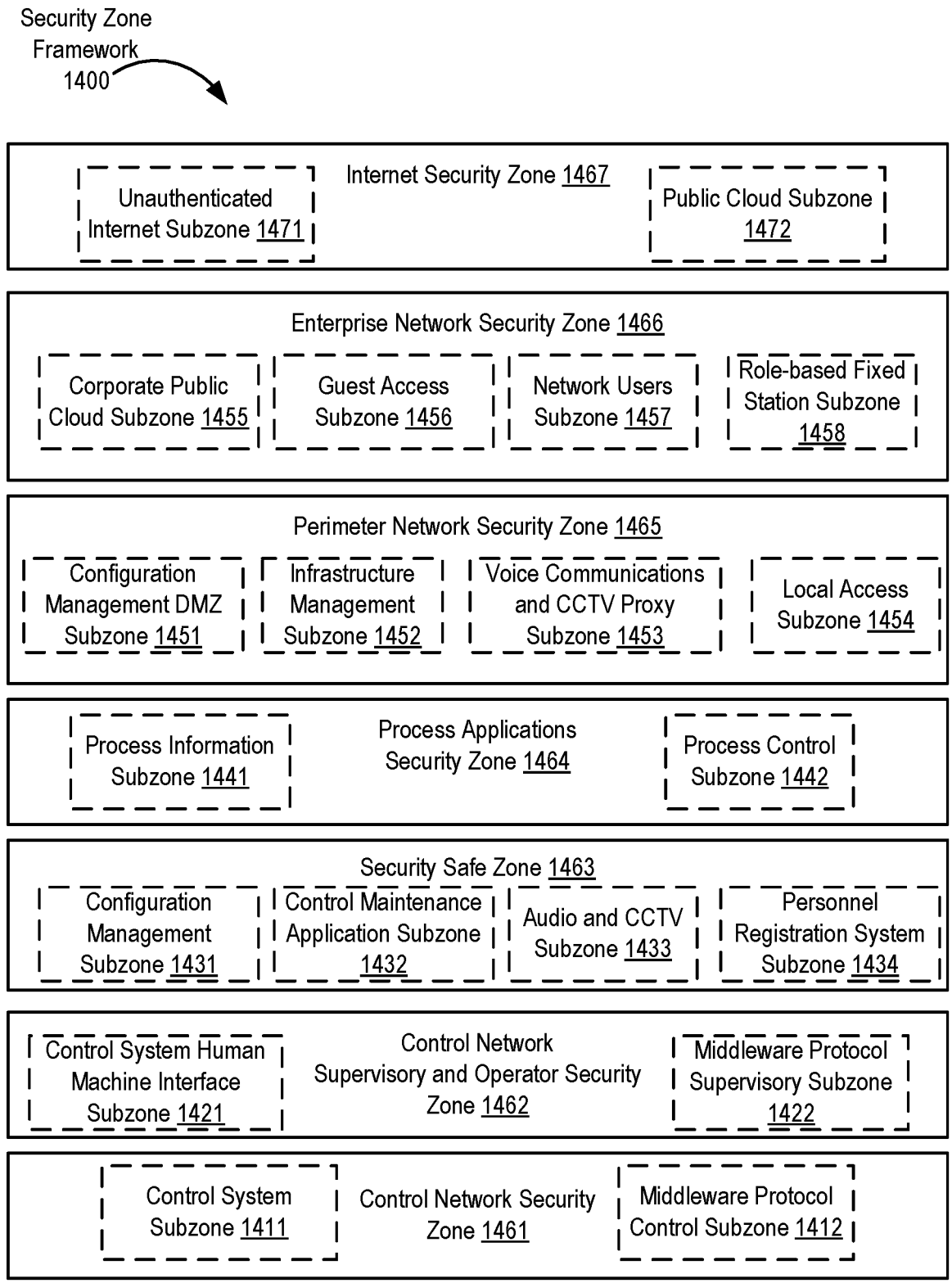

Turning to FIG. 14, FIG. 14 provides an example of a security zone framework (1400) for one or more networks. The following example is for explanatory purposes only and not intended to limit the scope of the disclosure. Turning to FIG. 14, the security zone framework (1400) includes a control network security zone (1461) that includes a control system subzone (1411) and a middleware protocol control subzone (1412). Systems in the control network security zone (1461) and corresponding sub-zones may abide by various access control policies that include storage and computation power being dedicated and cannot be shared with any other security zone. In the control system subzone (1411), control systems here may have fast control loops (e.g., up to 1 kHz) that may be maintained in a deterministic computing environment. The control system subzone (1411) may have the highest level of security within the security zone framework (1400). For example, control loops deadlines in the control system subzone (1411) may affect data availability, whereby data availability may be compromised by increasing network latency or jitter. A conduit between the control system subzone (1411) and the middleware protocol control subzone (1412) may be implemented by a soft PLC (IPC) or a bare metal gateway that translates fieldbus protocols such as EtherNet/IP, Profinet, Profibus, Modbus TCP/IP or EtherCat into a middleware protocol. Soft PLC logic may map fieldbus memory addresses into middleware protocol topics and back accordingly, such as by following a whitelist approach. In the middleware protocol control subzone (1412), one or more middleware protocols may be used to coordinate various control systems. For example, various assets in the middleware protocol control subzone (1412) may interface between equipment control and well construction process control. Here, control loops may be closed loops that operate at high data frequencies (e.g., up to 1 kHz), and may run asynchronously in softer real time.

Moreover, the security zone framework (1400) further includes a control network supervisory and operator (CNSO) security zone (1462) that includes a control system human machine interface (CSHMI) subzone (1421) and a middleware protocol supervisory subzone (1422). The CNSO security zone (1462) may include interfaces for supervisory control, e.g., by human operators or by algorithms that are granted similar access as human operators. As such, the CSHMI subzone (1421) includes a control system interface for human operators, e.g., joystick, touchpad, and/or touchscreens. Specifically, a drilling chair may reside in the CSHMI subzone (1421). A conduit coupling the CSHMI subzone (1421) and the middleware protocol control subzone (1412) may allow human operators to interact with middleware protocol-based representations of the equipment (e.g., description, capabilities, calibration, etc.). The conduit may accordingly grant various control capabilities to various network devices. Likewise, middleware protocol users may be authenticated using various security certificates. Here, subscribe capability and/or data access may be segmented through middleware protocol domains. For example, a bidirectional conduit may couple the middleware protocol supervisory subzone (1422) and the middleware control protocol subzone (1412). This bidirectional conduit may grant coordinated control algorithms a differentiated access to sensor data and to control capability for one or more control systems.

Keeping with the CNSOS security zone (1462), the middleware protocol supervisory subzone (1422) may host various middleware protocol-based advanced coordinated control algorithms that are executed in soft real-time. With respect to the access control policies in the middleware supervisory subzone (1422), various computing environments may be segregated via a virtualization hypervisor and/or physical separations. Control capability and/or data access may also be segmented through middleware protocol domains.

Keeping with FIG. 14, the security zone framework (1400) further includes a security safe zone (1463) that includes a configuration management subzone (1431), a control maintenance application subzone (1432), a voice and closed-circuit television (CCTV) subzone (1433), and a personnel registration system subzone (1434). In particular, the security safe zone (1463) may host support infrastructure that complements assets in the control network security zone (1461) and the CNSOS security zone (1462). For example, access control policies in the security safe zone (1463) may include aggressive operating system patching for MAC address devices that whitelist at physical network connection points. Conduits within the security safe zone (1463) and that exit this zone may be authenticated using security certificates (e.g., middleware protocol, HTTPS) along with managed firewall deep packet inspection.

Keeping with the security safe zone (1463), the personnel registration system subzone (1434) may be where local roles for various security zones and subzones are defined and maintained. The control maintenance application subzone (1432) may include systems tasked with managing updates and upgrades on control systems in the control network security zone (1461). For example, a temporary conduit may couple the control maintenance application subzone (1432) and control system subzone (1411). Upon approval (e.g., a designated time window), the temporary conduit may be enabled to allow transfer of software, firmware and/or configuration upgrades from the control maintenance application subzone (1432) to control systems in the control system subzone (1411). Likewise, the temporary conduit may include multi-factor authentication for access.

Furthermore, the security zone framework (1400) further includes a process applications security zone (1464) that includes a process information subzone (1441) and a process control subzone (1442). The process applications security zone (1464) may include network devices responsible for process control decisions with participation of users and out-of-rig components. In some embodiments, a unidirectional conduit may allow applications and workflows in the process information subzone (1441) to consume data from the middleware protocol subzone (1412). In the process information subzone (1441), network devices may only subscribe to the information pushed by middleware protocol subzone (1412). For example, a sensor device or a control system may publish data that is transmitted over the unidirectional conduit and received by one or more subscribers in the process information subzone (1441). In particular, one or more network communication protocols associated with the unidirectional conduit may implement a software architecture that enables a publish-subscribe model among various network devices on and/or connected to the middleware protocol subzone (1412). If a respective network device or a component of the respective network device is a subscriber for a particular sensor device or control system, data from the sensor device or control system may be relayed over the unidirectional conduit. If a sensor device has five subscribers, for example, sensor data from the sensor device may be transmitted to each of the five subscribers each time that sensor data is broadcast over the unidirectional conduit. Thus, the sensor device may act as a publisher in a publish-subscribe model. In some embodiments, a drilling management network uses a security certificate to authenticate a device before it is allowed to publish or subscribe on the unidirectional conduit.

In the process control subzone (1442), network devices may implement orchestration services that are granted various control capabilities. This zone may be delimited via control capability granted via middleware protocol domain.

The security zone framework (1400) further includes a perimeter network security zone (1465) that includes a configuration management demilitarized (DMZ) subzone (1451), an infrastructure management subzone (1452), a voice communications and CCTV proxy subzone (1453), and a local access subzone (1454). A perimeter network security zone (1465) may correspond to noncommunication assets located in a perimeter network. For example, a perimeter network may be a logical or physical subnetwork of a drilling management network and/or user network that exposes an organization's external facing serves to an untrusted network, e.g., the Internet and/or an enterprise network. The perimeter network security zone (1465) may be a relatively low security level in the security zone framework (1400) and may couple to conduits that interface with the control systems in a drilling management network and with out-of-rig systems.

Staying with FIG. 14, the security zone framework (1400) further includes an enterprise network security zone (1466) that includes a corporate public cloud subzone (1455), a guest access subzone (1456), a network users subzone (1457), and a role-based fixed station subzone (1458). The enterprise network security zone (1466) may correspond to an enterprise network that may connect user devices and network devices across various departments and work group networks. For example, an enterprise network may be an organization's backbone that provides communication and network resources to employees and guests in many different departments. Beyond the enterprise network security zone (1466) is the Internet security zone (1467) that includes an unauthenticated Internet subzone (1471) and a public cloud subzone (1472).

While various conduits are discussed with respect to the security zones and subzones of the security zone framework (1400) of FIG. 14, a person of ordinary skill in the art would know in light of the disclosed technology that one or more unidirectional conduits, one or more bidirectional conduits, and/or one or more temporary conduits may couple any two security zones or subzones of the security zone framework (1400). Likewise, one or more internal conduits may be disposed within any security zone and/or security subzone of the security zone framework (1400).

Figure 15:
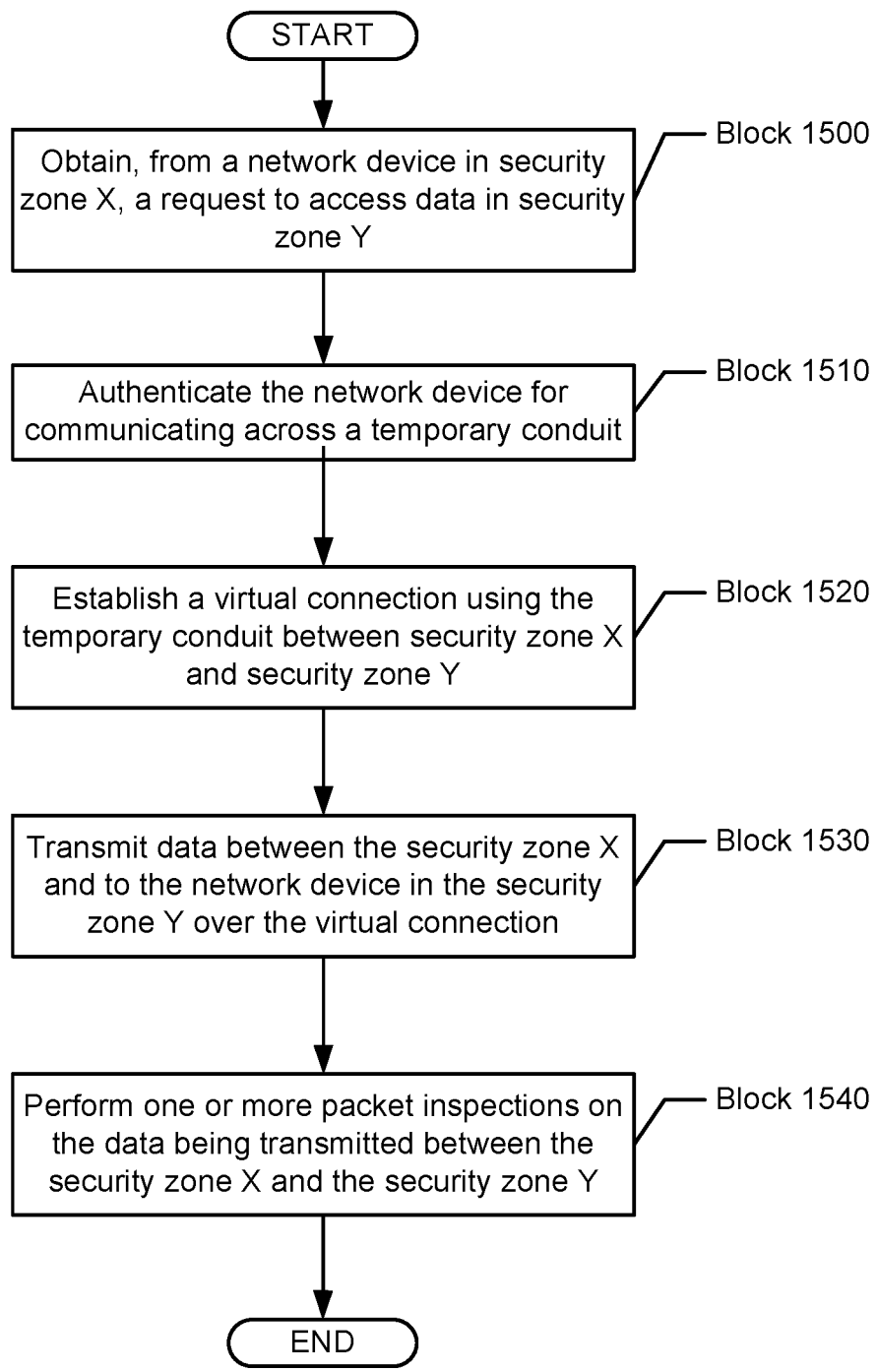

Turning to FIG. 15, FIG. 15 shows a flowchart in accordance with one or more embodiments. Specifically, FIG. 15 describes a method for accessing assets in one or more security zones located in a drilling management network and/or a user network. One or more blocks in FIG. 15 may be performed by one or more components (e.g., virtual connection controller (1343)) as described in FIGS. 1, 2, 13, and/or 14. While the various blocks in FIG. 15 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1500, a request to access data in security zone Y is obtained from a network device in security zone X in accordance with one or more embodiments. For example, a network device may be a user device that transmits a request to a virtual connection controller managing the conduit between the zones. The user device may be connected locally on a user network and/or a drilling management network and/or remotely connected to the virtual connection controller, e.g., over the Internet. Likewise, the user device may be a control system or one or more network elements located in a user network or a drilling management network. For example, a control system may request data from one or more other control systems to perform an algorithm associated with a specific drilling operation. Security zone X and/or security zone Y may be similar to the security zones described above in FIGS. 13 and 14 and the accompanying description.

In Block 1510, a network device is authenticated for communicating across a temporary conduit in accordance with one or more embodiments. For example, the temporary conduit may couple security zone X and security zone Y. In response to obtaining the request in Block 1500, for example, a network device and/or software application may determine whether the network device has permission to access data from one or more noncommunication assets located in a specific security zone. For example, a virtual connection controller may access a user account associated with a user device and/or a user operating the user device. The user account may include user credentials that designate which PLCs a user and/or user device may access. To complete the authentication the network device may require additional user credentials which may be manually entered into the user account by an administrator and/or automatically generated based on various information associated with a user and/or user device stored in the user account or elsewhere.

Furthermore, the user credentials may also specify one or more time windows when a user and/or user device may communicate across the temporary conduit. Likewise, user credentials may time window attributes, such as data fields that provide information regarding starting times, ending times, particular days of the week, month, or year, and allotted amounts of time for various time windows assigned to a user and/or network device. Moreover, time window attributes may describe general time windows and specific time windows.

In one or more embodiments, a virtual connection controller implements a multi-factor authentication for a temporary conduit between two security zones. For example, a user device may log into a user network with a username and password. Accordingly, after establishing a network connection to the user network, the virtual connection controller may request an additional password and/or identification to establish a virtual connection across a temporary conduit. For example, the additional password and/or identification information may be a personal identification number, a biometric identifier such as a fingerprint, personal information regarding the user requesting access, and/or a network device code transmitted independently to a user device.

In some embodiments, for example, a time bounded set of virtual connection credentials are generated for a temporary conduit. For example, the virtual connection credentials may include network and/or firewall configurations for communicating across a virtual connection. Moreover, in response to a virtual connection controller determining that a user device is authorized, the virtual connection credentials may include a network device code specifically generated by a virtual connection controller or other network element for the network device. A network device code may be a pseudorandom or otherwise predetermined alphanumeric sequence that enables a network device to communicate with a PLC and/or control system on the drilling management network.

In Block 1520, a virtual connection is established using a temporary conduit between a security zone X and a security zone Y in accordance with one or more embodiments. If a determination is made that the user device is authorized to access noncommunication assets in a security zone, for example, a virtual connection controller may establish the virtual connection across the temporary conduit. If a switched virtual connection exists between the two security zones, the virtual connection controller may enable network communication across the switched virtual connection to establish the virtual connection. On the other hand, if the determination is made by a virtual connection controller that a network device is not authorized to access one or more specific noncommunication assets in the security zone and/or the user device is not authorized at the current time, the virtual connection may not be established in Block 1520.

In one or more embodiments, a virtual connection controller is shut down and/or physically disconnected from a drilling management network and/or a user network. After a network device is authenticated in Block 1510, the virtual connection controller may power up and establish the virtual connection over the temporary conduit. In some embodiments, a virtual connection controller or other software application may terminate the virtual connection established in Block 1520. For example, a virtual connection controller may remove a data link layer connection that returns the temporary conduit into a closed state. Likewise, firewall settings may be set by a virtual connection controller to block network traffic over the temporary conduit. In the case of a switched virtual connection, the virtual connection controller may set the switched virtual connection to be an open circuit. In one or more embodiments, for example, the virtual connection controller shuts down and disconnects after a determination is made to terminate the virtual connection.

In Block 1530, data is transmitted between a security zone X and to a network device in a security zone Y over a virtual connection in accordance with one or more embodiments. For example, a network device may obtain PLC data from a control system located in security zone X. Likewise, the network device may transmit one or more control commands for adjusting parameters and/or settings in one or more control systems in security zone X. In other words, once a virtual connection is established, a network device may have read and/or control access with respect to one or more noncommunication assets in a particular security zone. For example, in one or more embodiments, access is directed towards control commands being sent into across a temporary conduit to monitor and control assets in the security zone.

In Block 1540, one or more packet inspections are performed on data being transmitted between security zone X and security zone Y in accordance with one or more embodiments. In a packet inspection, one or more portions of transmitted data across a conduit may be analyzed to determined whether one or more access control policies are being violated. For example, a packet inspection may be performed by a firewall and/or one or more network elements in a drilling management network and/or a user network. In some embodiments, for example, a deep packet inspection is performed on data being transmitted over the temporary conduit in Block 1520 or other conduits operating within a drilling management network or user network.

While a temporary conduit is referenced above in FIG. 15 and the accompanying description, in other embodiments, similar blocks may be applied to unidirectional conduits and/or bidirectional conduits. Likewise, the embodiments described in reference to FIG. 15 may also be applied to internal conduits operating within a single security zone. Moreover, subzones may be used in place of security zones in the technologies described above in FIG. 15.

Control System Cybersecurity

In general, embodiments of the disclosure include systems and methods for communicating with network devices in a control zone of a drilling management network. In particular, one or more embodiments are directed to a system that includes a firewall device that couples a control zone with a management zone. For example, control systems for performing drilling operations and maintenance operations may be disposed within the control zone, while the management zone includes network devices that are dedicated to managing and administering processes using the control systems. Likewise, a zero-trust network topology may be implemented within a control zone that only allows network communication between devices with advance authorization.

In some embodiments, one or more security agents are disposed on various network devices within a control zone. A security agent may be a component within a host network device where the security agent is responsible for managing communication with the host network device and devices located outside the control zone. For example, the security agent may monitor its host network device and network traffic to determine different time windows for transferring data. Because of a potentially high network volume, the security agent may need to determine a particular time when a data transfer does not interfere with control processes. In order to perform a software installation, for example, the security agent may need to orchestrate a software installation file transfer to the host network device. After obtaining the file, the software agent may then determine an appropriate time for executing the software installation with the file.

Figure 16:
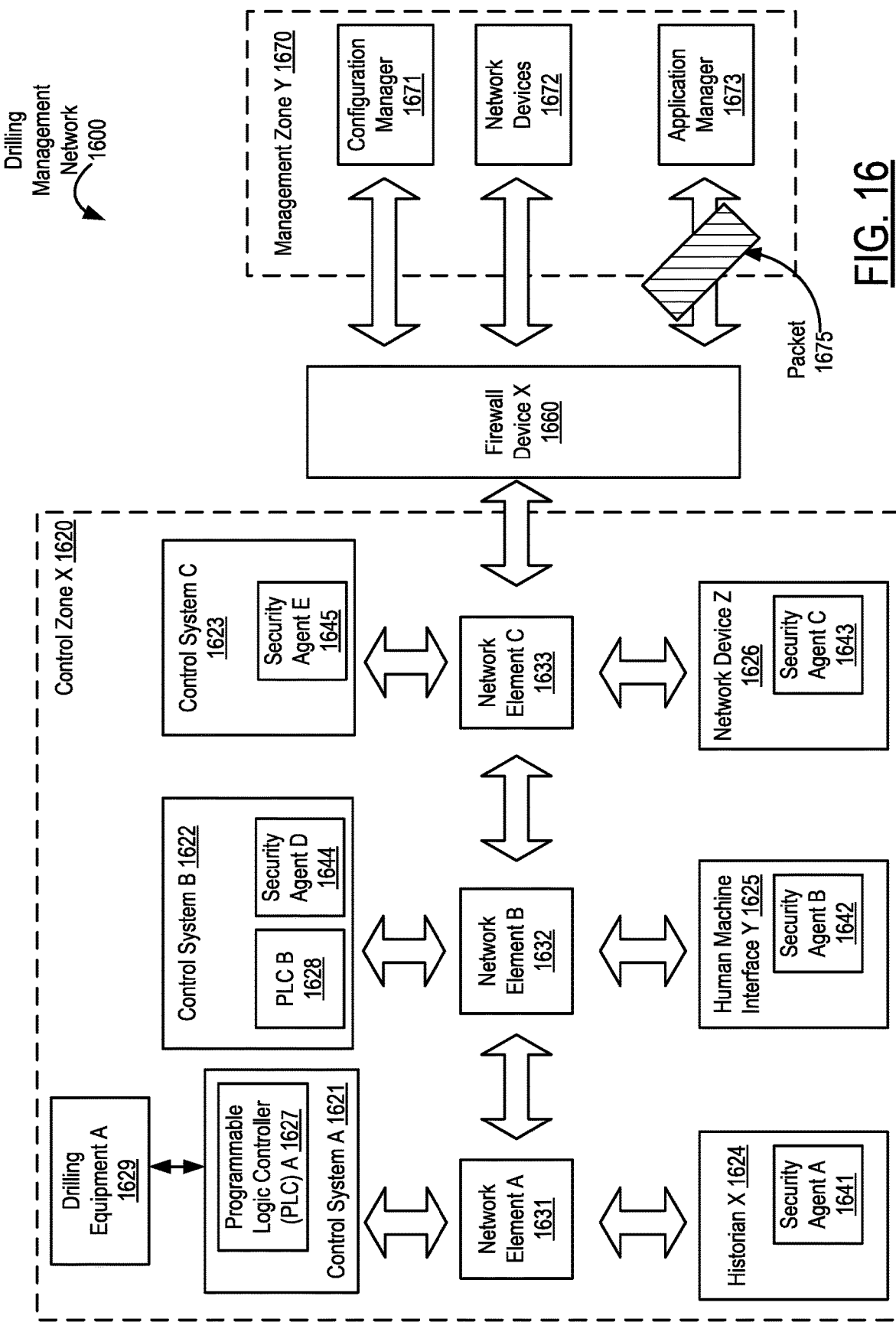

Turning to FIG. 16, FIG. 16 shows a block diagram of a system in accordance with one or more embodiments. As shown in FIG. 16, a drilling management network (1600) may include various network zones (e.g., control zone X (1620), management zone Y (1670)) coupled to a firewall device (e.g., firewall device X (1660)). In one or more embodiments, the drilling management network includes a control zone (e.g., control zone X (1620)) with various control systems (e.g., control zone A (1621), control system B (1622), control system C (1623)) and network elements (e.g., network element A (1631), network element B (1632), network element C (1633)). In particular, a control zone may include various deterministic systems, such as control systems, that operate in a closed loop network portion of the drilling management network. Within the closed loop portion, control systems may operate using high speed data transfers and precise timing requirements. For example, status requests may occur between network devices in a control zone at very high frequencies, e.g., between microseconds to milliseconds.

Furthermore, control systems may include hardware and/or software with functionality to perform various drilling operations and/or various maintenance operations. For example, drilling operation control systems and/or maintenance control systems may include, for example, programmable logic controllers (PLCs) (e.g., PLC A (1627), PLC B (1628)) that include hardware and/or software with functionality to control one or more processes performed by a drilling rig, including, but not limited to the components described in FIG. 1. With respect to PLCs, a programmable logic controller may control valve states, fluid levels, pipe pressures, warning alarms, and/or pressure releases throughout a drilling rig. Moreover, a programmable logic controller may be a ruggedized computer system with functionality to withstand vibrations, extreme temperatures, wet conditions, and/or dusty conditions, for example, around a drilling rig. Drilling operation control systems and/or maintenance control systems may also refer to control systems that include multiple PLCs within the drilling management network (1600). Moreover, control systems may be coupled to drilling equipment (e.g., drilling equipment A (1629), the blowout preventer (99), the drilling rig (12), and other components described above in FIG. 1 and the accompanying description).

Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

In some embodiments, one or more control zones are coupled to a management zone (e.g., management zone Y (1670)). For example, the management zone Y (1670) may be a portion of the drilling management network (1600) that includes various network elements (not shown), network devices (e.g., network devices (1672)), one or more configuration managers (e.g., configuration manager (1671)), and/or one or more application managers (e.g., application manager (1673)). For example, a management zone may be a security safezone outside the control zones. In particular, administration of the network devices within a control zone may be outsourced to other network devices located in one or more management zones.

Likewise, by using a firewall device outside a control zone, packet filtering may have a limited impact on network response time within the control zone. Thus, a control zone that operates with a huge volume of data may preserve its computing capacity by being unaffected by a firewall device processing packets. For example, packets entering a control zone are searched, while packets within the control zone may travel unimpeded. For more information on packet filtering between a control zone and a management zone, see FIG. 18 and the accompanying description.

Figure 17:
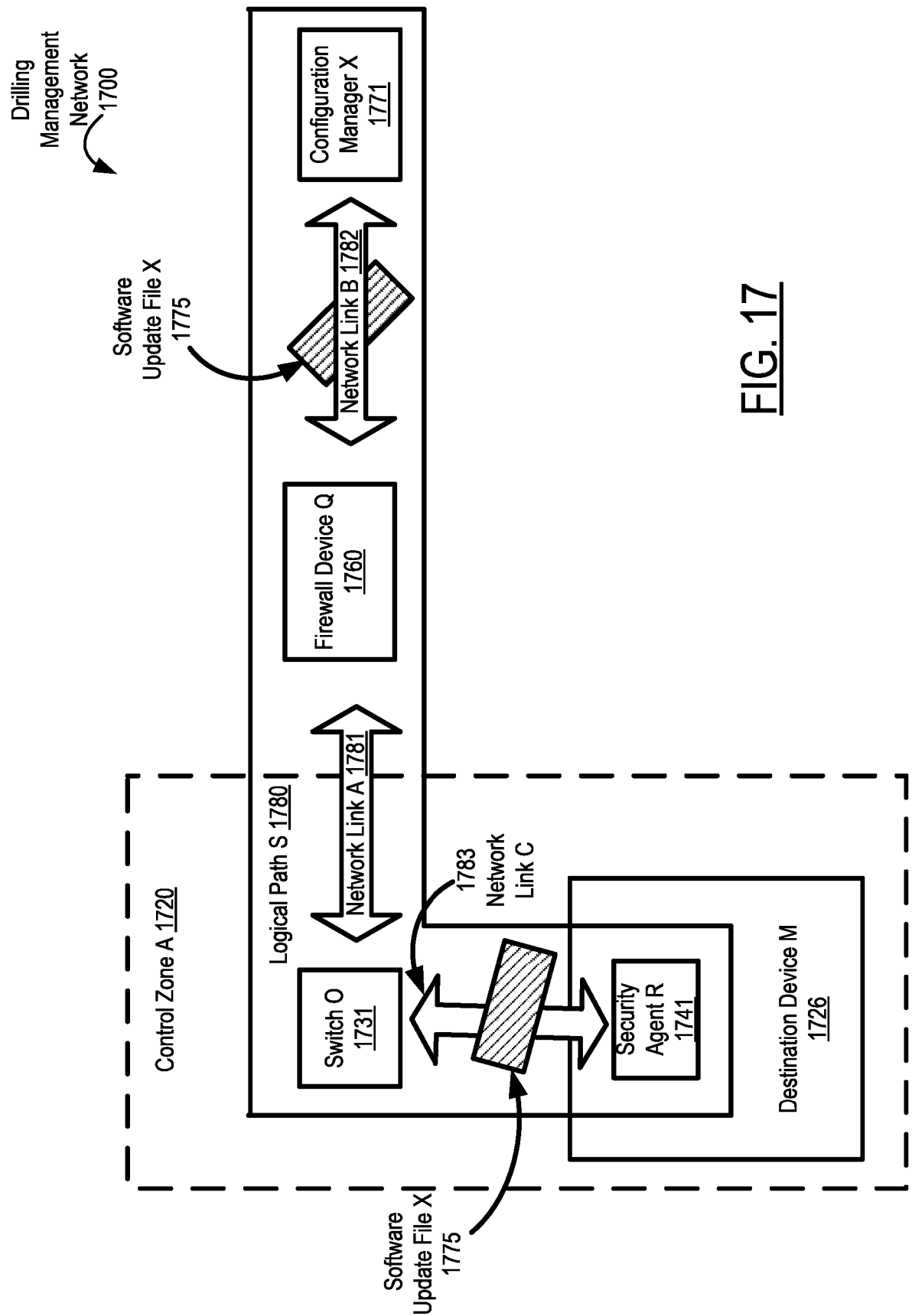

Turning to FIG. 17, FIG. 17 provides an example of a security agent obtaining a software update file. The following example is for explanatory purposes only and not intended to limit the scope of the disclosed technology. In FIG. 17, a security agent R (1741) communicates with a configuration manager X (1771) acting as a source device over a drilling management network (1700). In particular, the security agent R (1741) operates on a destination device M (1726) that is located in control zone A (1720). The security agent R (1741) obtains a software update file X (1775) over a logical path S (1780). The logical path S (1780) includes various network links (i.e., network link A (1781), network link B (1782), network link C (1783)) that span a firewall device Q (1760) and a switch O (1731). Thus, the firewall device Q (1760) detects that the configuration manager X (1771) is authorized to transmit data to destination device M (1726) and relays packets associated with the software update file X (1775) into the control zone A (1720). Within the control zone A (1720), the switch O (1731) determines that packets associated with the software update file X (1775) can be relayed to destination device M (1726).

Keeping with FIG. 17, once the security agent R (1741) obtains the software update file X (1775), the security agent R (1741) analyzes the control zone A (1720) and the destination device M (1726) to determine whether network conditions exist for installing the software update file X (1775). Once the security agent R (1741) detects that network conditions exist for an available installation network state, the security agent R (1741) then executes the software update file (1775) to update one or more software programs operating on the destination device M (1726).

Returning to FIG. 16, in some embodiments, a management zone includes one or more configuration managers (e.g., configuration manager (1671)). In particular, a configuration manager may include hardware and/or software that includes functionality for managing software installations and other software processes throughout one or more control zones. For example, a configuration manager may determine whether a new software version exists for a software application operating on a respective device within a control zone. Accordingly, a configuration manager may determine whether the new software version poses any conflicts with a control system and/or other network devices within the control zone and if the new software version warrants being installed on the respective device. As such, the configuration manager may include functionality for managing software updates and other software configuration adjustments. Likewise, adjusting software configurations may include change different software settings, such as computer resources associated with a software application, time settings when software processes operate, etc. In some embodiments, a configuration manager includes functionality for adding and/or removing network devices from a control zone, e.g., by validating and/or devalidating a particular network device.

Moreover, a management zone may include one or more application managers (e.g., application manager (1673)). Specifically, an application manager may include hardware and/or software with functionality to manage various closed loop processes performed within a control zone. In particular, an application manager may be remote from control applications being operated by control systems, and thus more flexible than the control applications in regards to computing power and network resources. For example, an application manager may include functionality for coordinating different control systems and other network devices to operate in conjunction and without interference in a control zone.

Keeping with FIG. 16, control zones may further include various network devices (e.g., human machine interface (HMI) Y (1625), historian X (1624), network device Z (1626)), and various network elements (e.g., network element A (1631), network element B (1632), network element C (1633)). Network devices may include personal computers, control systems, smartphones, human machine interfaces, user devices, drilling equipment, onsite user equipment, and any other devices coupled to a drilling management network. A human machine interface may be hardware and/or software coupled to the drilling management network (1600), and which includes functionality for presenting data and/or receiving inputs from a user regarding various drilling operations and/or maintenance operations performed within the drilling management network (1600). For example, a human machine interface may include software to provide a graphical user interface (GUI) for presenting data and/or receiving control commands for operating a drilling rig. The historian may include hardware and/or software for collecting and/or analyzing sensor data obtained within a control zone. A network element may refer to various hardware components within a network, such as switches, routers, hubs, user equipment, or any other logical entities for uniting one or more physical devices on a network. Network elements, human machine interfaces, historians, network devices, and/or control systems may be computing systems similar to the computing system (3400) described in FIGS. 34.1 and 34.2, and the accompanying description.

While FIGS. 16 and 17 show various configurations of components, other configurations may be used without departing from the scope of the disclosure. For example, various components in FIGS. 16 and 17 may be combined to create a single component. As another example, the functionality performed by a single component may be performed by two or more components.

Figure 18:
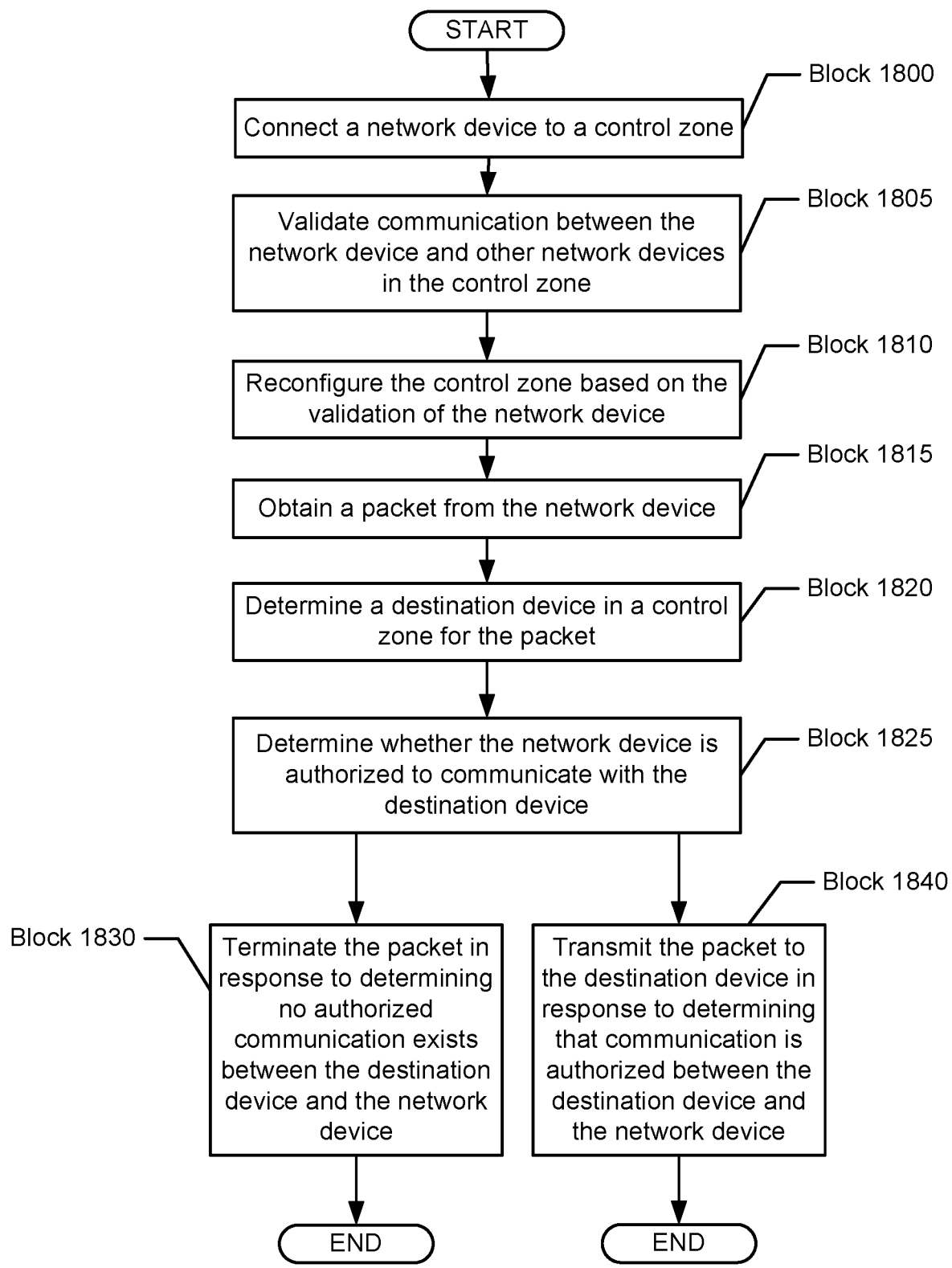

Turning to FIG. 18, FIG. 18 shows a flowchart in accordance with one or more embodiments. Specifically, FIG. 18 describes a method for communicating with one or more network devices in a control zone of a drilling management network. One or more blocks in FIG. 18 may be performed by one or more components (e.g., firewall device X (1660)) as described in FIGS. 1, 2, 16, and/or 17. While the various blocks in FIG. 18 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1800, a network device is connected to a control zone in accordance with one or more embodiments. In particular, the network device may establish a network connection with a drilling management network that includes the control zone. The network connection may be established manually by a technician that enables one or more drilling management network ports connected to the network device. The network device may be similar to one of the network devices described in FIG. 16 and the accompanying description, e.g., control system B (1622), historian X (1624), etc.

In Block 1805, communication between a network device and other network devices in a control zone is validated in accordance with one or more embodiments. Specifically, the validation may determine which devices may be authorized destination devices for the validated network device in the control zone. For example, the network device may have one or more network credentials that grant communication access to various devices in the control zone. The network credentials may be provided by a human operator onsite that is setting up the network device in the control zone. Likewise, the network credentials may be stored in the network device and validation may be performed automatically by one or more software protocols operating on the network device and/or the drilling management network. For example, a configuration manager may analyze network credentials for a network device in order to perform the validation.

In some embodiments, a network device broadcasts network credentials throughout a control zone in order to perform a validation. As such, network devices in the control zone may each analyze the network credentials to determine whether the network device may be an authorized source device. Thus, decentralized network protocols may be performed in the control zone for validations.

In Block 1810, a control zone is reconfigured based on a validation of a network device in accordance with one or more embodiments. Depending on the destination devices for a validated network device, various network elements, firewall devices, etc. inside and/or outside the control zone may be reconfigured to enable communication between the validated network device and the destination devices.

In some embodiments, for example, a configuration manager in a management zone obtains the validation information associated with a validated network device. As such, the configuration manager may update one or more network tables stored on various switches, routers, etc. in the drilling management network to enable the validated communication.

In Block 1815, a packet is obtained from a network device in accordance with one or more embodiments. For example, one or more packets may be transmitted over a logical path that includes a firewall device in a drilling management network. The logical path may includes various network nodes that provide a path through the drilling management network to a control zone, for example. As such, when a firewall device, switch, or other network element in a logical path obtains a packet, further analysis may be performed on the packet by the respective intermediary device.

In Block 1820, a determination is made for a packet regarding a destination device in a control zone in accordance with one or more embodiments. In particular, a packet or a source device of the packet may be analyzed to determine the desired destination device. For example, a packet may include a destination network address that specifies the final location of the packet within a drilling management network. Likewise, the control zone and destination device may be similar to the control zones and/or destination devices described above in FIGS. 2 and 3 and the accompanying description.

In some embodiments, a network device in a management zone is associated with a respective device in a control zone. Thus, a firewall device may identify the appropriate destination device based on which device or application is sending the packet.

In Block 1825, a determination is made whether a network device is authorized to communicate with a destination device in accordance with one or more embodiments. In particular, a drilling management network may implement various security protocols to ensure that network traffic through a control zone is limited to predetermined types and/or quantities of data. For example, restricting network traffic, even at a firewall device's edge, may not be common. Thus, a firewall device and/or other network elements coupled to a control zone may take a zero-trust approach to packets entering the control zone as well as packets already traveling inside the control zone. As such, control zones may provide a network topology that dynamically tracks and monitor network traffic between authorized and unauthorized devices in a closed loop portion of a network. If a process stops within the closed loop portion, for example, network elements and/or a firewall device may map the process break to a specific location within a control zone.

In some embodiments, a drilling management network may store network information, such as network addresses, network protocols, network dependencies, and port numbers, for each network devices coupled to the drilling management network. Based on this network information, a control zone may limit network communication to authorized locations in the drilling management network. For example, a firewall device may analyze a packet's source device and destination device with a lookup table to determine whether communication is authorized.

In some embodiments, a drilling management network determines a potential security compromise by detecting a packet within an unauthorized communication. For example, where a firewall device obtains a packet for transmission to an unauthorized destination device, the firewall device may provide an alarm notification of the unauthorized communication. Thus, various security compromises in a management zone may be identified to addition to compromises within a control zone.

In Block 1830, a packet is terminated in response to a determination that no authorized communication exists between a destination device and a network device in accordance with one or more embodiments. Based on a determination that a packet is not authorized for transmission to a destination device, a firewall device and/or other network elements may terminate the packet. For example, a control zone may perform packet filtering at the edge of the control zone with a firewall device or within a control zone using a switch or other network element.

In one embodiment, for example, if a pump's PLC only needs to communicate with an HMI, then that communication may be the only allowed communication for the pump's PLC within the control zone. If a packet attempts to travel anywhere else within the control zone, the packet is terminated. This termination process may be implemented using switches (e.g., network elements (1631, 1632, 1633) as shown in FIG. 16 between the PLC A (1627) and the historian X (1624) or the network device Z (1626)). Accordingly, in some embodiments, a device analyzes a packet header to determine whether the packet has authorization to communicate with the destination device. For example, network elements within a control zone may ignore the contents, i.e., data in the payload, of a packet and merely filter based on destination network addresses and/or source network address of the packets. In another embodiment, the contents may be reviewed by a network device, e.g., a security agent operating on a host network device. If a source device is authorized to communicate with a destination device, a firewall device may scan the source network address and the destination network address of the packet to make the determination accordingly.

In Block 1840, a packet is transmitted to a destination device in response to a determination that communication is authorized between the destination device and a network device in accordance with one or more embodiments. Where a network device is authorized to communicate with a destination device within a control zone, a firewall device and/or other network element may forward the packet through the control zone.

In some embodiments, the network architecture implemented in FIGS. 16, 17, and/or 18 allows a drilling management network to thin down the network resources for PLC control, i.e., by minimizing what resources are needed to operate the pump, etc. On the other side, the management processes for controlling different control systems within a control zone may operate and be placed beyond a firewall device. Metaphorically, a human arm may be analogous to the PLCs of control systems in a control zone. Actual arm movement is functional, but how an arm moves and the destination that an arm is moving may be determined by a brain, which corresponds to a location outside the control zone and beyond a firewall device. In other words, planning and orchestration efforts for control systems may be placed outside the control zone and execution is placed inside the control zone.

Furthermore, security risks may exist in accessing systems in a control zone. For example, remote access may be provided to troubleshoot devices, update control systems, and pull files to and/or from the outside a drilling management network. FIG. 18 and the accompanying description provides secure management protocols that may ensure various automated methods can automatically transmit data into the control zone or obtain data from the control zone without human intervention into the data transfer processes.

Figure 19:
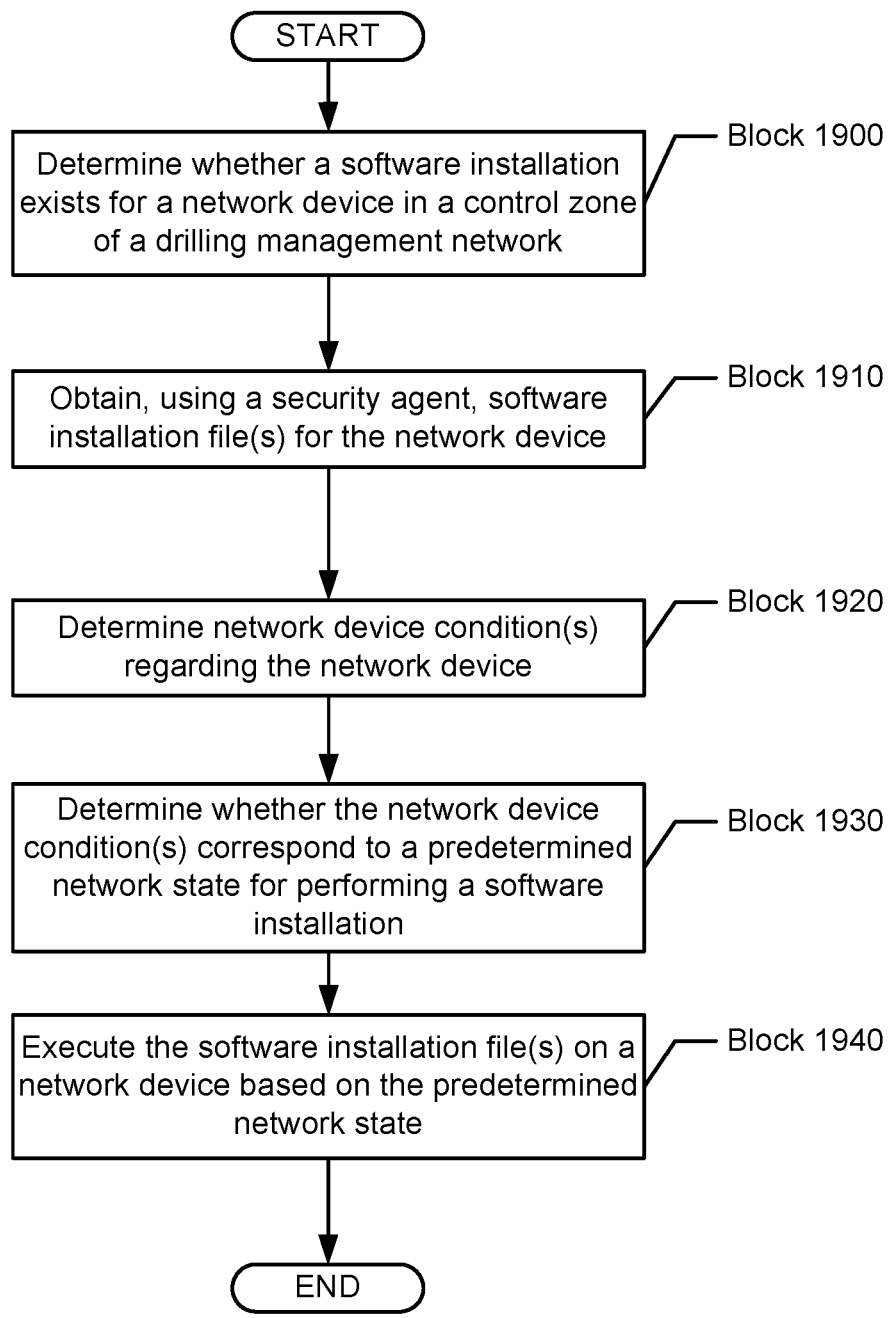

Turning to FIG. 19, FIG. 19 shows a flowchart in accordance with one or more embodiments. Specifically, FIG. 19 describes a method for installing software on a network device in a control zone. For example, the flowchart in FIG. 19 may be performed in addition or separately to the flowchart described in FIG. 18. One or more blocks in FIG. 19 may be performed by one or more components (e.g., security agent C (1643)) as described in FIGS. 1, 2, 16, and/or 17. While the various blocks in FIG. 19 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1900, a determination is made whether a software installation exists for a network device in a control zone of a drilling management network in accordance with one or more embodiments. The network device may be a control system, historian, HMI, or other network device as described in FIG. 16 and the accompanying description. For example, a configuration manager may store software version information regarding control systems and/or other network devices within a control zone of a drilling management network. Accordingly, when a new software version is released, the configuration manager may obtain a notification of the new software version. As such, the configuration manager may automatically determine whether a software update exists for a network device.

Moreover, a configuration manager may obtain a request, e.g., from a human user or an automated process, to install a software application on one or more network devices in a control zone. Rather than replace an existing software version, the configuration manager may orchestrate an entirely new software installation. For example, if a control system is being added to a control zone, one or more software installations may be designated for the added controls system.

In Block 1910, one or more software installation files are obtained using a security agent in accordance with one or more embodiments. For example, a configuration manager may communicate with a security agent located on a host network device. The configuration manager may push a software installation file to the device for updating software on the device. For example, the software installation file may be relayed from a configuration manager in a management zone to the host network device in a control zone in a similar manner as described above in FIG. 18 and the accompanying description. In some embodiments, or example a firewall device may search a software installation file before entering a control zone. In some embodiments, a security agent monitors network traffic within a control zone until an available time window occurs for transmitting a software installation file to the host network device.

Once the security agent obtains a software installation file, the file may be placed in storage until a predetermined execution time occurs that is associated with a predetermined network state. For more information on predetermined network states, see Blocks 1930 and 1940 and the accompanying description below.

In Block 1920, one or more network device conditions are determined regarding a network device in accordance with one or more embodiments. In some embodiments, for example, a security agent monitors activity on a host network device, such as drilling operations and/or maintenance operations. As such, network device conditions may correspond to activity on the host network device, e.g., whether the host network device is currently occupied with control operations and not suitable for a software installation. Likewise, network device conditions may also describe activity within a control zone or drilling management network. For example, if other control systems require the host network device to be online for performing various processes, the security agent may identify the dependent control systems among the network device conditions.

In Block 1930, a determination is made whether one or more network device conditions correspond to a predetermined network state for performing a software installation in accordance with one or more embodiments. For example, the security agent may prevent a software installation file from being executed until certain network device conditions are met by the host network device. In particular, once a security agent confirms in Block 1920 that one or more network device conditions match a predetermined network state, then the security agent may proceed with the software installation. An example of a predetermined network state is when drilling and maintenance operations are terminated at a drilling management network. Another predetermined network state is at a low network traffic period during the night time. Another example of a predetermined network state is when one or more control systems are offline for maintenance, and thus provides a time window for other control systems to perform local operations.

Moreover, once a predetermined state occurs, the security agent may communicate with a configuration manager and/or other network devices in a control zone or management zone to perform the software installation. In some embodiments, a security agent determines a predetermined network state for obtaining the software installation file in Block 1910.

In Block 1940, one or more software installation files are executed on a network device based on a predetermined network state in accordance with one or more embodiments. For example, a software installation file execution may include modifying one or more settings on the host network device, extracting contents from the file, running software applications with the file, scanning the file for viruses, etc.

Once a predetermined network state is determined, software installation files may be proceed on a host network device while the host network device remains in the predetermined network state. In some embodiments, a security agent may detect a change in the predetermined state and thus automatically terminate the software installation.

Keeping with FIG. 19 and the accompanying description, control systems on a drilling management network have typically been static over time, i.e., control systems may be rarely updated with new software. Thus, the functionality of a device within a control system may rarely change. Because control systems in a drilling rig are production systems, changing software on a network device may result in a huge cost to production. Thus, changes on industrial control side are very slow.

However, as remote access is increasingly provided for control systems, historians, and other network devices within a drilling management network, increasing cybersecurity risks exist due to that level of access. Thus, the processes described above in FIGS. 18 and 19 provide embodiments for both enforcing security within a control zone of a drilling management network, while also adding and/or updating security within the control zone. As such, control system processes may be managed alongside periodic software updates within the control zone, and thereby prevent many cybersecurity threats.

Secure Data Replication

In general, embodiments of the disclosure include a system and various methods for providing a data management architecture within a drilling management network. In particular, one or more embodiments are directed to a system that includes a data management controller that administers data transfers between the drilling management network and remote devices. In some embodiments, for example, the network connection is a low throughput connection. As such, the data management controller may administer the transfer of various data files using the low throughput connection over a predetermined amount of time. After completion of the data transfers, the data files are stored in various persistent storage devices based on predetermined data types, such as software images, data models, etc. In some embodiments, persistent storage devices are segregated based on data associated with various network operating conditions, such as production conditions and staging conditions. For example, staging conditions may be where software and/or hardware in a drilling management network is undergoing tests prior to use in actual production conditions.

Once data is stored in persistent storage devices, various security protocols may be implemented on the drilling management network to enable safe usage of the data by network devices throughout the drilling management network. For example, by maintaining data in a corresponding persistent storage device, the drilling management network may maintain data redundancy in case a network device, such as a virtual machine or software container, terminates operations with the corresponding data. Accordingly, the data management controller and the persistent storage devices may provide a clear chain of data transportation for how data enters the drilling management network and is transmitted to specific systems in the drilling management network. For example, when a particular version of a software application interferes with one or more processes in a control system, the data management controller may map data associated with the version back from the installation of the software application to the corresponding persistent storage device and back to the source of the data and time of arrival into the network.

Turning to FIG. 20.1, FIG. 20.1 shows a block diagram of a system in accordance with one or more embodiments. In one or more embodiments, a persistent storage device (e.g., persistent storage device A (271), persistent storage device N (272)) is a virtual machine or software container that includes functionality for accessing and/or providing data for a predetermined data type. For example, in some embodiments, the persistent storage device includes functionality to provide data without using a data management controller as an intermediary, e.g., a persistent storage device may directly receive requests for data from within a drilling management network (e.g., drilling management network X (200)). Thus, the persistent storage device may be decentralized and separate from a data management controller.

In some embodiments, the data management controller (e.g., data management controller A (210)) administers high volume time-controlled data transfers to the drilling management network. For example, the data management controller may monitor network traffic into and out of the network to determine a predetermined period of time when a data transfer does not interfere production operations. Accordingly, as a remote network connection may be a low throughput connection, the data management controller may perform a data transfer over one or more time periods to complete the data transfer. Upon obtaining data at the drilling management network, the data management controller may include functionality to identify one or more predetermined data types associated with the data and store the data in a persistent storage device associated with the predetermined data type.

In one or more embodiments, a persistent storage device is associated with software images (e.g., software images (2081)). For example, the persistent storage device may include various software images for different software versions used by network devices throughout a drilling management network. For example, the drilling management network X (2000) may include a configuration manager (2055) that includes hardware and/or software with functionality to determine whether a software update exists for one or more networks devices. Upon detecting the software update, the configuration manager (2055) may access persistent storage device A (2071) to obtain a software image for the corresponding software update. In another embodiment, a persistent storage device is associated with network configurations for various control systems and other network devices for different network operating conditions. As such, a configuration manager may adjust network save and/or adjust network configuration for various virtual machines, software containers, and other network devices throughout the drilling management network using one or more persistent storage devices.

Keeping with FIG. 20.1, the drilling management network X (2000) may further include various network devices (e.g., control systems (2015), virtual machines (2040), host devices (2050), virtualization services manager A (2060)). For example, network devices may include one or more host devices that include hardware and/or software that is coupled to drilling equipment (e.g., one or more programmable logic controllers (PLCs)). The drilling equipment may include the blowout preventer (99), the drilling rig (12), and other components described above in FIG. 1 and the accompanying description.

PLCs coupled to host devices may form various control systems (e.g., control systems (2015)), such as various drilling operation control systems and various maintenance control systems. In particular, PLCs may include hardware and/or software with functionality to control one or more processes performed by a drilling rig, including, but not limited to the components described in FIG. 1. Specifically, a PLC may control valve states, fluid levels, pipe pressures, warning alarms, and/or pressure releases throughout a drilling rig. Moreover, a programmable logic controller may be a ruggedized computer system with functionality to withstand vibrations, extreme temperatures, wet conditions, and/or dusty conditions, for example, around a drilling rig.

Returning to the persistent storage devices, in some embodiments, a persistent storage device is associated with data models (e.g., data models (2082)). Data models may include various databases for geology and production data, drilling data, 3D models, nonwell related data, acquired data from drilling operations, etc. Likewise, data models may also include different versions of the same data, e.g., data acquired at different times and/or updated data versions based on later drilling operations. For example, one or more control processes performed by various control systems may use the data models to perform one or more drilling operations. In another embodiment, a user analyzes past drilling operations using one or more data models obtained from the persistent storage devices.

Turning to FIG. 20.2, a virtualization services manager (e.g., virtualization services manager A (2060)) may include hardware and/or software that includes functionality for generating, terminating, monitoring, and/or managing one or more virtual machines (e.g., virtual machine A (2041), virtual machine N (2042)) and/or software containers (e.g., software container A (2046), software container N (2047)) operating on a virtualization services layer of a drilling management network. In some embodiments, a virtualization services manager includes a hypervisor for managing one or more virtualized environments on a drilling management network. For example, virtualization services may be implemented in one or more network layers on the drilling management network, e.g., where virtual machines and/or software containers operate on the network layers. Rather than implementing a virtual machine or software container on a single host device, for example, virtualization services may be implemented using a virtual machine or software container that operates on multiple host devices. Examples of virtualization services may include oilfield data management among PLCs and/or drilling equipment, virtual machine management, software container management, memory resource allocation among host devices on a drilling management network, various network processes for administering the drilling management network, etc. For example, a virtualization services manager may communicate with the virtual machines and software containers to stop and/or initiate virtualization services that are being performed by the virtual machines and software containers.

In one or more embodiments, a host device includes a virtualization controller (e.g., virtualization controller A (2031), virtualization controller N (2032)) operating on a host operating system (e.g., host operation system A (2021), host operating system N (2022)). A virtualization controller may include hardware and/or software that includes functionality for communicating with other virtualization controllers on a drilling management network and/or implementing various virtualization services on the drilling management network. For example, virtualization controllers may be virtual machines or software containers operating on the host devices (2011, 2012). Virtualization services may include network processes that are operated on multiple network devices (e.g., host devices (2011, 2012), network elements (2005), host devices (2013)).

Furthermore, a software container may be a user-space instance implemented by a single kernel of a host operating system (e.g., host operating system A (2021), host operating system N (2022)). In particular, a software container may be an abstraction at an application layer that allows isolated processes to operate inside the software container. Likewise, multiples software containers may operate on a single kernel of an operating system. Software containers may include docker containers, Java™ containers, Windows Server® containers, etc. In contrast, a virtual machine may include hardware and/or software that may provide an abstraction of physical hardware. For example, a virtual machine may have an independent operating system that is separate from a host operating system where a virtual machine may operate on one or more host devices with dedicated memory and other computer resources.

Moreover, a virtualization services manager (e.g., virtualization services manager A (2060)) may administer and/or monitor various host device resources for virtual machines and/or software containers operating on a virtualization services layer. Likewise, the virtualization general architecture of the drilling management network X (2000) may be the same where a host operating system is running on bare metal (e.g., a hardware computing system), or as a virtual machine. For example, virtual machines and software containers may communicate with each other in the virtualization services layer and run virtualization services in an orchestrated manner.

Furthermore, a drilling management network may include user devices that may include hardware and/or software coupled to the drilling management network. User devices may be network devices that include functionality for presenting data and/or receiving inputs from a user regarding various drilling operations and/or maintenance operations performed within the drilling management network. For example, a user device may include personal computers, smartphones, human machine interfaces, and any other devices coupled to a network that obtain inputs from one or more users, e.g., by providing a graphical user interface (GUI). Likewise, a user device may present data and/or receive control commands from a user for operating a drilling rig. A network element may refer to various software and/or hardware components within a network, such as switches, routers, hubs, user equipment, or any other logical entities for uniting one or more physical devices on the network.

While FIGS. 20.1 and 20.2 show various configurations of components, other configurations may be used without departing from the scope of the disclosure. For example, various components in FIGS. 20.1 and 20.2 may be combined to create a single component. As another example, the functionality performed by a single component may be performed by two or more components.

Figure 21:
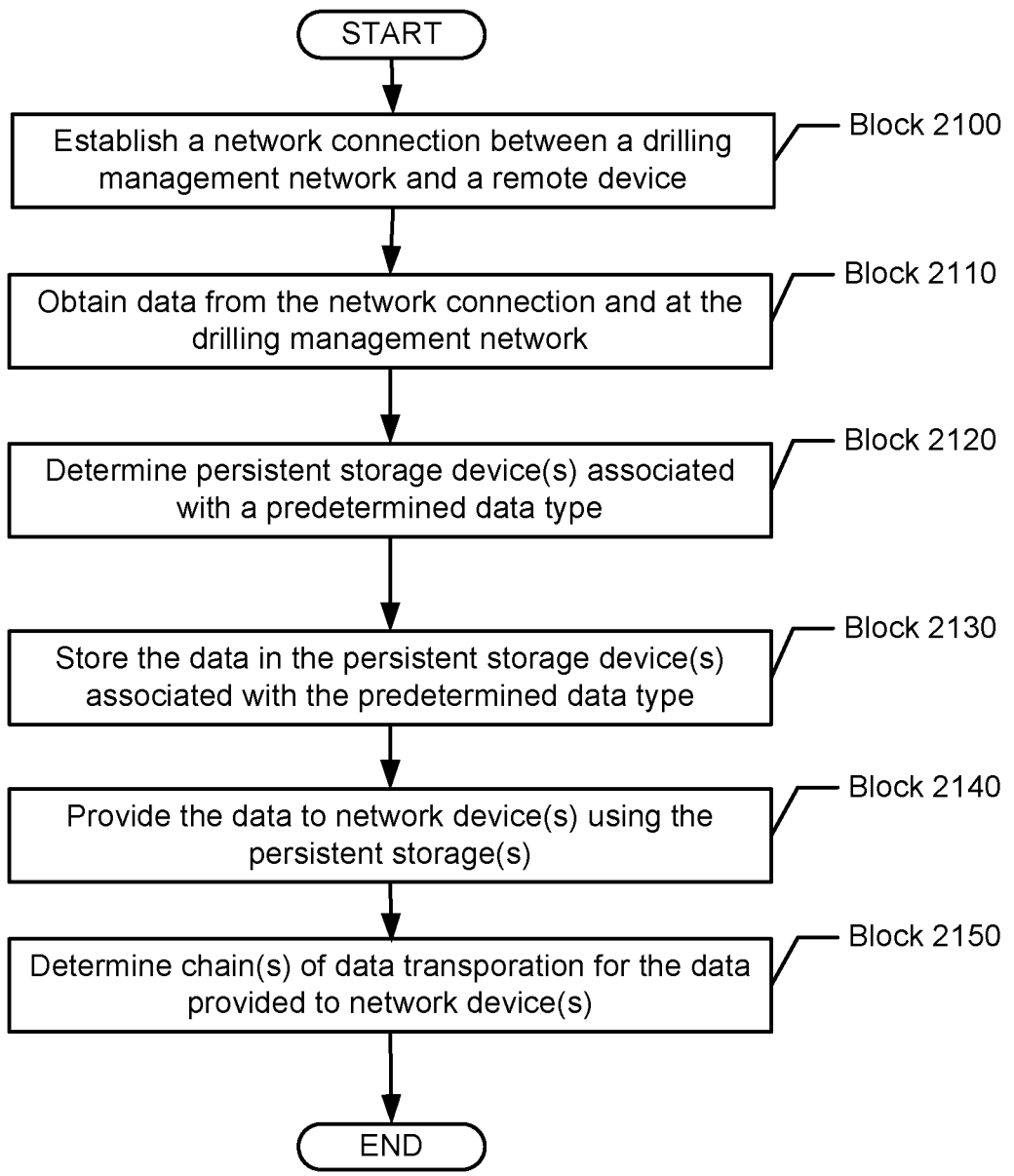

Turning to FIG. 21, FIG. 21 shows a flowchart in accordance with one or more embodiments. Specifically, FIG. 21 describes a method for storing and/or providing data to network devices in a drilling management network. One or more blocks in FIG. 21 may be performed by one or more components (e.g., data management controller A (2010)) as described in FIGS. 1, 2, 20.1, and 20.2. While the various blocks in FIG. 21 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 2100, a network connection is established between a drilling management network and a remote device in accordance with one or more embodiments. For example, the network connection may be a low throughput network connection that transfers rig specific data and/or common rig data to the drilling management network. The network connection may be established by a data management controller operating on the drilling management network. In particular, the network connection may be established at predetermined times and for specific intervals to allow the transfer of data without interfering with drilling or production operations. For example, the predetermined times may correspond to periods when control systems are offline and/or remote users are unlikely to be accessing the drilling management network over a remote network connection.

In Block 2110, data is obtained from a network connection and at a drilling management network in accordance with one or more embodiments. For data transfers to a drilling management network, various limitations may exist. For example, a low throughput network connection may have high latency and limited availability or downlink time. As such, small amounts of data may be transferred without a problem, while a large data transfer may involve multiple days to complete the data transfer. A data management controller may maintain a constant data transmission over one or more time intervals to obtain the data in Block 2110.

In Block 2120, one or more persistent storage devices are determined that are associated with a predetermined data type in accordance with one or more embodiments. For example, data obtained from a network connection may be identified based on a predetermined set of data types. For example, data may include embedded metadata that specifies one or more data types for the data. On the other hand, a data management controller or other network device may analyze the data based on the data sender to determine data types associated with the data.

In Block 2130, data is stored in one or more persistent storage devices associated with a predetermined data type in accordance with one or more embodiments. In response to determining a data type associated with the data, the data may be relayed over the drilling management network to the corresponding persistent storage device. The storing process may include recording a time stamp when the data was transmitted by a source and/or obtained at the drilling management network. Likewise, the data may be entered into one or more databases for later access. For example, if the data corresponds to a software image, a data management controller may store the software image based on the software version as well as any control systems that use software applications based on the software image.

In Block 2140, data is provided to one or more network devices using one or more persistent storage devices in accordance with one or more embodiments. For example, a data management controller may act an intermediary between obtaining requests for data and providing access to network devices seeking the data. Moreover, once data is store in a persistent storage device, the persistent storage device may directly obtain requests for data and provide access to the data accordingly.

In one or more embodiments, data is provided from a persistent storage device to network devices using a jump host. For example, a jump host may implement a temporary conduit that is established and terminated in order to regulate authorized access to the persistent storage device. For example, a temporary conduit may limit network device access to specific times and/or to specifically authorized network devices. Thus, a temporary conduit may provide a communication path between network devices located in different security zones during authorized time periods. In one or more embodiments, a temporary conduit is a switched virtual connection. For example, a switched virtual connection may include hardware and/or software on two security zones in a drilling management network for implementing a virtual connection. Thus, when the switched virtual connection is "open", no virtual connection may exist across the temporary conduit. When the switched virtual connection is "closed", a virtual connection is formed that corresponds to a temporary virtual circuit. The temporary virtual circuit may then provide transmission of network traffic, such as persistent storage data, between two security zones.

In Block 2150, one or more chains of data transportation are determined for data provided to one or more network devices in accordance with one or more embodiments. In particular, a chain of data transportation may include information regarding how data enters and is used by network devices within a drilling management network. For example, a chain of data transportation may be determined and/or stored by a persistent storage device, a data management controller, or other network device in the drilling management network. In some embodiments, the chain of data transportation describes the source (e.g., identification information for a remote device that transmits particular data to a drilling management network), date information such as one or more timestamps, and other information regarding when data enters the drilling management network and passes to one or more persistent storage devices. A chain of data transportation may also describe usage data by various network devices accessing the data from a respective persistent storage device. In some embodiments, a chain of data transportation includes information regarding use of particular data in staging operations, validation operations, and/or production operations.

In some embodiments, to determine a chain of data transportation, a data management controller records timestamp, version information, data requests, edit history, and other metadata regarding data associated with one or more persistent storage devices. For example, the data management controller may log any data requests transmitted by network devices to a persistent storage device. Likewise, the data management controller may record modifications to software and other data produced during staging operations, validation operations, and/or production operations. Thus, a persistent storage device may include multiple versions of the same data based on changes made to the data upon leaving and/or returning to a persistent storage device.

In some embodiments, a network device or an operator analyzes a chain of data transportation to identify one or more problems within a drilling management network. For example, if modified software code produces a malfunctioning control system, a chain of data transportation may identify when the software code was modified by one or more network devices. Likewise, using the chain of data transportation, other software images may be identified that had similar modifications. In contrast, without a chain of data transportation, the date, type, and/or source of the modification may be unknown during analysis of the malfunctioning control system.

Figure 22:
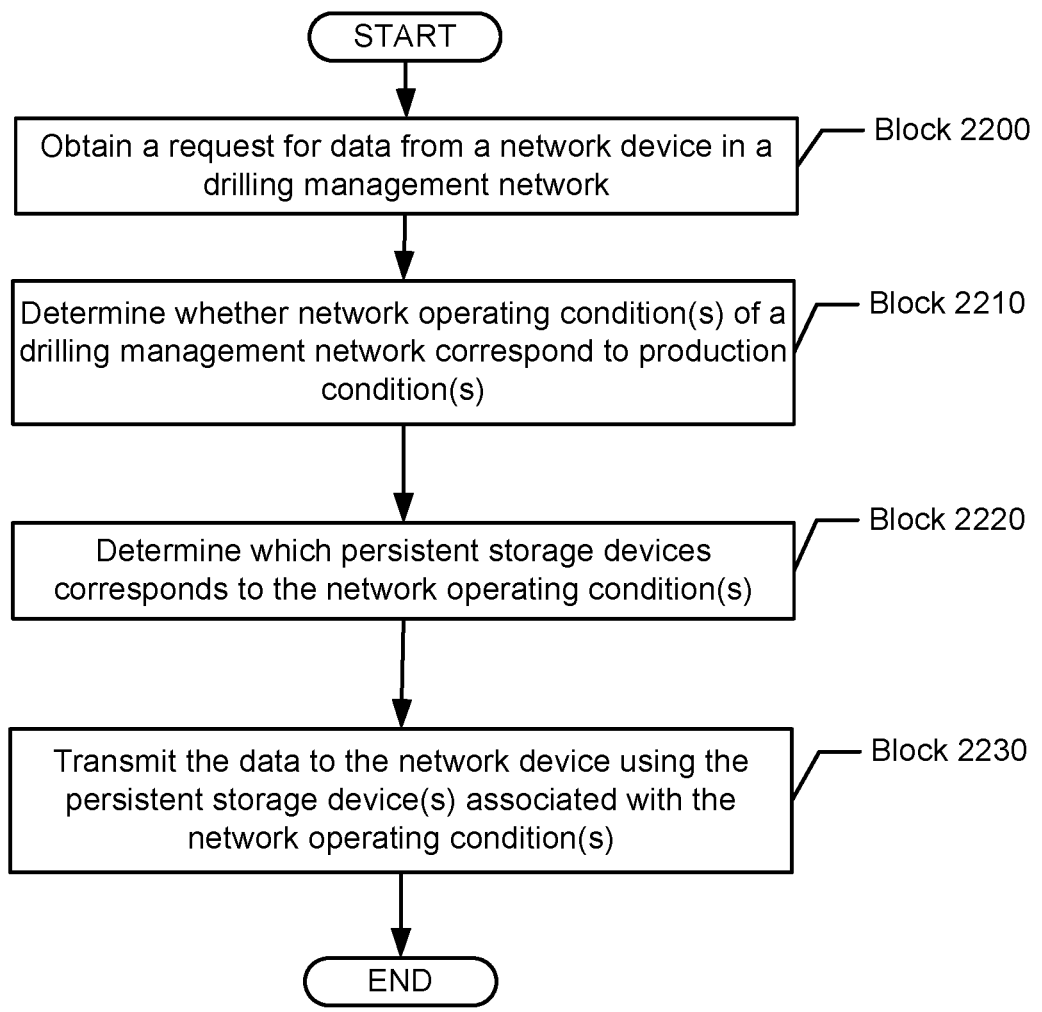

Turning to FIG. 22, FIG. 22 shows a flowchart in accordance with one or more embodiments. Specifically, FIG. 22 describes a method for accessing data from one or more persistent storages devices on a drilling management network. One or more blocks in FIG. 22 may be performed by one or more components (e.g., data management controller A (2010)) as described in FIGS. 1, 2, 20.1 and 20.2. While the various blocks in FIG. 22 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 2200, a request for data is obtained from a network device in a drilling management network in accordance with one or more embodiments. For example, a user may provide a user input at a user device on a drilling management network to access data in a persistent storage device. The request may be a message that identifies data, the persistent storage device with the data, and/or a data type associated with the data. Thus, the request may be transmitted directly to a corresponding persistent storage device. In another embodiment, a data management controller may identify the persistent storage device with the data, e.g., based on a predetermined data type, and relay the request accordingly.

In Block 2210, a determination is made whether one or more network operating conditions of a drilling management network correspond to one or more production conditions in accordance with one or more embodiments. For example, a data management controller, a persistent storage device, and/or another network device may monitor a drilling management network to determine whether the network operating conditions identify drilling operations or productions operations are occurring the network. For example, a virtualization services manager may determine whether drilling operations and/or production operations are present in the network, and transmit a notification that the network operating conditions are production conditions.

In Block 2220, a determination is made which persistent storage devices are associated with one or more network operating conditions in accordance with one or more embodiments. In one or more embodiments, for example, persistent storage devices may be segregated based on whether the data is using for staging conditions or production conditions. Specifically, persistent storage devices for production conditions may include software images, data models, and other types of data that is being using in drilling operations or production operations. Thus, the data may be verified by one or more control systems as being stable for use by one or more control systems. Likewise, staging persistent storage devices may include untested data and/or data undergoing verification by the drilling management network.

In some embodiments, for example, multiple persistent storage devices are located in a data repository. Within the data repository, the staging persistent storage devices are decoupled from production persistent storages. For example, during normal rig operations, control systems on the rig will be connected to the production persistent storages. During staging tests, control systems switch to the staging persistent storage device in order to prevent corruption of production data and compromising software builds during the testing phase. Moreover during staging, production persistent storages may become a data backup for various control systems and network devices in the drilling management network.

In Block 2230, data is transmitted to a network device using one or more persistent storage devices associated with one or more network operating conditions in accordance with one or more embodiments.

Figure 23:
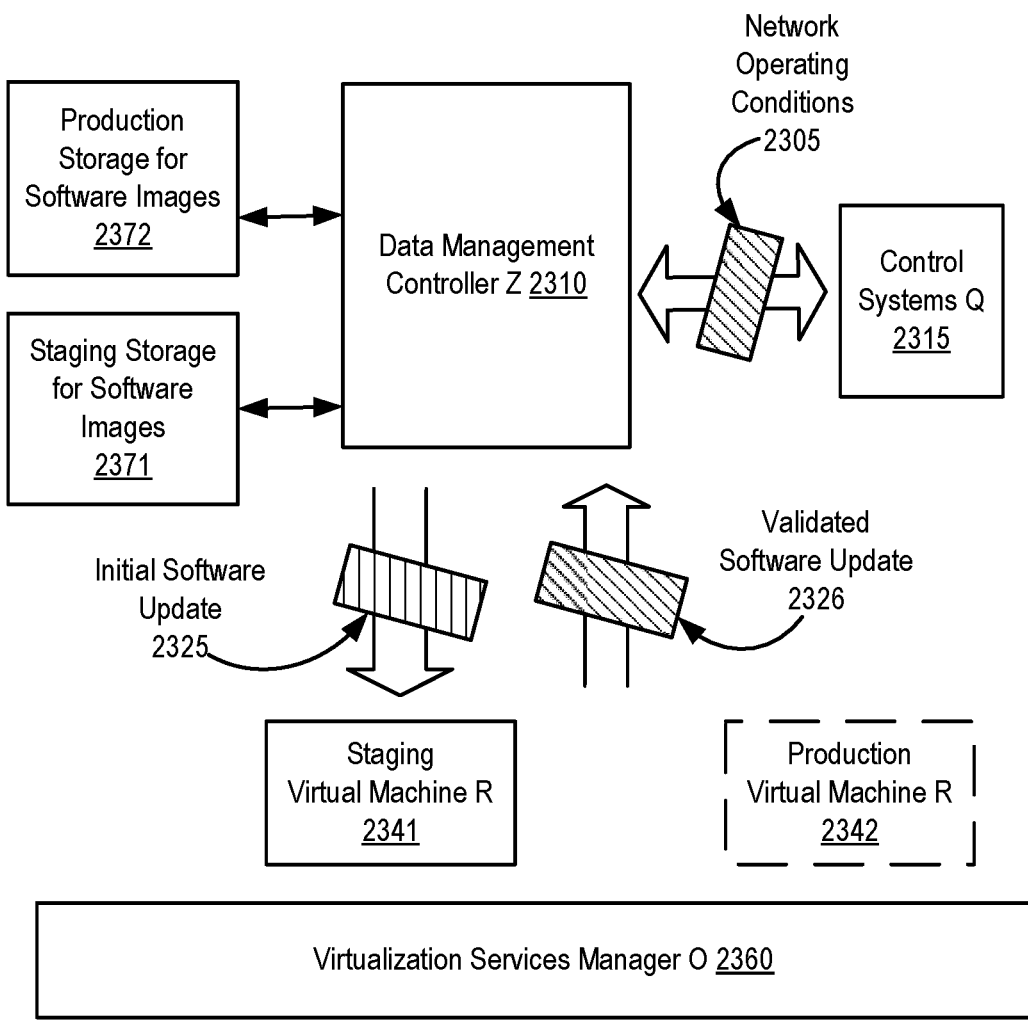

Turning to FIG. 23, FIG. 23 provides an example of updating software using a data storage architecture for a drilling management network. The following example is for explanatory purposes only and not intended to limit the scope of the disclosed technology.

FIG. 23 shows a data management controller Z (2310) coupled to a production virtual machine R (2342) operating on a virtualization services manager O (2360), various control systems Q (2315), a staging storage (2371) for software images, and a production storage (2372) for software images. The data management controller Z (2310) monitors the control systems Q (2315) to detect various network operating conditions (2305) associated with a drilling management network (not shown). Initially, the data management controller Z (2310) obtains a request to update software in the production virtual machine R (2342). The staging virtual machine R (2341) or the virtualization services manager O (2360) may transmit the request to the data management controller Z (2310). In another embodiment, the data management controller Z (2310) automatically detects an initial software update (2325) for a software application operating in the production virtual machine R (2342), e.g., by accessing the Internet.

In response to obtaining the request to update software, the data management controller Z (2310) and/or the virtualization services manager O (2360) determine whether production operations are occurring in the drilling management network. Once production operations cease, the virtualization services manager O (2360) terminates the production virtual machine R (2342) and generates a staging virtual machine R (2341). The staging virtual machine R (2341) may be a virtual machine instantiation with similar functionality to the production virtual machine R (2342). For example, the staging virtual machine R (2341) may include additional functionality for debugging and/or monitoring software processes or hardware processes performed in connection to the staging virtual machine R (2341).

As such, the virtualization services manager O (2360) can test the initial software update (2325) on the staging virtual machine R (2341) before implementation in the production virtual machine R (2342). Thus, the virtualization services manager O (2360) may verify whether the software build on the staging virtual machine R (2341) is stable and capable of performing various control processes under testing conditions before implementation in actual production conditions. Likewise, software code in the initial software update (2325) may be modified on the staging virtual machine R (2341), e.g., by changing configuration settings, adjusting processes associated with the software update to correspond to operations performed by one or more control systems, etc.

Once the staging virtual machine R (2341) is generated, the data management controller Z (2310) accesses the staging storage (2371) where the initial software update (2325) is stored. The data management controller Z (2310) then transmits the initial software update (2325) to the staging virtual machine R (2341) for installation. The staging virtual machine R (2341) may operate the updated software, make modifications to the initial software update (2325), and perform various tests for a replacement virtual machine until a determination is made that the updated software can be used in a production virtual machine.

Moreover, the initial software update (2325) or a modified software update may be further validated by an operator, other network devices, other staging virtual machines, etc. After validation, a validated software update (2326) may be placed in the staging storage (2371) and/or the production storage (2372) if the update is ready for implementation in drilling operations. As such, the data management controller Z (2310) may then distribute copies of the validated software update (2326) to network devices in the drilling management network.

Smart Sensor Device Integration

Figure 24:
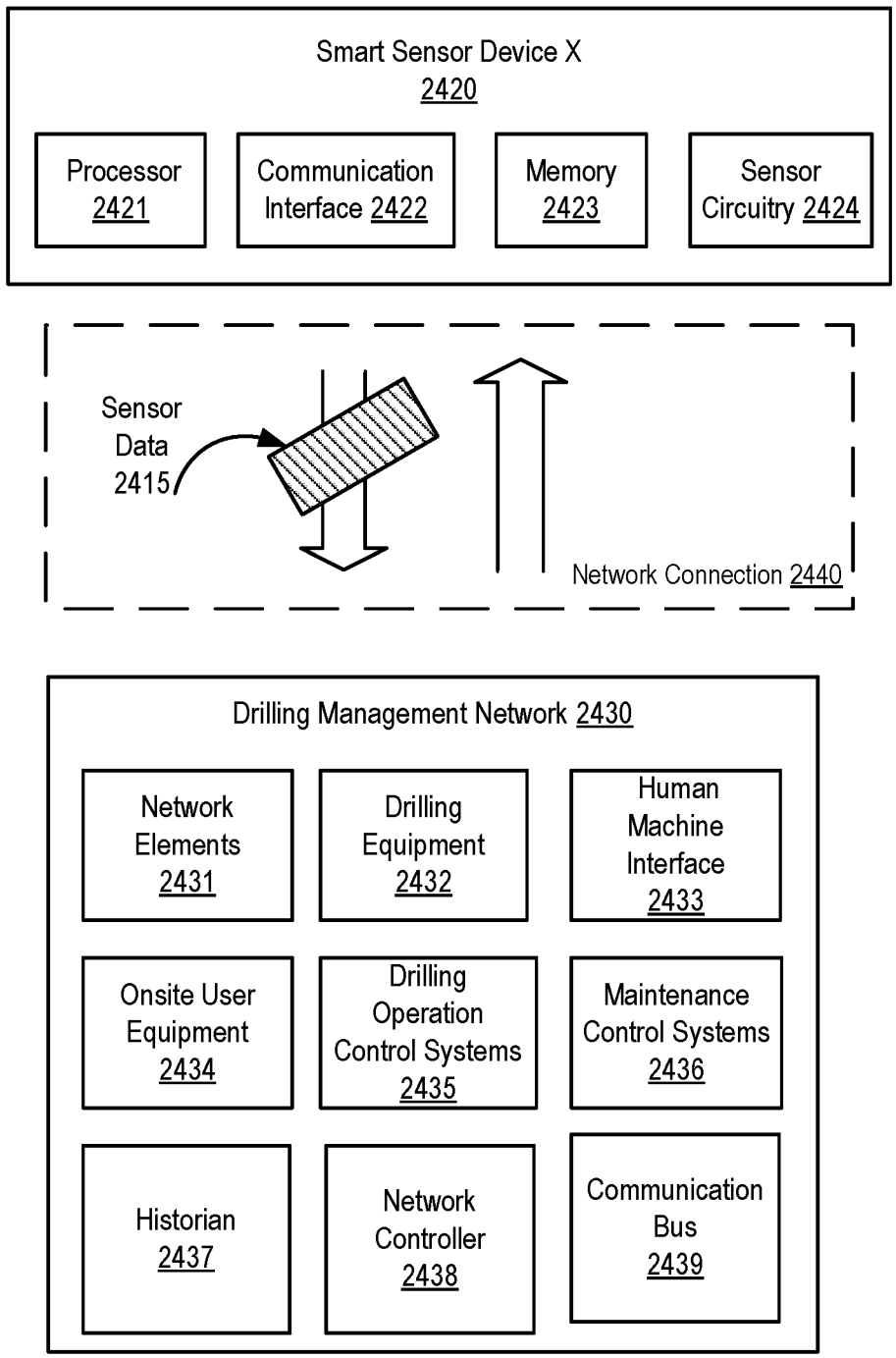

In general, embodiments of the disclosure include a system, a sensor device, and various methods for communicating sensor data over a drilling management network. Turning to FIG. 24, FIG. 24 shows a block diagram of a system in accordance with one or more embodiments. As shown in FIG. 24, a drilling management network (2430) may include a human machine interface (HMI) (e.g., HMI (2433)), a historian (e.g., historian (2437)), and various network elements (e.g., network elements (2431)). A human machine interface may be hardware and/or software coupled to the drilling management network (2430). For example, the HMI (2433) may allow the operator to interact with the drilling system, e.g., to send a command to operate an equipment, or to view sensor information from drilling equipment. The human machine interface may include functionality for presenting data and/or receiving inputs from a user regarding various drilling operations and/or maintenance operations. For example, a human machine interface may include software to provide a graphical user interface (GUI) for presenting data and/or receiving control commands for operating a drilling rig. A network element may refer to various hardware components within a network, such as switches, routers, hubs or any other logical entities for uniting one or more physical devices on the network. In particular, a network element, the human machine interface, and/or the historian may be a computing system similar to the computing system (3400) described in FIGS. 34.1 and 34.2, and the accompanying description.

In one or more embodiments, a smart sensor device (e.g., smart sensor device X (2420)) is coupled to the drilling management network (2430). In particular, a smart sensor device may include hardware and/or software that includes functionality to obtain one or more sensor measurements, e.g., a sensor measurement of an environment condition proximate the smart sensor device. The smart sensor device may process the sensor measurements into various types of sensor data (e.g., sensor data (2417)). For example, the smart sensor device X (2420) may include functionality to convert sensor measurements obtained from sensor circuitry (e.g., sensor circuitry (2424)) into a communication protocol format that may be transmitted over the drilling management network (2430) by a communication interface (e.g., communication interface (2422)) Smart sensor devices may include pressure sensors, torque sensors, rotary switches, weight sensors, position sensors, microswitches, etc.

Moreover, a smart sensor device may include a processor (e.g., processor (2421)), a communication interface (e.g., communication interface (2422)), memory (e.g., memory (2423)), and sensor circuitry (e.g., sensor circuitry (2424)). The processor may be similar to the computer processor (3402) described below in FIG. 34.1 and the accompanying description. The communication interface (2422) may be similar to the communication interface (3412) describe below in FIG. 34.1 and the accompanying description. The memory (2423) may be similar to the non-persistent storage (3404) and/or the persistent storage (3406) described below in FIG. 34.1 and the accompanying description. The sensor circuitry (2424) may be similar to various sensors (e.g., hookload sensor (94), block sensor (95), pressure sensor (92), etc.) described in FIG. 1 and the accompanying description.

In one or more embodiments, the drilling management network (2430) may include drilling equipment (e.g., drilling equipment (2432)) such as draw works (60), top drive, mud pumps and other components described above in FIG. 1 and the accompanying description). The drilling management network (2430) may further include various drilling operation control systems (e.g., drilling operation control systems (2435)) and various maintenance control systems (e.g., maintenance control systems (2436)). Drilling operation control systems and/or maintenance control systems may include, for example, programmable logic controllers (PLCs) that include hardware and/or software with functionality to control one or more processes performed by a drilling rig, including, but not limited to the components described in FIG. 1. Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

Moreover, drilling operation control systems and/or maintenance control systems may refer to control systems that include multiple PLCs within the drilling management network (2430). For example, a control system may include functionality to control operations within a system, assembly, and/or subassembly described above in FIG. 1 and the accompanying description. As such, one or more of the drilling operation control systems (2435) may include functionality to monitor and/or perform various drilling processes with respect to the mud circulation system, the rotating system, the hoisting system, a pipe handling system, and/or various other drilling activities described with respect to FIG. 1 and the accompanying description. Likewise, one or more of the maintenance control systems (2436) may include functionality to monitor and/or perform various maintenance activities regarding drilling equipment located around a drilling rig. While drilling operation control systems and maintenance control systems are shown as separate devices in FIG. 24, in one or more embodiments, a programmable logic controller and other drilling equipment (2432) on a drilling rig may be used in a drilling operation control system and a maintenance control system at the same time.

In one or more embodiments, a smart sensor device includes functionality to establish a network connection (e.g., network connection (2440)) with one or more devices and/or systems (e.g., network controller (2438), drilling operation control systems (2435), maintenance control systems (2436)) on a drilling management network. In one or more embodiments, for example, the network connection (2440) may be an Ethernet connection that establishes an Internet Protocol (IP) address for the smart sensor device X (2420). Accordingly, one or more devices and/or systems on the drilling management network (2430) may transmit data packets to the smart sensor device X (2420) and/or receive data packets from the smart sensor device X (2420) using the Ethernet network protocol. For example, sensor data (e.g., sensor data (2415)) may be sent over the drilling management network (2430) in data packets using a communication protocol. Sensor data may include sensor measurements, processed sensor data based on one or more underlying sensor measurements or parameters, metadata regarding a sensor device such as timestamps and sensor device identification information, content attributes, sensor configuration information such as offset, conversion factors, etc. As such, the smart sensor device X (2420) may act as a host device on the drilling management network (2430), e.g. as a network node and/or an endpoint on the drilling management network (2430). In one embodiment, one or more smart sensors may connect to the drilling management network through a power-over-Ethernet network.

In one or more embodiments, the drilling management network (2430) may include a communication bus (e.g., communication bus (2439)). For example, the communication bus (2439) may include hardware, such as network components, wires, optical fibers, etc. that may connect one or more network elements on the drilling management network (2430). Likewise, the communication bus (2439) may include software, such as one or more communication protocols, that include functionality for transmitting sensor data between devices, e.g., smart sensor device X (2420) and various control systems on the drilling management network (2430). Moreover, the drilling management network (2430) may include various network elements (e.g., network elements (2431)) and/or onsite user equipment (e.g., onsite user equipment (2434)). For example, onsite user equipment may include phone systems, personal computers for various users, printers, application servers, and/or file servers located around a drilling rig.

The drilling management network (2430) may further include a network controller (2438). In one or more embodiments, for example, the network controller (2438) includes software and/or hardware that includes functionality for receiving requests from control systems to subscribe to respective sensor devices. Likewise, the network controller (2438) may implement one or more communication protocols for transmitting sensor data throughout the drilling management network (2430). For example, the network controller (2438) may be a software-defined network (SDN) controller implemented on multiple network elements in the drilling management network (2430).

While FIG. 24 shows various configurations of components, other configurations may be used without departing from the scope of the disclosure. For example, various components in FIG. 24 may be combined to create a single component. As another example, the functionality performed by a single component may be performed by two or more components.

Figure 25:
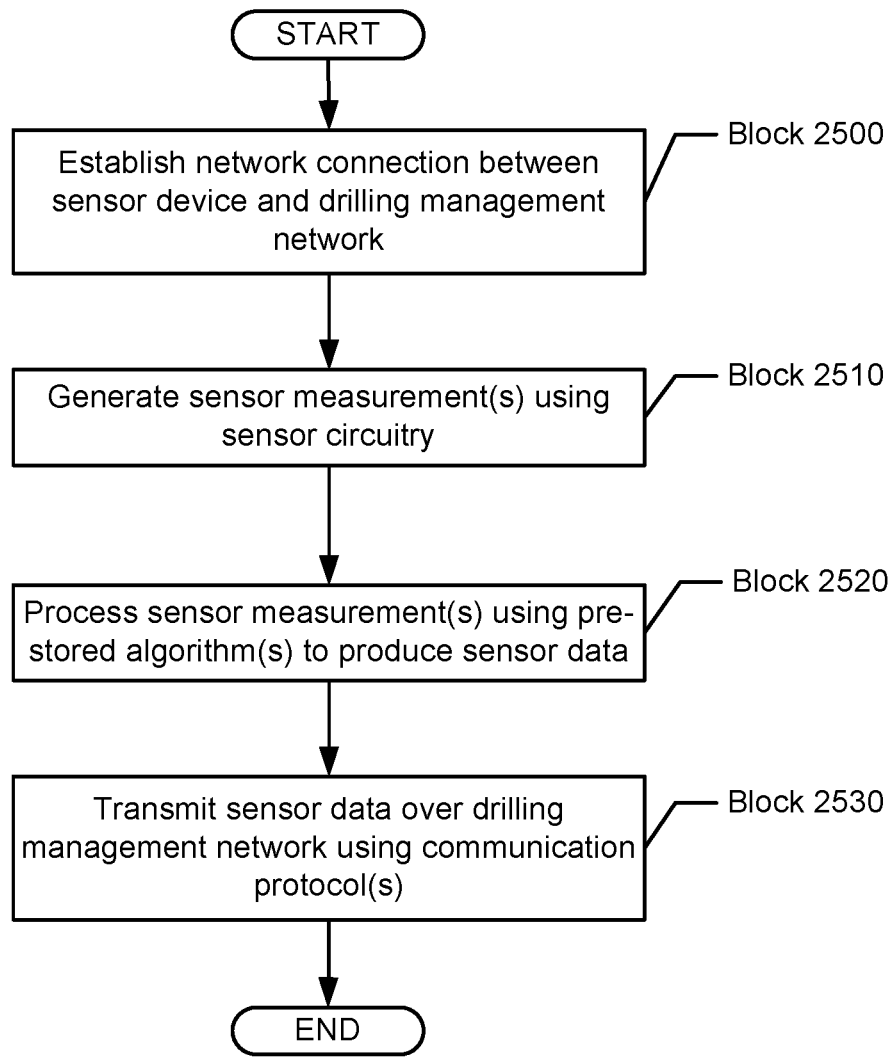

Turning to FIG. 25, FIG. 25 shows a flowchart in accordance with one or more embodiments. Specifically, FIG. 25 describes a method for communicating sensor data. One or more blocks in FIG. 25 may be performed by one or more components (e.g., smart sensor device X (2420)) as described in FIGS. 1, 2, and/or 24. While the various blocks in FIG. 25 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 2500, a network connection is established between a sensor device a drilling management network in accordance with one or more embodiments. For example, a sensor device may form a network connection, such as an Ethernet connection, to a drilling management network. The network connection may be authenticated using password and/or other identification information from the sensor device. In one or more embodiments, for example, the sensor device has plug-and-play functionality where the sensor device can communicate directly with various network elements and/or control systems on the drilling management network. Moreover, the sensor device may be similar to the smart sensor device X (2420) described in FIG. 24 and the accompanying description. In one or more embodiments, the sensor device connects to the drilling management network without a middle layer, e.g., a middle layer computer interfacing between the sensor device and the drilling management network. In one embodiment, the drilling management network may use a communication middleware, such as publisher and receiver to exchange data between different network nodes. An example of communication middleware is distributed data service (DDS). The smart sensor may support this communication middleware, such that its information can be readily shared with other network nodes when connected to the drilling management network.

In Block 2510, one or more sensor measurements are generated using sensor circuitry in accordance with one or more embodiments. In particular, a sensor device may use sensor circuitry to detect one or more environmental conditions, such as temperature, pressure, torque, etc., proximate the sensor device. The sensor measurements may be digital and/or analog readings obtained by the sensor device.

In Block 2520, one or more sensor measurements are processed using one or more pre-stored algorithms to produce sensor data in accordance with one or more embodiments. In one or more embodiments, for example, a sensor device converts sensor measurements (e.g., mA or voltage) to sensor data (e.g., pound force or psi). In particular, the sensor measurements, and/or sensor data may be converted into a predetermined communication protocol format for transmission over the drilling management network. For example, a pre-stored algorithm may correspond to various data frames inside a particular type of network packet. In one or more embodiments, one or more PLC capabilities (e.g., data computation and/or data communication) are integrated within a sensor device. Thus, the sensor data processing may be implemented at the sensor level to enable integration with the drilling management network.

Moreover, a sensor device may insert other information along with sensor measurements into the sensor data. For example, the sensor data may include publisher information, such as hardware identification information regarding the sensor device, source addresses, etc. In one or more embodiments, for example, the sensor device may insert information that a communication protocol uses to identify subscribers, such as tags, metadata, content attributes, and other data.

In one or more embodiments, a pre-stored algorithm is a multi-variable equation. For example, a pre-stored algorithm may obtain multiple inputs for one or more variables to generate sensor data. The sensor measurements in Block 2510 may be one input to the pre-stored algorithm, while the other inputs may correspond to other parameters. For example, a pre-stored algorithm may be a pressure equation that has force and surface area as inputs to the pressure equation. The sensor circuitry may obtain force measurements, while the surface area may be a static and/or dynamic input to the pressure equation. These static and/or dynamic inputs may be pre-configured on the sensor device before it starts to calculate and transmit the sensor data to the drilling management network. For example, a user may remotely log into the sensor device over the drilling management network, and update the value of the surface area in the equation. The sensor data may be the output of the pressure equation using the updated value of the surface area and the current force value detected by sensor circuitry.

For a fluid volume calculation, the sensor device may measure the height of the fluid level in a tank, while the dimensions of the tank may be static values configured before the operation. The sensor data, to be transmitted to the drilling management network, may include both the fluid volume and the fluid level, among others. Likewise, the sensor device may obtain sensor measurements for temperature from sensor circuitry on the sensor device or from an external sensor device connected to the drilling management network. Likewise, the respective value for volume calculation, such as the dimensions of the tank, may be data values stored on the sensor device that may be updated where the dimensions of the tank changes, e.g. when a different mud tank is used in the drilling system.

In Block 2530, sensor data is transmitted over a drilling management network using one or more communication protocols in accordance with one or more embodiments. Using a communication interface, for example, the sensor device may transmit sensor data to one or more control systems, one or more sensor devices, and/or one or more network elements in the drilling management network. In some embodiments, the sensor data includes sensor device identification information, sensor quality information, and/or sensor device configuration information. For example, a communication protocol may allow the sensor device to send the sensor data over an IP multicast to various control systems and network elements on the drilling management network. As such, the communication protocol may allow various devices, such as sensor devices and software applications operating on network elements, to work in a plug-and-play manner. In one or more embodiments, for example, the communication protocols include a data distribution service (DDS) communication protocol.

Turning to FIGS. 26.1 and 26.2, FIGS. 26.1 and 26.2 provide an example of transmitting sensor data over a drilling management network. The following example is for explanatory purposes only and not intended to limit the scope of the disclosed technology.

Turning to FIG. 26.1, FIG. 26.1 illustrates a sensor device Y (2621) with a network connection to drilling management network A (2630). As shown in FIG. 26.1, a communication path X (2681) exists over the drilling management network A (24630) between sensor device Y (2621) and a programmable logic controller A (2661). In particular, the sensor device Y (2621) transmits sensor data Y (2616) to the programmable logic control A (2661) where the sensor data Y (2616) may be used for one or more applications performed by the programmable logic controller A (2661) and/or a middle layer computer (2640) that is coupled to the programmable logic controller A (2661). Thus, the sensor device Y (2621) may communicate directly with the programmable logic controller A (2661) or any other network elements, such as the middle layer computer (2640), connected to the drilling management network A (2630).

Keeping with FIG. 26.1, the PLC A (2661) may process sensor measurements obtained from sensor device X (2614) and output it to the middle layer computer (2640) in a digestible format different from the communication protocol format of sensor data Y (2616). Without the middle layer computer (2640), sensor measurements from the sensor device X (2614) may not be transmitted over the drilling management network (2630) in a recognizable communication protocol format for consumption by other network devices, e.g., sensor device Y (2621). In contrast, sensor device Y (2621) may process sensor measurements into a communication protocol format that may be interpreted by any device with a network connection to the drilling management network A (2630).

Turning to FIG. 26.2, FIG. 26.2 illustrates a control system X (2635) that receives sensor data from sensor device M (2622) and sensor device N (2623). In particular, sensor data M (2617) may be transmitted from sensor device M (2622) to control system X (2635) over communication path I (2682). Likewise, sensor data N (2618) may be transmitted from sensor device N (2623) to the control system X (2635) over communication path J (2683). As shown in FIGS. 26.1 and 26.2, the communication paths (2681, 2682, 2683) may be logical paths traversing various network nodes over the drilling management network A (2630). For example, the communication paths (2681, 2682, 2683) may include the same and/or different network elements, a common communication bus, and/or a changing network topology between the sensor devices (2622, 2623) and the control system X (2635).

Figure 27:
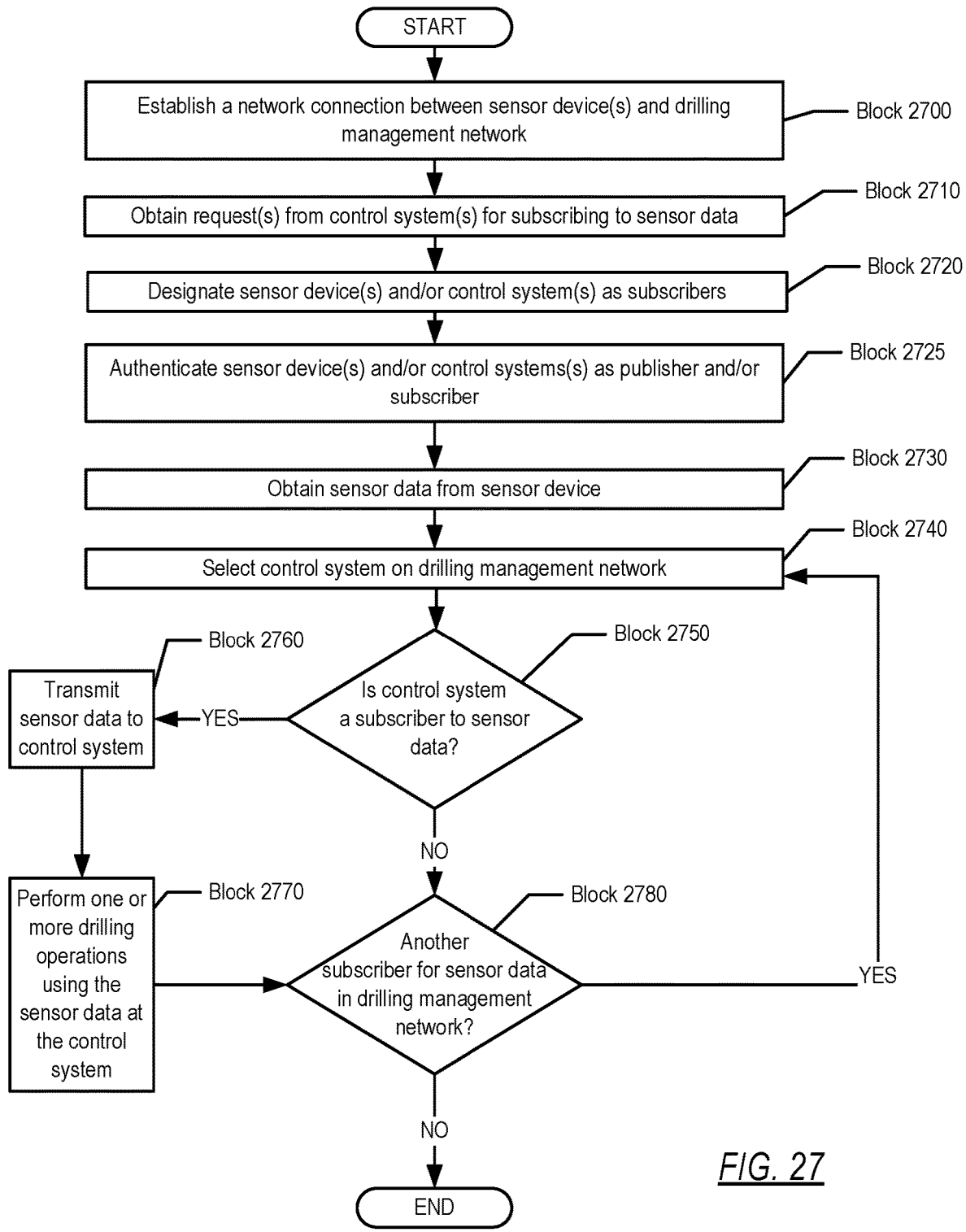

Turning to FIG. 27, FIG. 27 shows a flowchart in accordance with one or more embodiments. Specifically, FIG. 27 describes a method for communicating sensor data. One or more blocks in FIG. 27 may be performed by one or more components (e.g., drilling management network (2430)) as described in FIGS. 1, 2, 24, 26.1 and/or 26.2. While the various blocks in FIG. 27 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 2700, a network connection is established between one or more sensor devices and a drilling management network in accordance with one or more embodiments. Block 2700 may be similar to Block 2500 described above in FIG. 25 and the accompanying description.

In Block 2710, one or more requests from one or more control systems are obtained for subscribing to sensor data in accordance with one or more embodiments. For example, using a communication protocol, a control system may request that the control system be identified as a subscriber to a particular sensor device and/or a type of sensor data in a particular virtual network or domain on a drilling management network. Thus, smart sensor devices publishing data in that particular virtual network or domain may be subscribed by this control system. However, smart sensor devices publishing in another virtual network or domain may be invisible to this control system and cannot be subscribed by this control system.

In Block 2720, one or more control systems are designated as subscribers to sensor data in accordance with one or more embodiments. For example, one or more communication protocols may implement a software architecture that enables a publish-subscribe model among various network elements on and/or connected to the drilling management network. If a respective control system or a component of the respective control system is a subscriber for a particular sensor device in a particular virtual network or domain, sensor data from the sensor device may be relayed to the respective control system or the respective control system's component accordingly. If a sensor device has five subscribers, for example, sensor data from the sensor device may be transmitted to each of the five subscribers each time that sensor data is broadcast over the drilling management network. Thus, the sensor device may act as a publisher in the publish-subscribe model. In some embodiments, a drilling management network uses a security certificate to authenticate a device before it is allowed to publish or subscribe on a network.

Moreover, in designating a control system as a subscriber, a communication protocol may implement a topic-based system and/or a content-based system. In a topic-based system, sensor data is transmitted over the drilling management network according to one or more logical channels. In response to a request to become a subscriber, for example, a control system may be designated to receive sensor data allocated to a particular channel associated with the subscription. Thus, the communication protocol may identify subscribers of a particular channel according to IP addresses, hardware addresses, and other identification information and relay sensor data to subscribers of the channel.

In a content-based system, a subscriber defines one or more content attributes for analyzing sensor data. In one or more embodiments, for example, a content attribute corresponds to a class of sensor data. For example, sensor data classes may include different types of sensor data, such as temperature data, pressure data, alert notifications, etc. Moreover, a class may be defined according to a specific piece of equipment, such as a mud pump. Thus, a class of sensor data may include any sensor data obtained with respect to the mud pump. Likewise, a communication protocol, a subscriber, and/or another network element may analyze the sensor data to determine whether the sensor data matches one or more content attributes. For example, the content attributes may be stored in sensor data's metadata. Likewise, content attributes may include time-based attributes, such as data regarding sensor measurements that were obtained over a particular period of time. In another example, content attributes may correspond to different types of sensor data, such as pressure data, temperature data, torque data, etc. Content attributes may also specify a particular type of equipment on a drilling rig, e.g., sensor data relating to a mud pump. In one or more embodiments, for example, a maintenance control system subscribes to temperature data around a drilling rig. As such, the maintenance control system may receive any sensor data that relates to temperature data.

In Block 2725, one or more sensor devices and/or one or more control systems are authenticated as a publisher and/or a subscriber in accordance with one or more embodiments. In some embodiments, for example, various security procedures and/or security protocols may be provided on a drilling management network that ensure only trusted and authenticated participants (e.g., publishers and/or subscribers) are allowed to publish and/or subscribed to sensor data in a particular virtual network or domain. Moreover, sensor devices and/or control systems may obtain security certificates that identify the respective device as a publisher and/or subscriber on the drilling management network. For example, a security certificate may be a digital key that authorizes a sensor device and/or a control system to transmit data across a virtual network to other authorized sensor devices and/or control systems. In some embodiments, a network controller on the drilling management network may act as a network broker between adding and/or removing subscribers from different types of sensor data and/or issuing security certificates to various devices. In some embodiments, a control system may send a request to cancel a subscription to a particular type of sensor data and/or sensor device.

In Block 2730, sensor data is obtained from one or more sensor devices in accordance with one or more embodiments. For example, a drilling management network may obtain the sensor data over a network connection with the sensor device.

In Block 2740, a control system is selected on a drilling management network in accordance with one or more embodiments. For example, a control system may be selected by a communication protocol operating on the network or by a network controller for administering a communication protocol.

In Block 2750, a determination is made whether a control system is a subscriber to sensor data in accordance with one or more embodiments. For example, a communication protocol may iteratively select control systems associated with a particular type of sensor data and/or sensor device. In some embodiments, a subscription to sensor data corresponds to a virtual network on a drilling management network. As such, a communication protocol operating on the drilling management network may analyze various security certificates held by a control system to determine whether the control system or a sensor device has the corresponding security certificate for accessing the virtual network. If the control system has a subscriber security certificate, the control system may obtain sensor data over the virtual network. Likewise, if a sensor device has a publisher security certificate, the sensor device may transmit data to other devices on the virtual network.

Using the sensor data from Block 2730, for example, the drilling management network may select a control system that is a subscriber to the sensor data. Likewise, in Blocks 2740 and 2750, different control systems may be selected to determine whether the respective control system is a subscriber to the sensor data. When a determination is made that the control system is a subscriber, the process may proceed to Block 2760. When a determination is made that the control system is not a subscriber, the process may return to Block 2780.

In Block 2760, sensor data is transmitted to a control system in accordance with one or more embodiments. For example, sensor data may be transmitted in a similar manner as described above in Block 2530 and the accompanying description. Moreover, sensor data may be directed to one or more components on the control system. For example, a control system may include multiple PLCs. Thus, for example, two PLCs in the control system may use the sensor data, while a third PLC in the control system may ignore the sensor data. Likewise, while a control system may be publisher or subscriber or both, one or more components, such as individual PLCs, may also be publishers and/or subscribers on the drilling management network.

In Block 2770, one or more drilling operations are performed at a control system using sensor data in accordance with one or more embodiments. For example, the sensor data may be used in one or more drilling operations and/or maintenance operations with respect to a drilling rig. Through communication directly with a sensor device, various remote calibration operations may be performed on the sensor device and/or in connection with the sensor device. For example, other drilling equipment in the drilling management network may be calibrated using sensor data from the sensor device.

Furthermore, by obtaining sensor data directly from the sensor device, uptime and downtime on the drilling rig may be reduced. For example, where a hardware or software failure exists among a system that includes a sensor device, a middle layer computer, and a programmable logic controller, the failure may need to be independently verified among the system's components. On the other hand, when the sensor data identifies a hardware or software failure, the failure may be diagnosed at the sensor device originating the sensor data. For example, a network controller or a remote user may analyze sensor to determine whether a sensor circuitry fails one or more predetermined criteria. In response to analyzing the sensor data, for example, various settings in the sensor device may be adjusted in order to address the failure and satisfy the predetermined criteria. Thus, obtaining sensor data directly from the sensor device may reduce non-productive time resulting from a failure at the sensor device. Other opportunities may also exist such as preventive maintenance on the sensor device.

In some embodiments, for example, a subscriber control system automatically reconfigures a publisher sensor device in response to analyzing sensor data from the publisher sensor device. A predetermined criterion may be an error band for sensor measurements obtained by sensor circuitry in the publisher sensor device. By analyzing the published sensor data, the subscriber control system may detect an offset error with the sensor circuitry. Thus, the control system may connect directly to the publisher sensor device over the drilling management network to adjust automatically one or more settings on the publisher sensor device in order that the sensor measurements from the sensor device satisfy the error band.

In Block 2780, a determination is made whether another subscriber exists in drilling management network in accordance with one or more embodiments. When a determination is made that the sensor data has not been sent to one or more subscribers, the process may proceed to Block 2740. When a determination is made that no more subscribers exist for the sensor data, the process may end.

Moreover, in one or more embodiments, the processes described above in FIGS. 25 and 27 may enable sensor data to be shared and communicated without using a programmable logic controller. For example, in a centric system, various logical channels for data transmission, e.g. from a sensor device to a software application, may have to be established, configured and maintained throughout the drilling process. As such, the maintenance of such a centric system may increase costs. In particular, whether the costs include adding network elements, removing or replacing a network element, related costs may grow exponentially. Thus, the processes described in FIGS. 25 and 27 may enable sensor devices and/or the drilling management network to decentralize sensor data communication.

While FIGS. 24, 25, 26.2, and/or 27 above describe various control systems in connection with the disclosed technology, in some embodiments, various processes described above may also be applied to acquisition systems, a job monitoring system, and/or data interpretation software systems. For example, the same sensor data from a smart sensor device may be transmitted to a control system, a job monitoring system, a data acquisition system, and a data interpretation software system.

Intelligent Drilling Control System Commissioning

In general, embodiments of the disclosure include a system and various methods for generating and/or using a knowledge graph of a drilling rig control system. In one or more embodiments, the knowledge graph includes nodes corresponding to components of the drilling rig control system and links connecting the nodes to represent interactions between corresponding pairs of components. In one or more embodiments, each link represents at least a target measure of data communication and resource utilization of the corresponding pair of components.

In one or more embodiments, the drilling rig control system is hierarchical and include a first hierarchy and a second hierarchy. The first hierarchy includes sub-systems and hardware components (e.g., drilling equipment and supporting tools) while the second hierarchy includes software components installed on each of the sub-systems. In one or more embodiments, each sub-system, with installed software components, is associated with an aspect of the drilling operation, and is used to control a portion of the hardware components dedicated to the particular aspect of the drilling operation.

In one or more embodiments, the knowledge graph includes an overall drilling rig control system knowledge graph and a number of sub-system knowledge graphs. The overall drilling rig control system knowledge graph corresponds to the first hierarchy, and the sub-system knowledge graphs correspond to the second hierarchy. In one or more embodiments, the knowledge graph is generated by applying machine learning algorithms to the drilling rig control system during a normal drilling operation. In one or more embodiments, the knowledge graph is used as a standard for performing management tasks of the drilling rig control system. In one or more embodiments, the knowledge graph is used to aid in rig commissioning, in particular in the commissioning of the drilling rig control system. As used herein, the term "commissioning" refers to bringing the drilling rig to a working order, which may be performed any time prior to or during rig operation, and may be performed once or periodically throughout the drilling rig operation.

Figure 28:
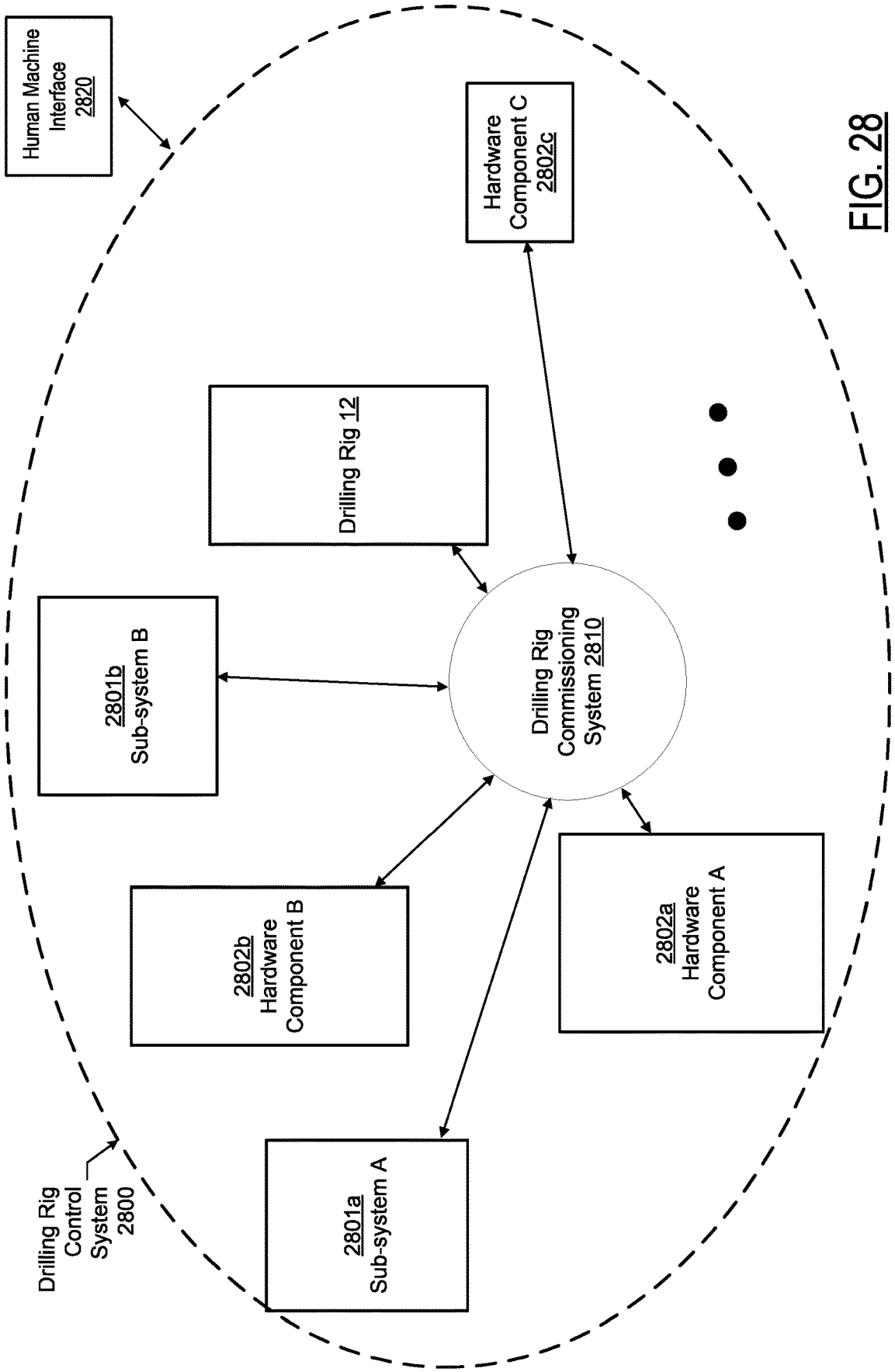

FIG. 28 shows a block diagram of a system in accordance with one or more embodiments. In one or more embodiments of the disclosure, one or more of the elements shown in FIG. 28 may be omitted, repeated, and/or substituted.

Accordingly, embodiments of the disclosure should not be considered limited to the specific arrangements of modules shown in FIG. 28.

As shown in FIG. 28, a drilling rig control system (2800) is coupled to a human machine interface (HMI) (2820) that allows a user to control the operation of the drilling system described in reference to FIG. 1 above. A human machine interface may be hardware and/or software coupled to the drilling rig control system (2800), and which includes functionality for presenting data and/or receiving inputs from a user regarding various drilling operations and/or maintenance operations performed within the drilling rig control system (2800). For example, a human machine interface may include software to provide a graphical user interface (GUI) for presenting data and/or receiving control commands for operating a drilling rig.

In one or more embodiments, the drilling rig control system (2800) includes a number of sub-systems (e.g., sub-system A (2801a), sub-system B (2801b)) and hardware components (e.g., hardware component A (2802a), hardware component B (2802b), hardware component C (2802c)). The hardware components may include drilling equipment and other tools associated with a drilling rig (12), as described in reference to FIG. 1 above. For example, the hardware component A (2802a) may correspond to a mud sub-system, the hardware component B (2802b) may correspond to a rotating sub-system, and the hardware component C (2802c) may correspond to a network element. A network element may include physical devices within a network, such as switches, routers, hubs or any other logical entities for establishing communication connections among the sub-systems and other hardware components.

The sub-systems (e.g., sub-system A (2801a), sub-system B (2801b)) may include, for example, programmable logic controllers (PLCs) having hardware and/or software with functionality to control one or more processes performed by a drilling rig (12), including, but not limited to the components described in FIG. 1. In particular, a PLC may be a ruggedized computer system with functionality to withstand vibrations, extreme temperatures, wet conditions, and/or dusty conditions, for example, around the drilling rig (12). Specifically, a PLC may control valve states, fluid levels, pipe pressures, warning alarms, and/or pressure releases throughout the drilling rig (12) and associated hardware component A (2802a), hardware component B (2802b), etc. As such, one or more components of the drilling rig control system (2800) may include functionality to monitor and/or perform various drilling processes with respect to the mud circulation system, the rotating system, a pipe handling system, and/or various other drilling activities described in reference to FIG. 1 above. In one or more embodiments, the sub-systems (e.g., sub-system A (2801a), sub-system B (2801b)) and hardware components (e.g., hardware component A (2802a), hardware component B (2802ba), hardware component C (2802c)) are collectively referred to as first hierarchy components forming a first hierarchy in the drilling rig control system (2800). Correspondingly, the underlying hardware and/or software elements of each first hierarchy component are collectively referred to as second hierarchy components forming a second hierarchy in the drilling rig control system (2800). In this context, the drilling rig control system (2800) includes a hierarchical component structure.

In one or more embodiments, components of the drilling rig control system (2800) are communicatively coupled to and managed by a drilling rig commissioning system (2810), which is a computing system configured to perform one or more management tasks of the drilling rig control system (2800). In one or more embodiments, the drilling rig commissioning system (2810) enables an unified commissioning (or performing other management tasks) of all components in the drilling rig control system (2800) via a single HMI (2820). In other words, using the drilling rig commissioning system (2810) alleviates the complexity in multiple separate commissioning of each component in the drilling rig control system (2800) via multiple disintegrated HMIs.

In one or more embodiments, the management tasks include a software commissioning task, a network commissioning task, a diagnostic task, etc. In one or more embodiments, the drilling rig commissioning system (2810) generates a knowledge graph that describes the normal operation of the drilling rig control system (2800). The knowledge graph has a hierarchical structure corresponding to the hierarchical component structure of the drilling rig control system (2800). In one or more embodiments, the drilling rig commissioning system (2810) uses machine learning algorithms to generate the knowledge graph during normal operation of the drilling rig control system (2800). The machine learning algorithms may be based on one or more of stochastic, numerical, and statistical analysis techniques. In one or more embodiments, the knowledge graph is used to perform diagnostic tasks during abnormal operation of the drilling rig control system (2800). In one or more embodiments, the knowledge graph of the drilling rig control system (2800) is used to perform software and network commissioning tasks to configure a new drilling rig control system separate from the drilling rig control system (2800) on which the drilling rig commissioning system (2810) is trained. For example, the new drilling rig control system commissioned by the drilling rig commissioning system (2810) may be used to control a different drilling rig separate from the drilling rig (12) controlled by the drilling rig control system (2800).

In one or more embodiments, the drilling rig commissioning system (2810) performs various functionalities described above using the method described in reference to FIG. 29 below. An example of the knowledge graph is described in reference to FIGS. 31-32 below. In one or more embodiments, the drilling rig commissioning system (2810), the human machine interface (2820), and various components of the drilling rig control system (2800) may be a computing system similar to the computing system (3400) described in reference to FIGS. 34.1 and 34.2. In one or more embodiments, the drilling rig commissioning system (2810) is separate from and in communication with the drilling rig control system (2800). In one or more embodiments, the drilling rig commissioning system (2810) and the drilling rig control system (2800) are combined as an integrated system.

Figure 29:
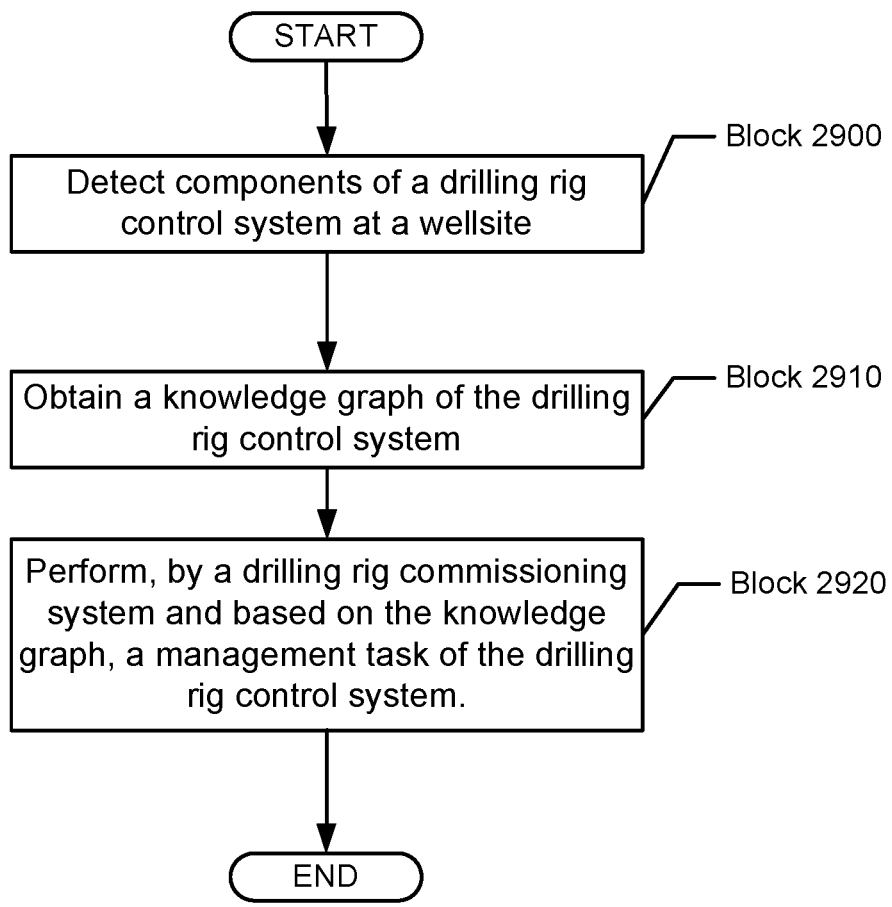

FIG. 29 shows a flowchart in accordance with one or more embodiments. In one or more embodiments, the method may be based on the systems depicted in FIGS. 1, 2, and or 28 above. One or more steps shown in FIG. 29 may be omitted, repeated, and/or performed in a different order among different embodiments of the invention. Accordingly, embodiments of the disclosure should not be considered limited to the specific number and arrangement of steps shown in FIG. 29.

In one or more embodiments, the flowchart depicted in FIG. 29 is used by a drilling rig commissioning system to commission or otherwise manage a drilling rig control system. Initially in Block 2900, components of the drilling rig control system at a wellsite are detected. In one or more embodiments, the components are detected as individual sub-systems and hardware components are powered on and become online, i.e., start communicating via the network. The online components are to be commissioned and communicatively coupled to each other before being used to control a drilling operation at a newly developed wellsite.

In one or more embodiments, the components are detected in response to an alert during the drilling operation of an established wellsite. The alert may indicate abnormal operation or other event/incidence detected by the drilling rig control system or by a user monitoring the drilling operation. The alert may request, automatically or via the user qualifying the alert, the drilling rig commissioning system to perform a diagnostic of the drilling rig control system at the established wellsite.

In Block 2910, a knowledge graph is obtained. In one or more embodiments, the knowledge graph is generated by the drilling rig commissioning system during a machine learning training period when a normal drilling operation is performed by the drilling rig control system at the established wellsite. One or more of stochastic, numerical, and statistical analysis techniques may be used during the machine learning training period. In one or more embodiments, the knowledge graph is generated using the method described in reference to FIG. 29 below.

In one or more embodiments, statistical information stored in the nodes and links of the knowledge graph represents pre-determined target/reference measures of computing activities of corresponding sub-systems and/or data communication activities between each pair of components of the drilling rig control system. For example, the pre-determined measure may include an average, a median, a mode, a correlation, a ranking, a score, a category, and/or other statistics. In other words, the statistical information stored in the nodes and links of the knowledge graph may correspond to the average, median, mode, ranking, score, etc. of computing resource utilizations and/or communication activities of the corresponding pair of components. Further, the statistical information may also include the correlation between the computing resource utilizations and communication activities of the corresponding pair of components.

In one or more embodiments, the links also include ranking information, which is calculated based on various artificial intelligence (AI) depending on rig conditions, operational factors, operational stages, and overall system readiness. For example, the pre-determined measure represented by a particular link may be low, the particular link may have a rank higher than other links in the knowledge graph due to the operational need for the particular link. In one or more embodiments, the operational need for each node/link is determined based on one or more of rig conditions, operational factors, operational stages, and overall system readiness. An example of calculating ranking of nodes/links during drilling rig operation is described in reference to FIG. 33 below.

In one or more embodiments, the knowledge graph is obtained by the drilling rig commissioning system as a target operating condition to commission a newly developed wellsite or rig. In one or more embodiments, the knowledge graph is obtained by the drilling rig commissioning system as a reference standard to diagnose potential issues at an established wellsite or rig.

In Block 2920, a management task of the drilling rig control system is performed based on the knowledge graph by the drilling rig commissioning system. In one or more embodiments, a software commissioning task is performed based on the knowledge graph. For example, the software commissioning task may include one or more of software installation, software-to-service connection, software-to-software connection, license verification, user validation, and network port configuration. In one or more embodiments, the software commissioning task relates to software installed on sub-systems of the drilling rig control system at the newly developed wellsite or rig. For example, the software commissioning task may be performed with respect to the software component in the second hierarchy of the drilling rig control system.

In one or more embodiments, software installation includes one or more validation tasks of software version check, hardware type or model verification, hard disk capability verification, computer memory capacity check, operating system version check, firmware version check, firewall installation and configuration check, network bandwidth and throughput check, and other system parameter checks. In one or more embodiments, one of more of these validation tasks correspond to nodes on the knowledge graph that are connected, for example, via links to a software application. These links represent requirements for the software application to execute properly. If any of these nodes do not exist, the software application would not be able to execute properly. At this point the commissioning system may determine that the system does not meet the requirements and the software application cannot be executed.

In one or more embodiments, a data communication connection between a pair of components of the drilling rig control system is established based on the knowledge graph. For example, the data communication connection may be established between a pair of components in the first hierarchy and/or second hierarchy of the drilling rig control system at the newly developed wellsite or rig.

In one or more embodiments, a diagnostic task of the drilling rig control system is performed based on the knowledge graph. In particular, during the current drilling operation at the established wellsite, a pre-determined measure of computing activities and/or data communication between a pair of components of the drilling rig control system is generated. For example, the pre-determined measure may correspond to data communication between a pair of components in the first hierarchy and/or second hierarchy of the drilling rig control system. The pre-determined measure is compared to a corresponding target pre-determined measure of the pair of components stored in the knowledge graph to generate a result. For example, the result may indicate a difference between the pre-determined measure obtained during the current drilling operation and the corresponding target pre-determined measure obtained during a prior normal drilling operation, such as during the machine learning training phase. In other words, the difference is a deviation of the current drilling operation from the prior normal drilling operation. For example, the deviation may be due to an out-of-date software component, an expiration of software license, an error of software configuration, etc. Accordingly, a diagnostic task is performed by analyzing the difference to identify a root cause of the deviation and to identify an applicable corrective action.

Figure 30:
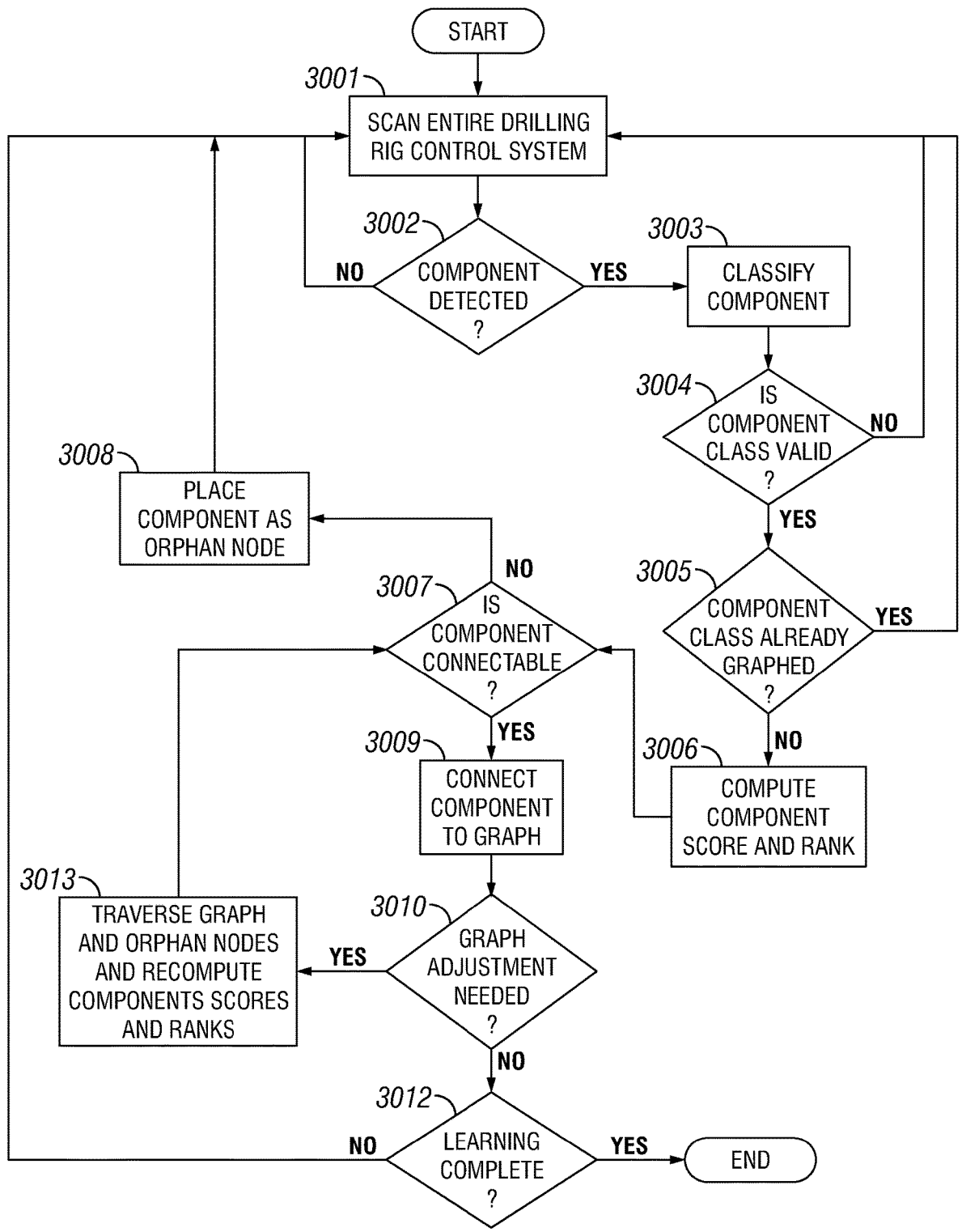

FIG. 30 shows a flowchart in accordance with one or more embodiments. In one or more embodiments, the method may be based on the systems depicted in FIGS. 1, 2, and 28 above. One or more steps shown in FIG. 30 may be omitted, repeated, and/or performed in a different order among different embodiments of the invention. Accordingly, embodiments of the disclosure should not be considered limited to the specific number and arrangement of steps shown in FIG. 30.

In one or more embodiments, the flowchart depicted in FIG. 30 is used during a machine learning training phase to generate a knowledge graph of a drilling rig control system during a drilling operation. Each iteration through the flowchart is performed as individual sub-systems and hardware components are powered on and become online, i.e., start communicating via the network. The online components are detected through multiple iterations of the flowchart to generate and expand a knowledge graph of the drilling rig control system.

Initially in Block 3001, the drilling rig control system is scanned to detect any sub-system or hardware component that is online, i.e., communicating via the network. In one or more embodiments, the scanning is performed by the drilling rig commissioning system using network communication protocols. In one or more embodiments, the drilling rig commissioning system includes an artificial intelligence (AI) module that monitors all the processes running on the computers that are part of the drilling control system. When a new process (e.g., application, services, script, etc) starts running on any of the computer(s), the new process is detected by the AI module. Once a new process is detected, a dependency tree is generated as the knowledge graph. For example, as described in Blocks 3002 through 3012 below, the AI module may identify all the required software components such as DLL's, configuration files, database, network ports, network connections, etc, that are needed by the process. As multiple processes, or services, or scripts run on the computer(s), the AI module computes the importance of each software component by correlating to operational information. Operational information is provided during a learning stage when the system is taught how to detect different operational information. For drilling operations, most of the operational steps are pre-determined. Given that these operational steps repeat during the course of a drilling operation, the AI module may use the knowledge that a certain operation step is in progress and use numerical algorithms to determine or recalculate the importance of certain software components (or nodes). Because the time when the next operational step starts is not certain, stochastic methods of computing ranking may be applied. Depending on the upcoming operational step, ranking of nodes and edges change depending on the importance of each node and edge. In other words, rankings change depending on the importance of nodes and edges for certain steps of drilling operations. For example, during drilling, certain applications are required to be running and available in order to drill the well. The ranking for these applications are high before and during this operations step. There are also less important system components. In order to compute the ranking for these components, a statistical or probabilistic approach may be used.

In Block 3002, a determination is made as to whether a sub-system or hardware component is detected. If the determination is negative, the method returns to Block 3001 to continue scanning. If the determination is positive, the method proceeds to Block 3003 where the detected component is classified, e.g., as one of many first hierarchy components and second hierarchy components of the drilling rig control system. In Block 404, a determination is made as to whether the detected component class is valid. If the determination is negative, the detected component is discarded and the method returns to Block 3001 to continue scanning. If the determination is positive, the method proceeds to Block 3005 where another determination is made as to whether the detected component is already included in the knowledge graph. If the determination is positive, the method returns to Block 3001 to continue scanning. If the determination is negative, the method proceeds to Block 3006 where a score and rank of the detected component is computed.

In one or more embodiments, the score represents a pre-determined measure of computing activities of the detected component. In one or more embodiments, the score represents a pre-determined measure of communication activities between the detected component and another component in the knowledge graph. Once the score is computed, the score is compared with other component scores in the knowledge graph to generate a rank of the newly detected component. Then the method proceeds to Block 3007 where yet another determination is made as to whether the detected component is connectable into the knowledge graph. If the determination is negative, the method proceeds to Block 3008 where the detected component is placed as an orphan node in the knowledge before the method returns to Block 3001 to continue scanning. If the determination is positive, the method proceeds to Block 3009 where the detected component is connected to other node(s) in the knowledge graph to expand the knowledge graph.

The method then proceeds to Block 3010 where a determination is made as to whether graph adjustment is needed, e.g., if the newly detected component is able to connect to a previously detected orphan node. If the determination is positive, the method proceeds to Block 3013 to traverse the knowledge graph and the orphan nodes. Subsequent Block 3007 identifies one or more orphan nodes that become connectable due to the newly detected component. If the determination in Block 3010 is negative, the method proceeds to Block 3012 where the determination is made as to whether the machine learning training is complete. For example, the determination may be made using a machine learning algorithm. If the determination is negative, the method returns to Block 3001 to enter the next iteration. If the determination is positive, the method ends and the knowledge graph is stored. In one or more embodiments, the stored knowledge is subsequently used by the drilling rig commissioning system for performing a management task of the drilling rig control system.

Figure 31:
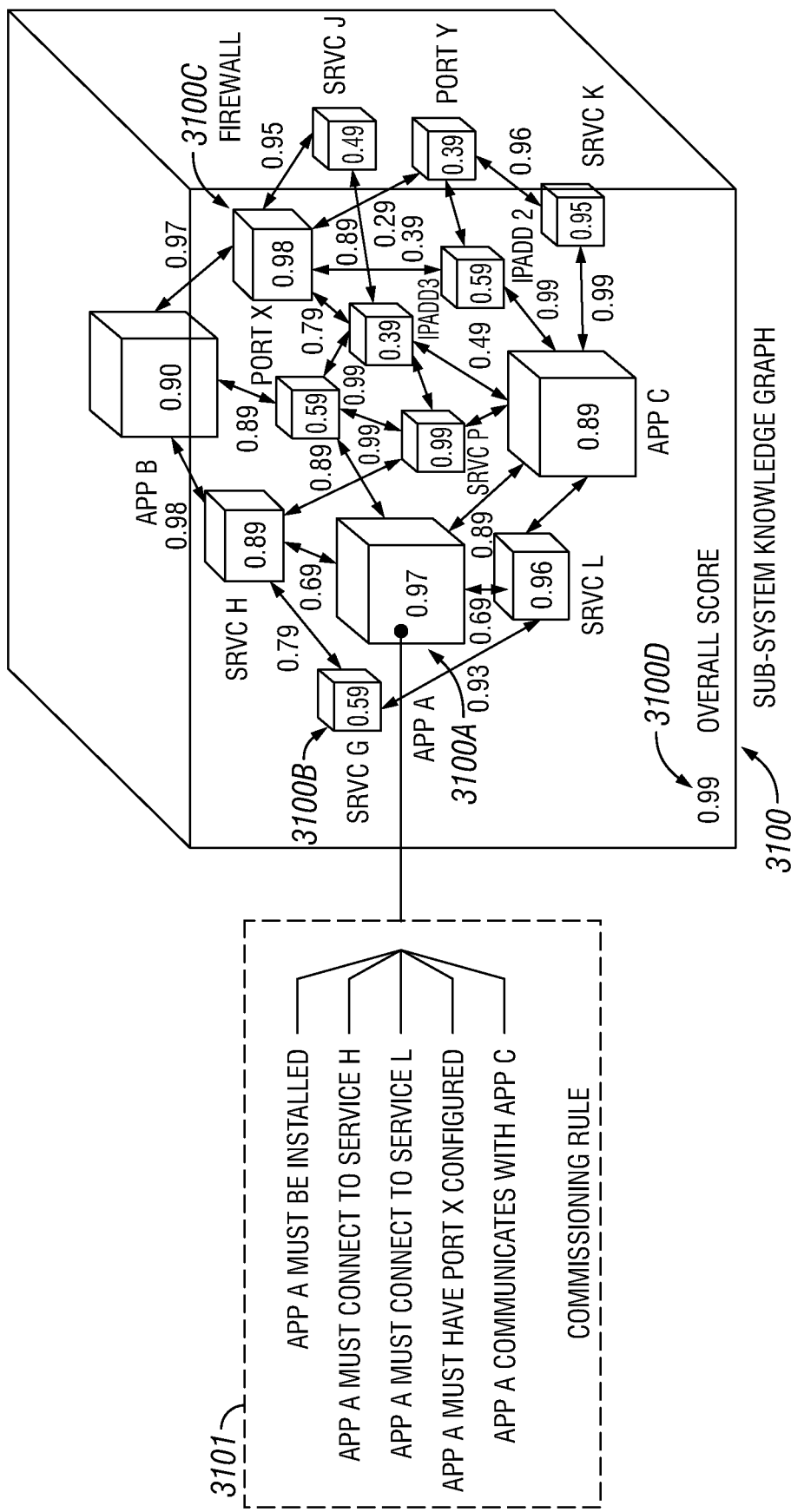
Figure 32:
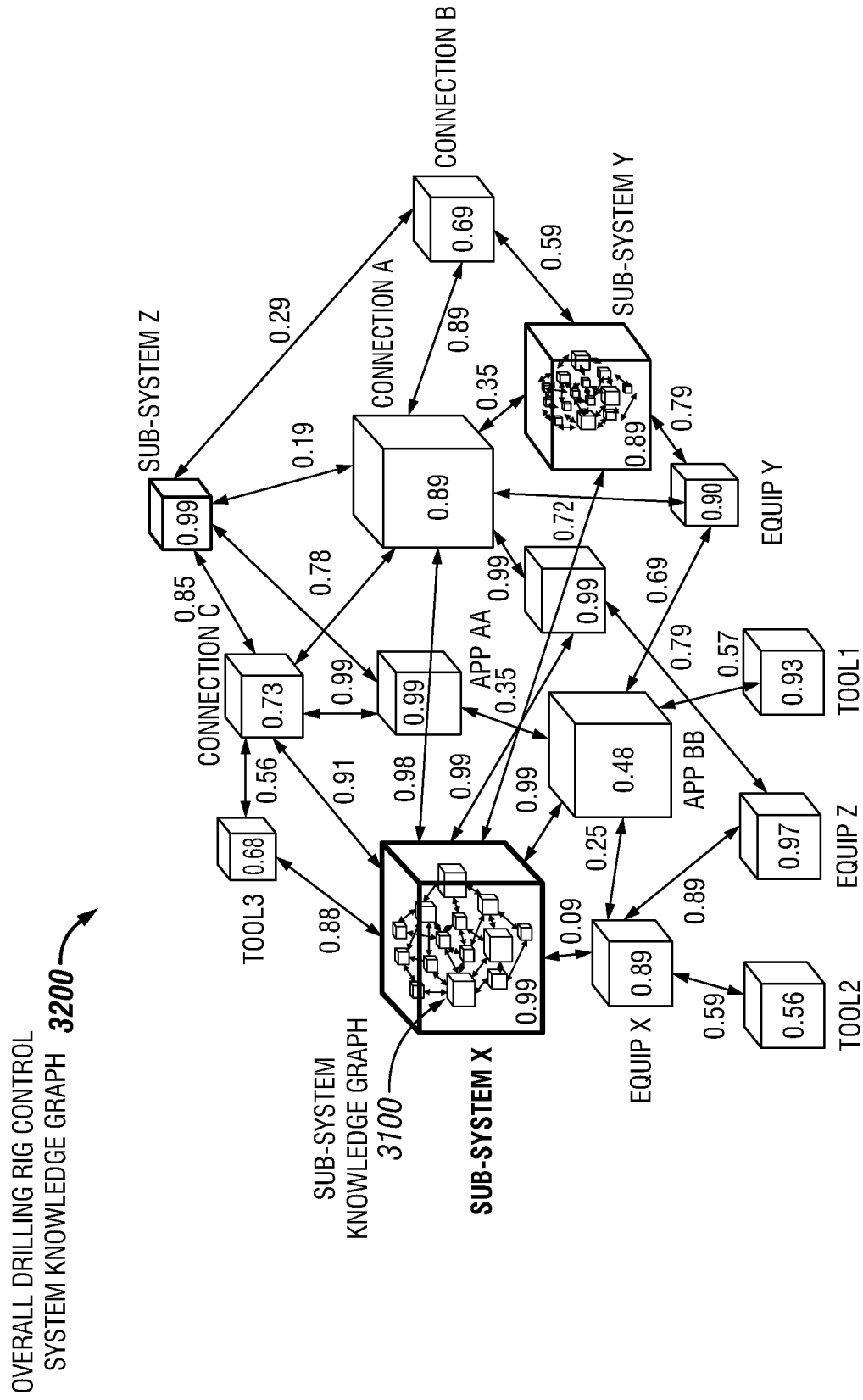
Figure 33:
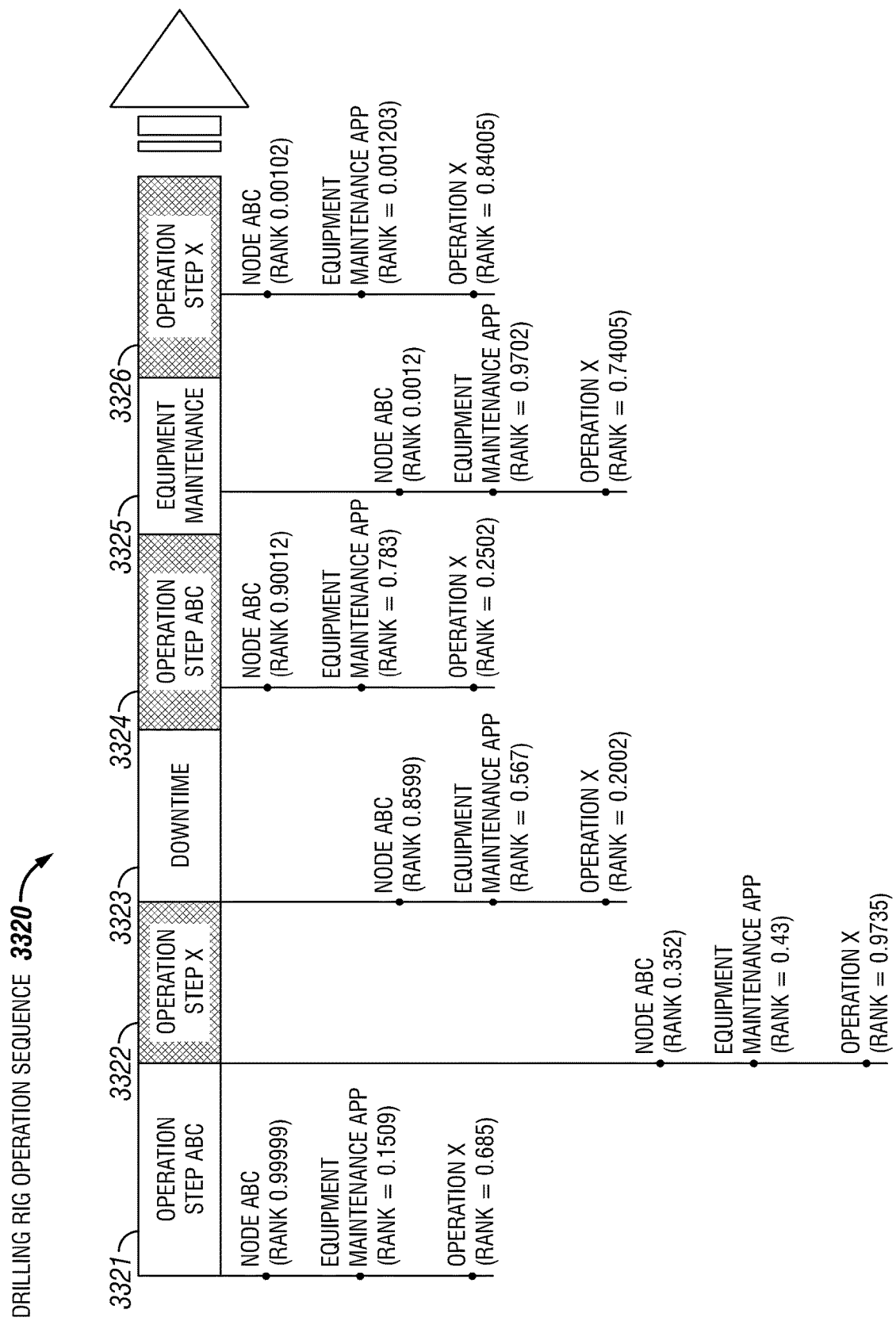

FIGS. 31-33 show examples in accordance with one or more embodiments. In one or more embodiments, the examples may be based on the systems depicted in FIGS. 1, 2, and 28 above and/or the method flowcharts depicted in FIGS. 29-30 above. In one or more embodiments, one or more of the elements shown in FIGS. 31-33 may be omitted, repeated, and/or substituted. Accordingly, embodiments of the invention should not be considered limited to the specific arrangements of modules shown in FIGS. 31-33.

In the example depicted in FIGS. 31-33, multiple sub-systems exist to make up a drilling rig control system. There is the drilling control sub-system that operates machines to drill the well. There is the mud sub-system that mixes the drilling mud, which is pumped downhole by the pumping sub-system. There is the cementing sub-system that mixes and pumps cement. In addition to the above key drilling sub-systems, there are many other sub-systems such as the rig power generator system that co-exist and make up the overall drilling rig control system. Each of these sub-systems perform specialized functions by using heavy machinery and complex control systems to safely drill an oil and gas well. Often, there is minimal integration between these sub-systems mainly because these sub-systems are designed for standalone use. Different vendors may manufacture these sub-systems, and traditionally there has been very little collaboration to ensure smooth integration of these sub-systems. The level of integration between different sub-systems depend on how much collaboration exist between different sub-system vendors. When these sub-systems are used on a rig site, one or more rig commissioning engineers physically interconnect these sub-systems together to configure the entire drilling rig control system. Because of the vast number of rig sub-system types and configurations, rig commissioning engineers are required to have extensive knowledge and experience on many types of rig sub-systems to complete the rig commissioning tasks. The effort of integrating disparate rig sub-systems is often challenging, time consuming, and prone to errors.

As noted above, an intelligent drilling rig commissioning system is used to automatically commission drilling rig control systems. A drilling rig subsystem comes online when all mechanical connections, hardware installation, wiring, and any other physical connections are complete. As a sub-system comes online, the computing devices are powered on. At this stage, the intelligent drilling rig commissioning system takes over and performs all the software commissioning tasks necessary for the sub-system to perform all its functions. As part of the software commissioning tasks, the intelligent commissioning system performs software installation, license verification, user validation, network port configuration, and any other activities required for the sub-system control system to function properly. The intelligent commissioning system perform these actions based on the drilling rig sub-system knowledge graph. The sub-system knowledge graph contains all the information necessary for the intelligent system verify and validate the software installation and configuration at the sub-system level.

FIG. 31 shows an example sub-system knowledge graph (3100) corresponding to the sub-system A (2801a) depicted in FIG. 28 above. In the sub-system knowledge graph (3100), nodes are denoted as cubes and links are denoted as double arrows. Each node and each link are assigned a score representing the pre-determined measure of computing activity and/or communication activity associated with the node/link. For example, AppA (3100a) corresponds to an application software installed within the sub-system A (2801a) and assigned the score 0.97, where nodes labeled AppB and AppC correspond to additional application software components that are assigned scores 0.90 and 0.89, respectively. These scores indicate that AppA (3100a) has higher computing activity than AppB, which in turns has higher computing activity than AppC. In another example, SrvcG (3100b) corresponds to a software service G of an operating system within the sub-system A (2801a), where additional nodes labeled SrvcH, Srvc J, Srvc K, Srvc L, and Srvc P correspond to software services H, J, K, L, and P, respectively. In addition, firewall (3100c) corresponds to the firewall software within the sub-system A (2801a). Similarly, the nodes labeled PortX and PortY correspond to communication network ports within the sub-system A (2801a). Further, the nodes labeled IPadd2 and IPadd 3 correspond to network nodes with particular IP address 2 and IP address 3. Note that the links from AppA (3100a) to SrvcH, SrvcL, and PortX are assigned the scores 0.69, 0.69, and 0.89, respectively. These scores indicates that AppA (3100a) communicates with SrvcH and Srvc L with similar activity/frequency, which has a lower measure (i.e., less actively or less frequently) than the communication activity between AppA (3100a) and PortX. The scores assigned to all nodes and links within the sub-system knowledge graph (3100) are aggregated into an overall score (3100d) that represents a pre-determined measure (i.e., 0.99) of aggregate internal computing/communication activities within the sub-system A (2801a) during the drilling operation. For example, the overall score (3100d) may be a weighted average of scores assigned to all nodes and links. In another example, the overall score (3100d) may be computed, using other statistical formula, from the scores assigned to all nodes and links.

In an example scenario, the sub-system A (2801a) is a self-contained computer, such as a notebook computer or a computer server that contain the aforementioned software applications, software services, firewall, communication network ports, network nodes, etc. The sub-system knowledge graph (3100) also includes a commissioning rule (3101) that specifies installation, connection, communication, and port configuration rules regarding the application software AppA (3100a).

As the commissioning of each sub-system completes, the intelligent commissioning system automatically detects and performs further software configuration to ensure that all sub-systems communicate with each other within the drilling rig control system. The intelligent commissioning system also scans and performs compatibility tests with any of the equipment that are part of the drilling rig equipment and ensures that the software to control the equipment is available and properly configured. When a discrepancy is detected, the intelligent commissioning system connects to the cloud and downloads any missing software or software configuration artifacts necessary to fully install and properly configure the software for a given drilling rig control system installation. The intelligent commissioning system performs these actions based on the overall drilling rig control system knowledge graph. In one or more embodiments, the intelligent commissioning system also stores the type of the rig as part of the knowledge graph, such as a type and knowledge graph mapping database that may be used later on to commission same kind of new rigs.

FIG. 32 shows an example overall drilling rig control system knowledge graph (3200) corresponding to the drilling rig control system (2800) depicted in FIG. 28 above. In the overall drilling rig control system knowledge graph (3200), nodes are denoted as cubes and links are denoted as double arrows. Each node and each link are assigned a score representing the pre-determined measure of computing activity and/or communication activity associated with the node/link. For example, the node labeled Sub-systemX corresponds to the sub-system knowledge graph (3100) depicted in FIG. 31 above, where nodes labeled Sub-systemY and Sub-systemZ correspond to additional sub-system knowledge graphs that are assigned overall scores 0.89 and 0.99, respectively. While the sub-system knowledge graph (3100) corresponds to sub-system A (2801a) depicted in FIG. 28 above, Sub-systemY and Sub-systemZ may correspond to other sub-systems depicted in FIG. 28 above. For example, Sub-systemY may correspond to sub-system B (2801b). The scores of the Sub-systemX (i.e., 0.99) and Sub-systemY (i.e., 0.89) indicate that sub-system A (2801a) has higher aggregate internal computing/communication activity than sub-system B (2801b).

In another example, nodes labeled EquipX, EquipY, EquipZ, Tool1, Tool2, and Tool3 correspond to drilling equipment and other tools depicted in FIG. 1 above where each individually assigned score represents a usage statistics of the corresponding equipment/tool during the drilling operation. In addition, nodes labeled ConnectionA, ConnectionB, and ConnectionC correspond to network elements within the drilling rig control system. The nodes labeled AppAA and AppBB correspond to cloud based software applications accessible to various sub-system and hardware components within the drilling rig control system. Note that the links from Sub-systemX to EquipX, AppBB, and Tool3 are assigned the scores 0.09, 0.25, and 0.88, respectively. These scores indicates that Sub-systemX rarely communicates with EquipX, communicates relatively sparingly with AppBB, and communicates frequently with Tool3.

Without using the overall drilling rig control system knowledge graph (3200), each sub-system of the drilling rig control system is commissioned individually by a team of experts who collaborates with other teams with different expertise to commission the entire drilling rig control system. The challenge lies in the enormous amount of information that few rig commissioning engineers master before they can perform all the software commissioning tasks effectively and efficiently. There is a race between rig commissioning engineers mastering the training material to perform their tasks and the ongoing evolution of each drilling rig sub-systems. Each drilling rig sub-systems continue to evolve as new techniques and technologies are introduced. As enhancements and new technologies are introduced, rig commissioning engineers undergo training. The amount of information that a rig commissioning engineer master has become challenging to teach in a reasonable amount of time. As a result, the knowledge gap continues to grow as new technologies are introduced by each drilling rig sub-systems. With the benefit of using the overall drilling rig control system knowledge graph (3200) described above, a single team of engineers have enough expertise to fully commission the entire drilling rig control system without the presence of multiple teams of sub-system experts.

FIG. 33 shows an example of calculating ranking during a drilling rig operation sequence (3320) that includes operations (3321)-(3326) and additional operations not explicitly shown. In particular, the same operation step ABC is performed at different time during the operation (3321) and operation (3324), the same operation step X is performed at different time during the operation (3322) and operation (3326), equipment maintenance is performed during the operation (3325), and operation (3323) represents downtime of the drilling operation. In the example shown in FIG. 33, during each of the operations of the drilling rig operation sequence (3320), AI algorithms are used to calculate a rank for elements in a knowledge graph, such as Node ABC, Equipment Maintenance application, and Operation X. As described above, the rank is calculated based on one or more of rig conditions, operational factors, operational stages, and overall system readiness. Specifically, as each operation is performed in the drilling rig operation sequence (3320) shown in FIG. 33, the rank of Node ABC varies as follows: 0.99999, 0.352, 0.8599, 0.90012, 0.0012, 0.00102, etc. As the ranks are performed throughout the drilling rig operation sequence (3320), the drilling rig commissioning system continuously bringing the drilling rig to a working order, which may be performed any time prior to or during drilling operation, and may be performed once or periodically throughout the drilling operation.

Configuration Manager and Coordinated Controller

In some embodiments, an operations network includes a configuration manager, which may be hardware and/or a software program instantiated and operable on one or more processing systems, such as one or more network appliances. The configuration manager may be a software program written in and compiled from a high-level programming language, such as C/C++ or the like. As described in further detail below, the configuration manager is operable to translate communications from various communications protocols to a common communication protocol and make the communications translated to the common communication protocol available through a common data bus, and vice versa. The common data bus may include an application program interface (API) of the configuration manager and/or a common data virtual network (VN-DATA) implemented on one or more processing systems, such as network appliances like switches.

The configuration manager can have predefined classes for objects to implement the translations of communication. Instantiated objects in the configuration manager for subsystems can be used to receive communications from the subsystems according to respective (and possibly different) communication protocols implemented by the subsystems, and to translate the communications to a common protocol, which is made available on the common data bus, and vice versa. The classes can define objects at the subsystem level (e.g., drilling control system, drilling fluid circulation system, cementing system, etc.), the equipment level (e.g., top drive, drawworks, drilling fluid pump, etc.), and/or the data level (e.g., type of commands, sensor data, and/or status data). Hence, an object can be instantiated for each instance of a subsystem, equipment, and/or data type depending on how the class of the object was defined. Further, the classes can define objects based on the communication protocols to be implemented by the subsystems. Hypothetically, assuming two subsystems that are identical except that each implements a different communication protocol, the configuration manager may instantiate objects for the subsystems from different classes that were defined based on the different communication protocols. Objects can be instantiated at set-up of the operations network and/or by dynamically detecting one or more equipment controllers (ECs) and/or subsystems.

As will become apparent from description below, using a configuration manager may permit simpler deployment of subsystems in a well construction system and associated communications equipment, for example. The use of a software program compiled from a high-level language may permit deployment of an updated version of a configuration manager when an additional, previously undefined subsystem is deployed, which may alleviate deployment of physical components associated with the configuration manager (e.g., when adding equipment/subsystems to the well construction system). Further, applications that access data from the configuration manager (e.g., through the common data bus) can be updated through a software update when new data becomes available by the addition of a new subsystem, such that the updated application can consume data generated by the new subsystem.

One or more processing systems of the operations network, such as one or more switches and/or other network appliances, are configured to implement one or more subsystem virtual networks (e.g., VLANs), such as a first subsystem virtual network (VN-S1), a second subsystem virtual network (VN-S2), and an Nth subsystem virtual network (VN-SN). More or fewer subsystem virtual networks may be implemented. The subsystem virtual networks (e.g., VN-S1, VN-S2, and VN-SN) are logically separate from each other. The subsystem virtual networks can be implemented according to the IEEE 802.1Q standard, another standard, or a proprietary implementation. Each subsystem virtual network can implement communications with the EC(s) of the respective subsystem based on various protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol. Further, the subsystem virtual networks can implement publish-subscribe communications. The subsystem virtual networks can implement the same protocol, each subsystem virtual network can implement a different protocol, or a combination therebetween.

Furthermore, processing systems that process data for control of various subsystems can have resources dedicated for such processing. For example, the one or more processing systems on which a coordinated controller operates, the one or more processing systems on which the configuration manager operates, the one or more processing systems that are configured to implement the virtual networks, and/or other processing systems may have resources dedicated to processing and communicating commands and/or sensor and/or status data used to determine appropriate commands to issue. By dedicating resources in this manner, control of processes in the well construction system may be real-time. Other communications and processing may be may be handled in a non-real-time manner without using dedicated resources.

The coordinated controller can also implement logic to control operations of the well construction system. The coordinated controller can monitor various statuses of components and/or sensors and can issue commands to various ECs to control the operation of the controllable components within one or more subsystems. Sensor data and/or status data can be monitored by the coordinated controller via the common data bus, and the coordinated controller can issue commands to one or more ECs via the respective subsystem virtual network of the EC.

The coordinated controller can implement logic to generate commands based on a job plan from one or more process applications, and to issue those commands to one or more ECs in one or more subsystems. The one or more process applications may communicate a generalized command to the coordinated controller, such as through the common data bus. The generalized command may include an intended general operation (e.g., drilling into a formation) and defined constraints of parameters that can affect the operation. For example, the defined constraints for a drilling operation may include a desired function of rate of penetration (ROP) of the drilling related to a top drive revolutions per minute (RPM) and weight on bit (WOB). The coordinated controller may interpret the generalized command and translate it to specified commands (that are interpretable by appropriate ECs) that are then issued to ECs to control various controllable components.

The coordinated controller can further monitor the status of various equipment and/or sensor data to optimize operations of equipment of subsystems based on the status and/or sensor data that is fed back. By feeding back and monitoring data of the environment of the well construction, the coordinated controller can continuously update commands to account for a changing environment. For example, if the ROP is greater or less than anticipated by the plan, the coordinated controller can calculate and issue commands to increase or decrease one or both of top drive RPM and WOB.

Similarly, one or more of the process applications can monitor status and/or sensor data available through the common data bus to monitor a progression of an operation, and/or to update a job plan based on a changing environment. If the operation progresses as planned within the various constraints, for example, the process applications may not update the job plan and can permit operations to continue based on the job plan that is being implemented. If the operation progresses differently from what was planned, which may be indicated by the status and/or sensor data, the process applications may alter the job plan and communicate the altered job plan to the coordinated controller for implementation.

A method may include developing a job plan, such as by one or more of the process applications. The job plan may be developed based on geological and/or geophysical data measured or otherwise believed to be descriptive of the target formation(s) of the well being constructed, and/or one or more geological, geophysical, and/or engineering databases. The developed job plan may include details pertaining to the trajectory of the well, the mud to be used during drilling, casing design, drill bits, BHA components, and the like.

The method may include implementing the job plan, such as by the coordinated controller as described above. Implementing the job plan may comprise operating (and/or causing the operation of) the well construction system to form the well according to the developed job plan. The operation details (e.g., WOB, top drive RPM, mud flow rate, etc.) may be determined during the development and/or implementation of the job plan.

The method also includes monitoring status and/or sensor data, such as by one or more of the process applications and the coordinated controller, as the job operations continue. The method also includes determining whether the implementation of the job plan should be updated based on the monitored status and/or sensor data. The coordinated controller may perform the determination. The determination may be based on one or more indications in (or derived from) the monitored status and/or sensor data that the operations are deviating from an intended progression of the job plan implementation, and/or that the initial job plan implementation was faulty in light of new data. If the determination is that the implementation will not be updated, operations continue while monitoring the status and/or sensor data, such as by the coordinated controller. If the determination is that the implementation will be updated, the existing job plan implementation is updated based on the monitored status and/or sensor data, such as by the coordinated controller. The status and/or sensor data monitoring (406) and job operations then continue.

The method also includes determining whether the job plan should be updated based on the monitored status and/or sensor data. One or more of the process applications may perform the determination. The determination may be based on one or more indications in (or derived from) the monitored status and/or sensor data that the operations are deviating from an anticipated progression of the job plan, and/or that the initially developed job plan was faulty in light of new data. If the determination is that the job plan will not be updated, operations continue while monitoring the status and/or sensor data, such as by one or more of the process applications. If the determination is that the job plan will be updated, the job plan is updated (based on the monitored status and/or sensor data) and implemented, such as by one or more of the process applications. The status and/or sensor data monitoring and job operations then continue. The method may continue until the initially developed or updated job plan is completed.

Developing a job plan may be calculation intensive, and may thus be developed over a longer period of time, which may not be real-time to the operations. The coordinated controller (e.g., the one or more processing systems on which the coordinated controller operates) may have resources (e.g., processing resources) dedicated to control of various systems, which permit such control to be real-time (e.g., within a known, determinable period of time). Further, the implementation may be updated by simpler processes, which may permit real-time updates to the implementation. The real-time updates may permit optimized control of operations being implemented by a job plan.

The coordinated controller can control issuance of commands to ECs generated in response to an actor outside of the ECs' respective subsystem virtual networks. Thus, for example, the HMI can issue a command to one or more ECs in a subsystem through the common data bus under the control of the coordinated controller and through the subsystem virtual network of that subsystem. For example, a user may input commands through the HMI to control an operation of a subsystem. Commands to an EC of a subsystem from an actor outside of that subsystem may be prohibited in the operations network without the coordinated controller processing the command. The coordinated controller can implement logic to determine whether a given actor (e.g., the HMI and/or process applications) can cause a command to be issued to a given EC in a subsystem.

The coordinated controller can implement logic to arbitrate commands that would control the operation of a particular equipment or subsystem, such as when there are multiple actors (e.g., job plans and/or HMIs) attempting to cause commands to be issued to the same equipment or subsystem at the same time. The coordinated controller can implement an arbiter (e.g., logic) to determine which of conflicting commands from HMIs and/or job plans to issue to an EC. For example, if a first job plan attempts to have a command issued to the EC-SN-1 to increase a pumping rate of a pump, and a second job plan simultaneously attempts to have a command issued to the EC-SN-1 to decrease the pumping rate of the same pump, the arbiter of the coordinated controller can resolve the conflict and determine which command is permitted to be issued. Additionally, as an example, if two HMIs issue conflicting commands simultaneously, the coordinated controller can determine which command to prohibit and which command to issue.

The arbiter of the coordinated controller may operate using a hybrid first in, first served and prioritization scheme. For example, the first command that is issued is permitted to operate to completion or until the actor that caused the command to be issued terminates the execution of that command. In some examples, a single, self-contained job plan that is to be executed alone without the execution of another job plan can generally be implemented without generating conflicting commands. However, a job plan may refer to another job plan, which may result in conflicting commands being generated. For example, a job plan for a cementing process can refer to a job plan for a drilling process in order to operate a pump, and by executing the job plan for the cementing process that refers to the job plan for the drilling process, multiple conflicting commands may be generated for the pump by operation of the two job plans. The arbiter handles these commands by permitting the first command that is generated by one of the job plans to be completed or until the generating job plan terminates the first command, even though a second subsequent and conflicting command is generated by the other of the job plans. The second command is placed in a queue until the first command is completed or terminated by its generating job plan, and then the arbiter permits the second command to be issued and executed.

Some actors within the operations network may be assigned a priority that permits those actors to interrupt operations and/or commands regardless of the current state of the process. For example, an HMI can be assigned a high priority that permits a command from the HMI to interrupt an operation and/or command that is being executed. The command from the HMI may be executed, despite the current state of the process, until the command is completed or terminated by the sending HMI. After the command from the HMI has been executed, the process may return to its previous state or restart based on new conditions on which the job plan and/or implementation of the job plan is based.

Another method may include receiving one or more commands generated from one or more non-prioritized actors. For example, an arbiter can receive one or more commands that have been generated from one or more job plans, which may be non-prioritized. The method includes issuing the earliest received, non-issued command. For example, the arbiter can effectively queue commands from non-prioritized actors, and the first command received from a non-prioritized actor is the first command that is issued by the arbiter. The method comprises executing the issued command until the command is completed or terminated by the sending actor. The execution of the issued command may be a discrete, instantaneous function by equipment, a function performed by equipment over a defined duration, a function performed by equipment until defined conditions are met (which may be indicated by the sending actor), and/or other example means of execution. The method then loops back to issuing the earliest received, non-issued command During the issuance and the execution, commands can continue to be received from one or more non-prioritized actors, which commands are queued for issuance. Hence, the receiving, issuing, and executing may implement a first in, first served type of queue.

During the receiving, issuing, and executing, the method includes receiving a command from a prioritized actor. The receipt of a command from a prioritized actor interrupts the flow of the receiving, issuing, and executing commands from non-prioritized actors, and hence, the command from the prioritized actor has priority over commands from non-prioritized actors. Example prioritized actors can include HMIs or others. The method includes issuing the command received from the prioritized actor, and executing the issued command until the command is completed or terminated by the sending actor. The execution of the issued command may be a discrete, instantaneous function by equipment, a function performed by equipment over a defined duration, a function performed by equipment until defined conditions are met (which may be indicated by the sending actor), and/or other example means of execution.

After the execution of the command received from the prioritized actor, the method may resume at various instances. For example, after the execution, the method may resume at the instance where the receipt of the command from the prioritized actor interrupted the flow of the receiving, issuing, and executing one or more commands received from one or more non-prioritized actors. Additionally, the execution of the command received from the prioritized actor can change conditions at the wellsite to an extent that non-prioritized actors withdraw previously sent commands and begin sending commands that are updated in response to the conditions that changed as a result of the execution of the command from the prioritized actor. Thus, the method may resume at receiving one or more commands from one or more non-prioritized actors regardless of the instance when the receipt of the command from the prioritized actor occurred.

In some examples of the implementation of another example method, the arbiter receives and issues the commands, which commands may be received from other logic of the coordinated controller that implements one or more job plans received from one or more process applications. The arbiter can determine which commands the coordinated controller is to issue to one or more ECs, and the ECs may execute the commands by controlling various equipment of the well construction system at the wellsite, for example. Other components and/or processing systems can implement various operations in other examples.

For more information on configuration managers and coordinated controllers, see U.S. patent application Ser. No. 15/621,180, titled "Well Construction Communication and Control", which was filed on Jun. 13, 2017, and U.S. patent application Ser. No. 15/361,759, titled "Well Construction Communication and Control", which was filed on Nov. 28, 2016, which are both incorporated herein by reference in their entirety.

Computing System

Embodiments may be implemented on a computing system. Any combination of mobile, desktop, server, router, switch, embedded device, or other types of hardware may be used. For example, as shown in FIG. 34.1, the computing system (3400) may include one or more computer processors (3402), non-persistent storage (3404) (e.g., volatile memory, such as random access memory (RAM), cache memory), persistent storage (3406) (e.g., a hard disk, an optical drive such as a compact disk (CD) drive or digital versatile disk (DVD) drive, a flash memory, etc.), a communication interface (3412) (e.g., Bluetooth interface, infrared interface, network interface, optical interface, etc.), and numerous other elements and functionalities.

The computer processor(s) (3402) may be an integrated circuit for processing instructions. For example, the computer processor(s) may be one or more cores or micro-cores of a processor. The computing system (3400) may also include one or more input devices (3410), such as a touchscreen, keyboard, mouse, microphone, touchpad, electronic pen, or any other type of input device.

The communication interface (3412) may include an integrated circuit for connecting the computing system (3400) to a network (not shown) (e.g., a local area network (LAN), a wide area network (WAN) such as the Internet, mobile network, or any other type of network) and/or to another device, such as another computing device.

Further, the computing system (3400) may include one or more output devices (3408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (3402), non-persistent storage (3404), and persistent storage (3406). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (3400) in FIG. 34.1 may be connected to or be a part of a network. For example, as shown in FIG. 34.2, the network (3420) may include multiple nodes (e.g., node X (3422), node Y (3424)). Each node may correspond to a computing system, such as the computing system shown in FIG. 34.1, or a group of nodes combined may correspond to the computing system shown in FIG. 34.1. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (3400) may be located at a remote location and connected to the other elements over a network.

Although not shown in FIG. 34.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (3422), node Y (3424)) in the network (3420) may be configured to provide services for a client device (3426). For example, the nodes may be part of a cloud computing system. The nodes may include functionality to receive requests from the client device (3426) and transmit responses to the client device (3426). The client device (3426) may be a computing system, such as the computing system shown in FIG. 34.1. Further, the client device (3426) may include and/or perform all or a portion of one or more embodiments of the disclosure.

The computing system or group of computing systems described in FIGS. 34.1 and 34.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (3400) in FIG. 34.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 34.1, while performing one or more embodiments of the disclosure, may perform data comparison. Data comparison may be used to compare two or more data values (e.g., A, B). For example, one or more embodiments may determine whether $A>B$, $A=B$, $A\ !=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., A−B), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 34.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 34.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 34.1 and the nodes and/or client device in FIG. 34.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A system, comprising:
a first control system coupled to a plurality of network elements that define a drilling management network, wherein the first control system comprises one or more programmable logic controllers (PLCs) that perform a drilling operation;
a virtualization services manager coupled to the first control system and the plurality of network elements, wherein the virtualization services manager generates at least one virtualization service on a virtualization services layer of the drilling management network, wherein the at least one virtualization service controls the drilling operation, and wherein the at least one virtualization service comprises at least one of a virtual machine and a software container; and
a virtual connection controller coupled to the plurality of network elements, wherein the virtual connection controller is configured to receive an indication of whether the drilling operation is being performed, establish a virtual connection between the first control system and a user network upon confirmation that the drilling operation is not being performed, and disconnect the virtual connection upon confirmation that the that the drilling operation is not being performed.

2. The system of claim 1, further comprising:
a shutdown manager coupled to the virtualization services manager, the plurality of network elements, and the first control system, wherein the shutdown manager terminates operations of the first control system and the virtualization services manager according to a shutdown sequence for the drilling management network.

3. The system of claim 2, further comprising:
a plurality of virtual machines operating on the drilling management network and that are generated by the virtualization services manager, wherein the plurality of virtual machines perform a plurality of automated drilling operations, and wherein the shutdown manager communicates with the plurality of virtual machines to terminate the operations according to the shutdown sequence.

4. The system of claim 3, wherein the shutdown manager transmits a plurality of time delayed termination commands to the first control system, the plurality of virtual machines, and the virtualization services manager, and wherein the plurality of time delayed termination commands implement the shutdown sequence.

5. The system of claim 1, wherein the virtual connection corresponds to a temporary conduit between a first security zone and a second security zone, wherein the first security zone comprises the first control system, and wherein the second security zone is located in the user network.

6. The system of claim 5, further comprising:
a firewall device coupled to the first control system and the plurality of network elements, wherein the drilling management network reconfigures, in response to validating a network device, the first security zone to enable the network device to communicate with a destination device in the second security zone.

7. The system of claim 1, further comprising:
a configuration manager coupled to the plurality of network elements and the first control system, wherein the configuration manager detects and installs a software update on the first control system.

8. The system of claim 7, further comprising:
a security agent located in the first control system, wherein the configuration manager communicates with the security agent to install the software update on the first control system.

9. The system of claim 7, further comprising:
a coordinated controller coupled to the virtualization services manager; and
a plurality of control systems coupled to the virtualizations services manager and the coordinated controller, wherein the coordinated controller determines a prioritization for a plurality of maintenance operations for the plurality of control systems.

10. The system of claim 1, further comprising:
a plurality of persistent storage devices; and
a data management controller coupled to the plurality of persistent storage devices and the first control system, wherein the data management controller obtains data from a remote device over a network connection with the drilling management network, and wherein the data management controller stores the data in a persistent storage device among the plurality of persistent storage devices associated with a predetermined data type.

11. The system of claim 1, further comprising:
a sensor device coupled to the first control system and the plurality of network elements, wherein the sensor device establishes a network connection to the first control system over the drilling management network, and wherein the sensor device transmits, using a communication protocol, sensor data from the sensor device to the first control system.

12. The system of claim 1, further comprising:
a second control system; and
a drilling rig commissioning system coupled to the first control system, the second control system, and the plurality of network elements, wherein the drilling rig commissioning system generates a knowledge graph of the drilling management network, and wherein the drilling rig commissioning system commissions the second control system to perform a management task automatically using the knowledge graph.

13. A system, comprising:
a first control system coupled to a first plurality of network elements that define a first security zone in a drilling management network, wherein the first control system comprises one or more programmable logic controllers (PLCs) that perform a drilling operation;
a virtualization services manager coupled to the first control system and the plurality of network elements, wherein the virtualization services manager generates at least one virtualization service on a virtualization services layer of the drilling management network, wherein the at least one virtualization service controls the drilling operation, and wherein the at least one virtualization service comprises at least one of a virtual machine and a software container;
a firewall device coupled to the first security zone and a second security zone comprising a second plurality of network elements, wherein the drilling management network reconfigures, in response to validating a new network device, the first security zone to enable the new network device added to the first security zone to communicate with a destination device in the second security zone; and
a virtual connection controller configured to establish a switched virtual connection between the first security zone and the second security zone to allow for communication between the new network device added to the first security zone and the destination device in the second security zone under a first predetermined condition in which the switched virtual connection is in a closed state, wherein the switched virtual connection between the first security zone and the second security zone prevents communication between the new network device added to the first security zone and the destination device in the second security zone under a second predetermined condition in which the switched virtual connection is in an open state.

14. The system of claim 13, wherein the virtual connection controller is located in the second security zone.

15. The system of claim 13, further comprising:
a shutdown manager coupled to the virtualization services manager, the first plurality of network elements, and the first control system, wherein the shutdown manager terminates operations of the first control system and the virtualization services manager according to a plurality of time delayed termination commands.

16. The system of claim 13, further comprising:
a plurality of persistent storage devices; and
a data management controller coupled to the plurality of persistent storage devices and the first control system, wherein the data management controller obtains data from a remote device over a network connection with the drilling management network, and wherein the data management controller stores the data in a persistent storage device among the plurality of persistent storage devices associated with a predetermined data type.

17. The system of claim 13, further comprising:
a sensor device coupled to the first control system and the first plurality of network elements, wherein the sensor device establishes a network connection to the first control system over the drilling management network, and wherein the sensor device transmits, using a communication protocol, sensor data from the sensor device to the first control system.

18. The system of claim 13, further comprising:
a second control system; and
a drilling rig commissioning system coupled to the first control system, the second control system, and the first plurality of network elements, wherein the drilling rig commissioning system generates a knowledge graph of the drilling management network, and wherein the drilling rig commissioning system commissions the second control system to perform a management task automatically using the knowledge graph.

19. A system, comprising:
a control system coupled to a plurality of network elements that define a drilling management network, wherein the control system comprises one or more programmable logic controllers (PLCs) that perform a drilling operation;
a virtualization services manager coupled to the control system and the plurality of network elements, wherein the virtualization services manager generates at least one virtualization service on a virtualization services layer of the drilling management network, wherein the at least one virtualization service controls the drilling operation, and wherein the at least one virtualization service comprises at least one of a virtual machine and a software container;

a configuration manager coupled to the plurality of network elements and the control system, wherein the configuration manager installs an update on the control system using a security agent on the control system; and a virtual connection controller coupled to a first security zone and a second security zone, wherein the virtual connection controller is configured to establish a switched virtual connection between the first security zone and the second security zone to allow for communication between a first network device of the first security zone and a second network device of the second security zone under a first predetermined condition in which the switched virtual connection is in a closed state, wherein the switched virtual connection between the first security zone and the second security zone prevents communication between the first network device of the first security zone and the second network device of the second security zone under a second predetermined condition in which the switched virtual connection is in an open state.

20. The system of claim 19, wherein the control system is located in the first security zone, wherein the configuration manager is located in the second security zone.

21. The system of claim 19, further comprising:

a shutdown manager coupled to the virtualization services manager, the plurality of network elements, and the control system, wherein the shutdown manager terminates operations of the control system and the virtualization services manager according to a plurality of time delayed termination commands.

22. The system of claim 19, further comprising:

a plurality of persistent storage devices; and a data management controller coupled to the plurality of persistent storage devices and the control system, wherein the data management controller obtains data from a remote device over a network connection with the drilling management network, and wherein the data management controller stores the data in a persistent storage device among the plurality of persistent storage devices associated with a predetermined data type.

23. The system of claim 19, further comprising:

a sensor device coupled to the control system and the plurality of network elements, wherein the sensor device establishes a network connection to the control system over the drilling management network, and wherein the sensor device transmits, using a communication protocol, sensor data from the sensor device to the control system.

* * * * *